US010200738B2

(12) United States Patent
Seo et al.

(10) Patent No.: US 10,200,738 B2
(45) Date of Patent: Feb. 5, 2019

(54) REMOTE CONTROLLER AND IMAGE DISPLAY APPARATUS HAVING THE SAME

(71) Applicant: LG ELECTRONICS INC., Seoul (KR)

(72) Inventors: Ilho Seo, Seoul (KR); Kwangsoo Choi, Seoul (KR); Sukhyun Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/663,593

(22) Filed: Jul. 28, 2017

(65) Prior Publication Data

US 2018/0098109 A1    Apr. 5, 2018

(30) Foreign Application Priority Data

Jul. 29, 2016  (KR) .................. 10-2016-0097344

(51) Int. Cl.
*H04N 5/44* (2011.01)
*H04N 21/422* (2011.01)
(Continued)

(52) U.S. Cl.
CPC ....... *H04N 21/42224* (2013.01); *G08C 17/02* (2013.01); *H04N 5/4403* (2013.01);
(Continued)

(58) Field of Classification Search
CPC ....... H04N 21/42224; H04N 21/42209; H04N 21/42222; H04N 21/4622; H04N 21/4782;
(Continued)

(56) References Cited

U.S. PATENT DOCUMENTS

2007/0057762 A1    3/2007  Han et al.
2010/0037180 A1*   2/2010  Elias ................... G06F 3/04886
                                                    715/840
(Continued)

FOREIGN PATENT DOCUMENTS

KR        101105146      1/2012
KR       1020130010275   1/2013

OTHER PUBLICATIONS

PCT International Application No. PCT/KR2017/008192, International Search Report dated Nov. 29, 2017, 3 pages.

*Primary Examiner* — Sherrie Hsia
(74) *Attorney, Agent, or Firm* — Lee, Hong, Degerman, Kang & Waimey PC

(57) ABSTRACT

A remote controller and an image display apparatus having the same are disclosed. The remote controller includes a key input unit for receiving a specific key input, a touch screen for receiving a touch input, a wireless communication unit for transmitting and receiving data to and from an image display apparatus, and a controller for controlling the touch screen to display usage mode information in response to a user input to the key input unit. The controller is configured to, in response to a first touch input for selecting at least one of at least one usage mode indicated by the usage mode information displayed on the touch screen, enter the selected usage mode, and control the touch screen to display a user interface corresponding to the selected usage mode.

18 Claims, 94 Drawing Sheets

(51) Int. Cl.
  *G08C 17/02* (2006.01)
  *H04Q 9/04* (2006.01)
  *H04N 21/462* (2011.01)
  *H04N 21/4782* (2011.01)
  *H04N 21/482* (2011.01)
  *H04N 21/485* (2011.01)
  *H04N 21/436* (2011.01)

(52) U.S. Cl.
  CPC . *H04N 21/42207* (2013.01); *H04N 21/42208* (2013.01); *H04N 21/42209* (2013.01); *H04N 21/42222* (2013.01); *H04N 21/43615* (2013.01); *H04N 21/4622* (2013.01); *H04N 21/4782* (2013.01); *H04N 21/482* (2013.01); *H04N 21/485* (2013.01); *H04N 21/4852* (2013.01); *H04N 21/4854* (2013.01); *H04Q 9/04* (2013.01); *G08C 2201/30* (2013.01); *H04N 2005/4405* (2013.01)

(58) Field of Classification Search
  CPC .............. H04N 21/482; H04N 21/485; H04N 21/4852; H04N 21/4854; H04N 5/44; H04N 5/4403
  USPC .......... 348/734; 725/37; 340/12.22; 345/173
  See application file for complete search history.

(56) References Cited

U.S. PATENT DOCUMENTS

| | | | |
|---|---|---|---|
| 2011/0114716 A1* | 5/2011 | Pratt | H04L 12/2814 235/375 |
| 2012/0089937 A1 | 4/2012 | Hsieh et al. | |
| 2013/0002576 A1* | 1/2013 | Kim | G06F 3/017 345/173 |
| 2014/0258909 A1 | 9/2014 | Kim et al. | |

* cited by examiner

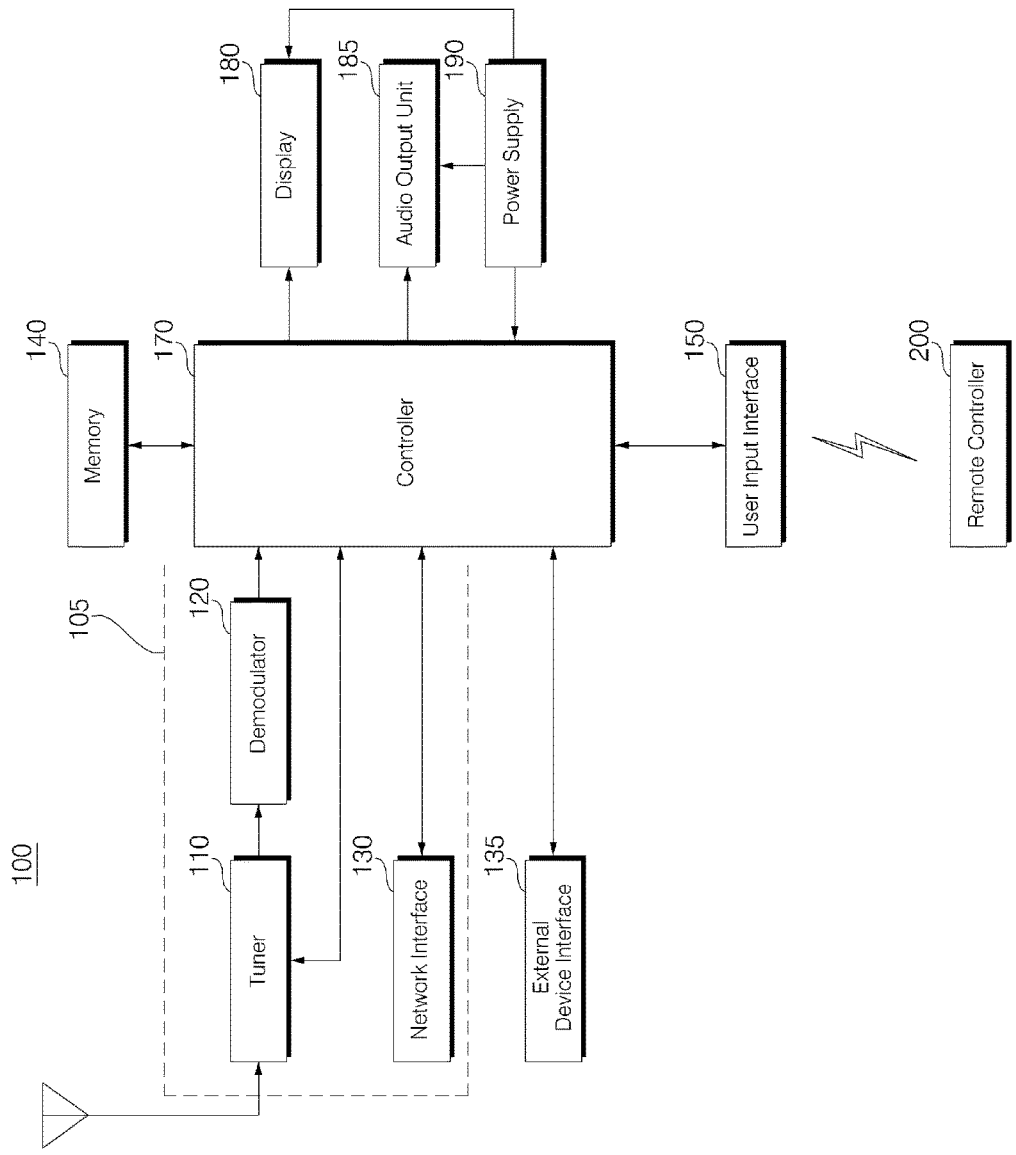

FIG. 10A
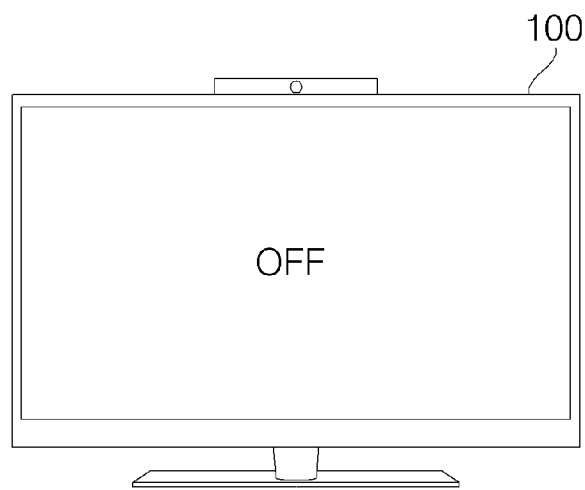
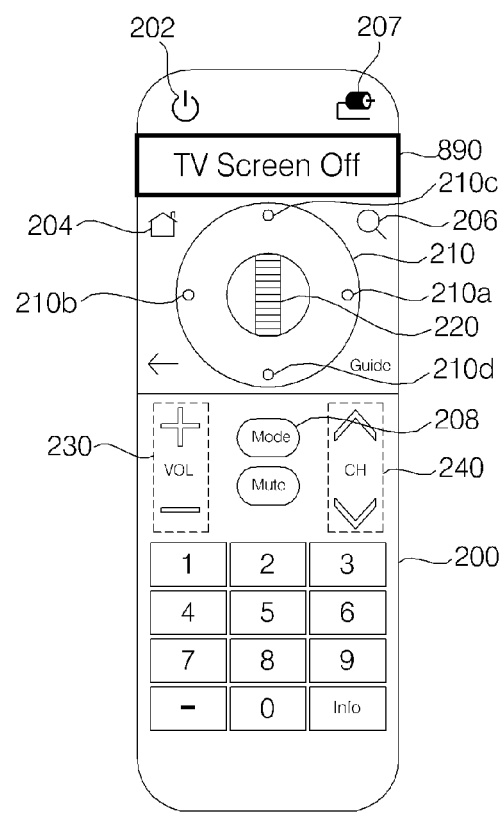

FIG. 10B
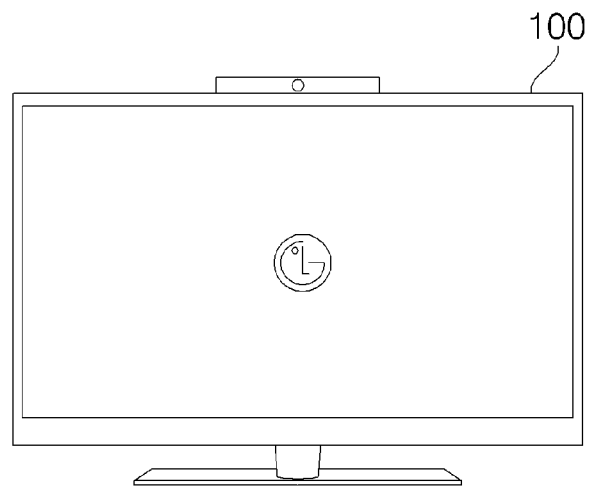
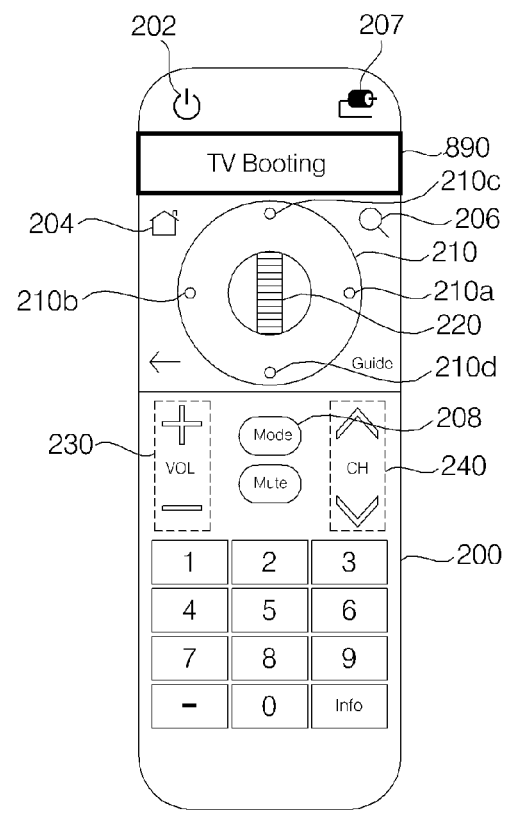

FIG. 11
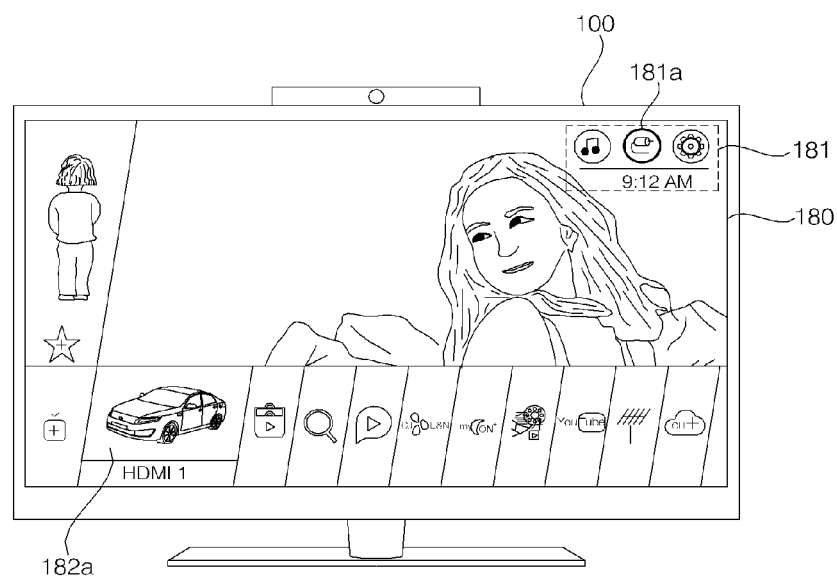
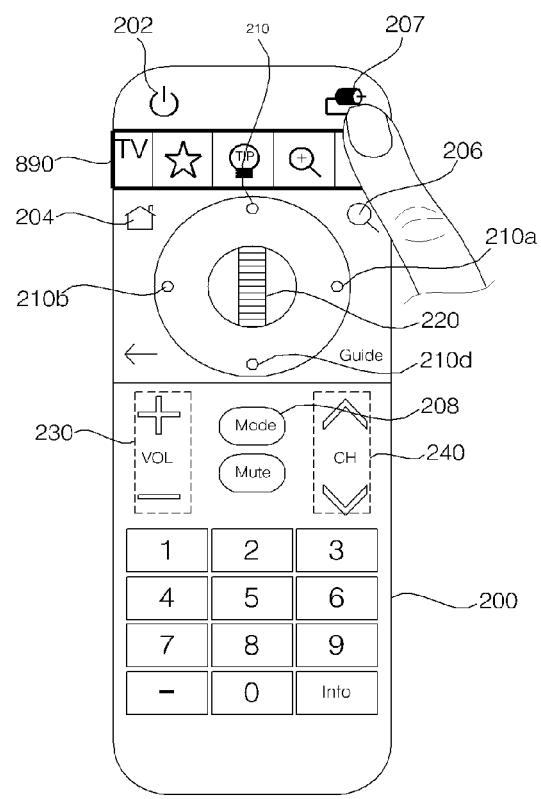

FIG. 18A
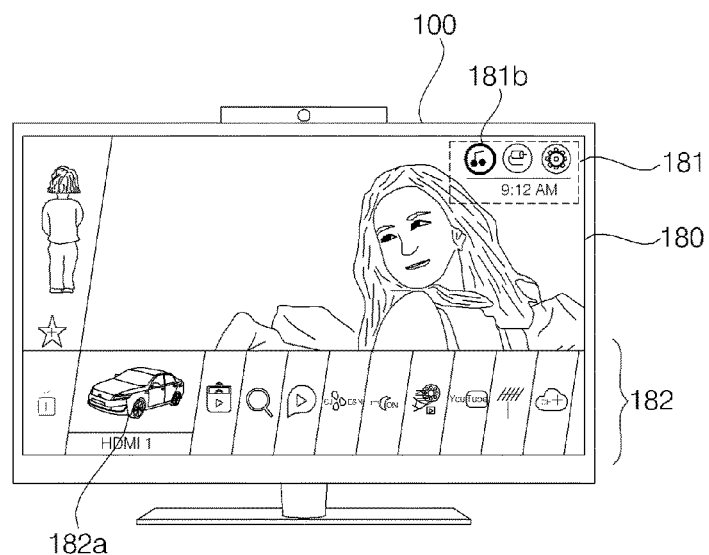
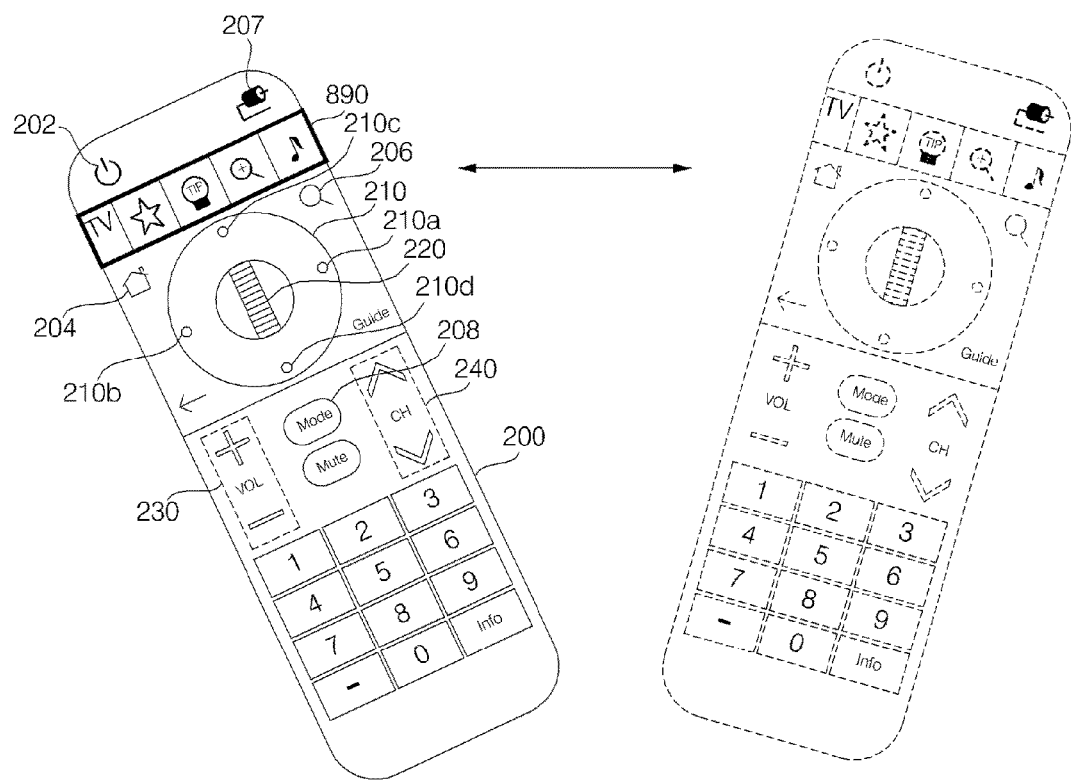

FIG. 19A
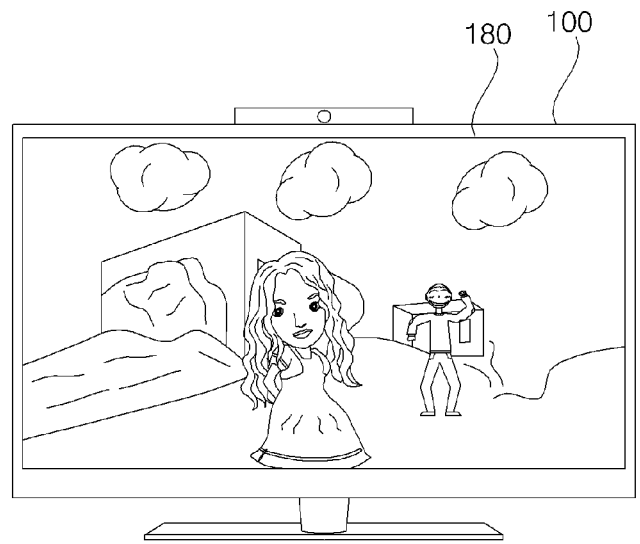
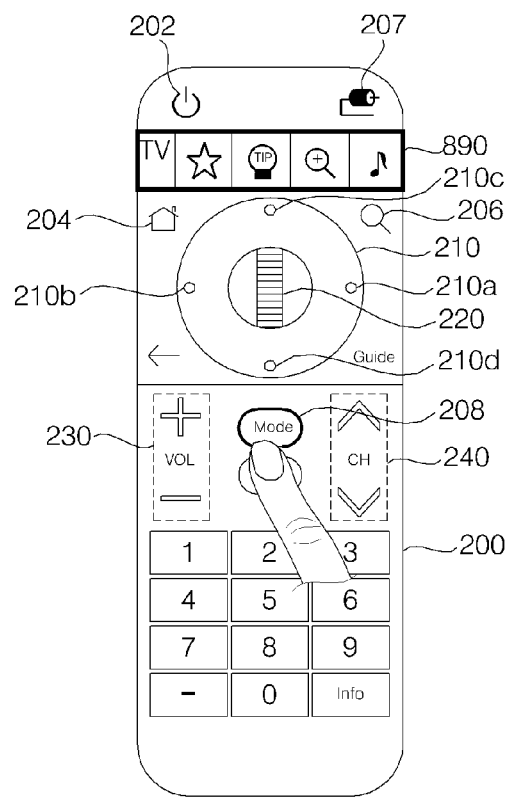

FIG. 21A
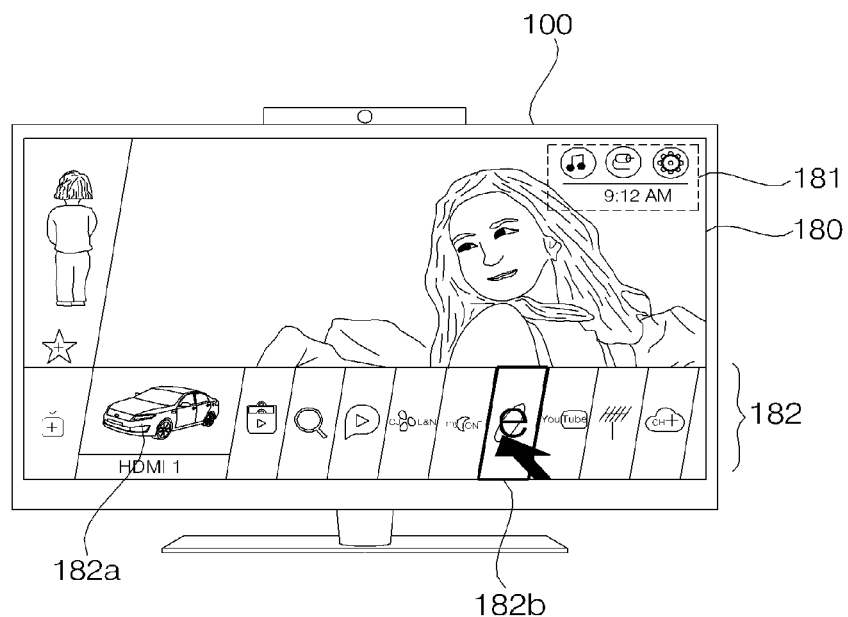
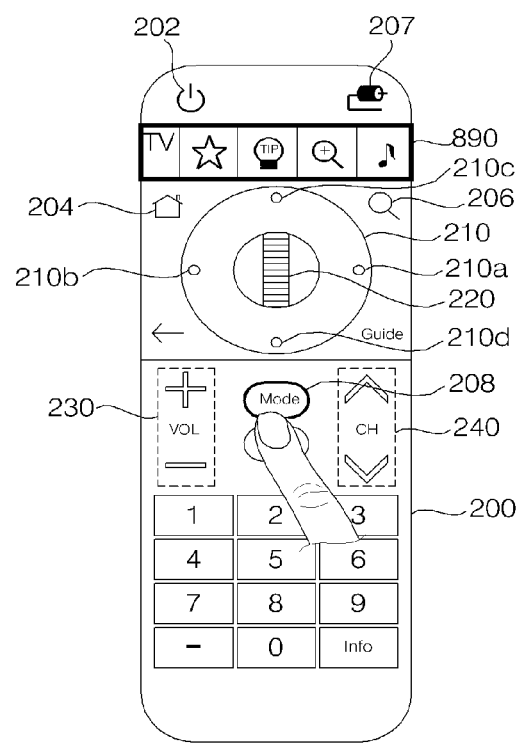

FIG. 22C
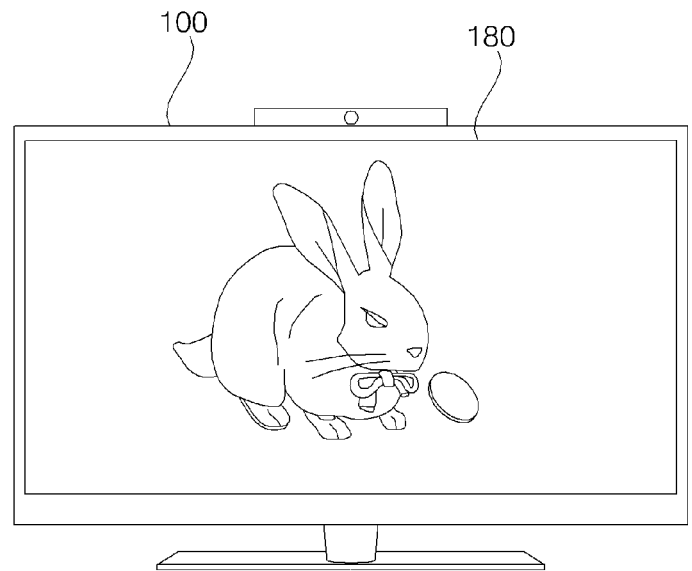
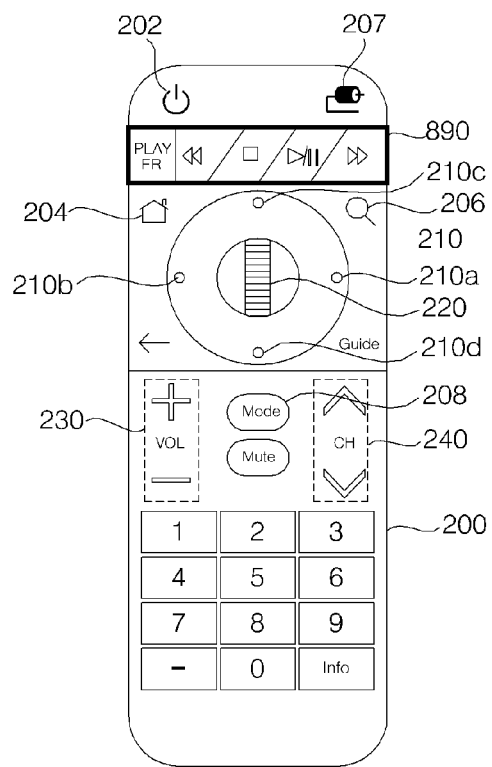

FIG. 22D
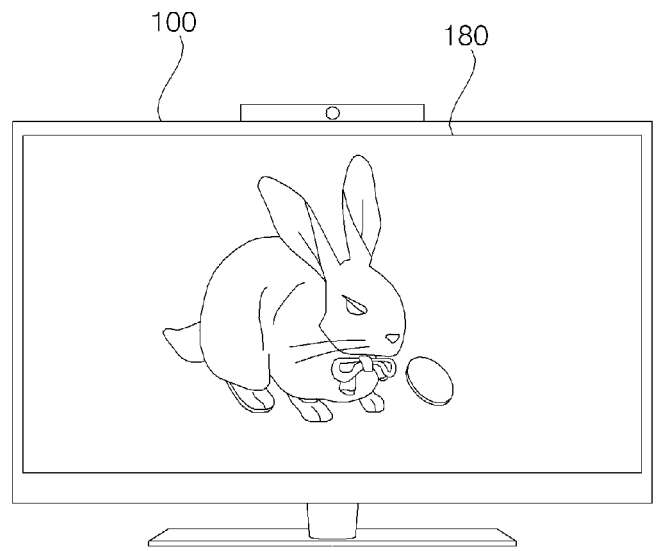
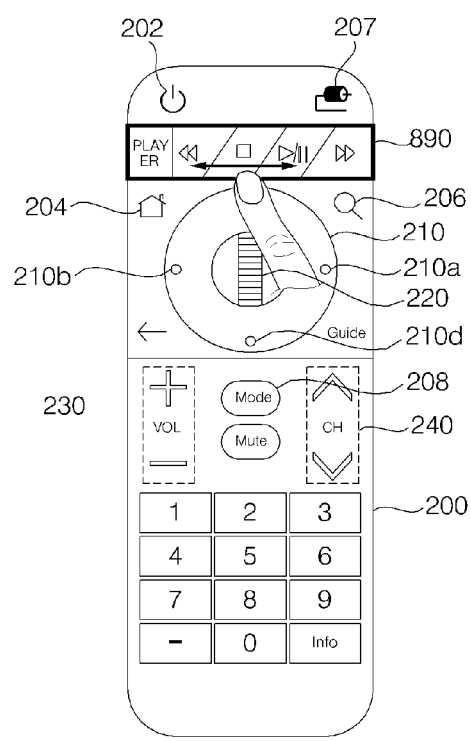

FIG. 22E
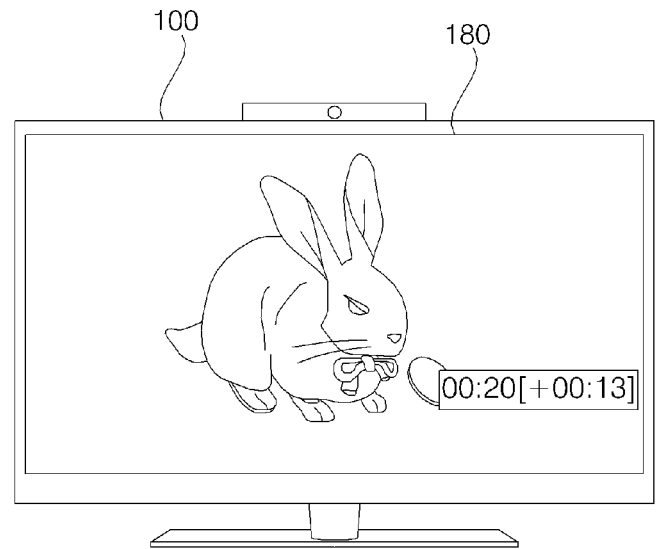
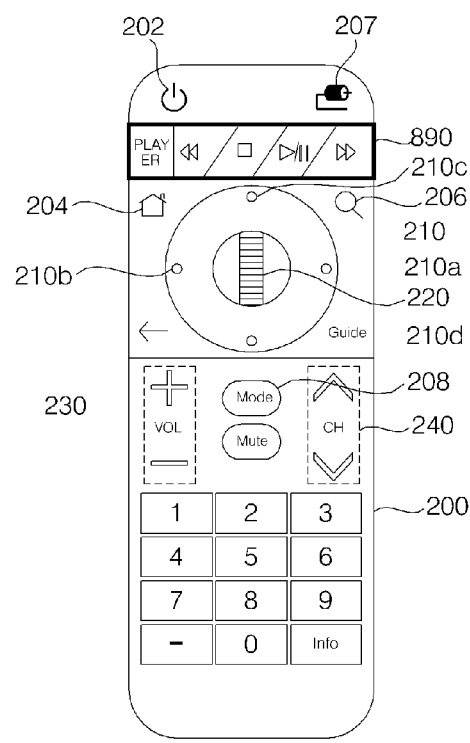

FIG. 22F
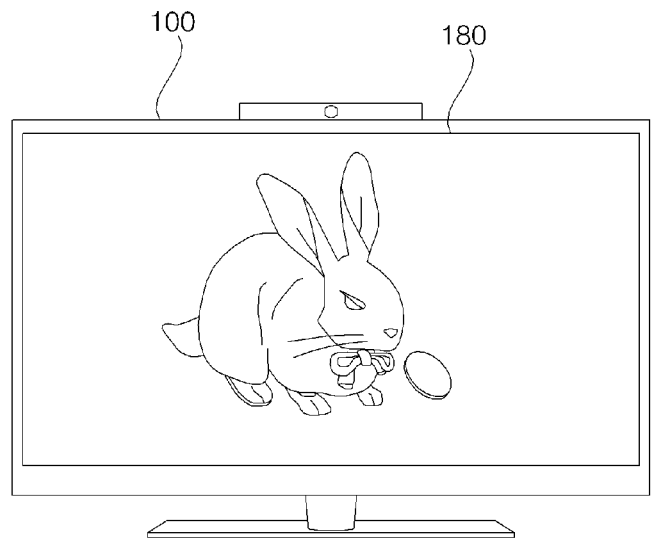
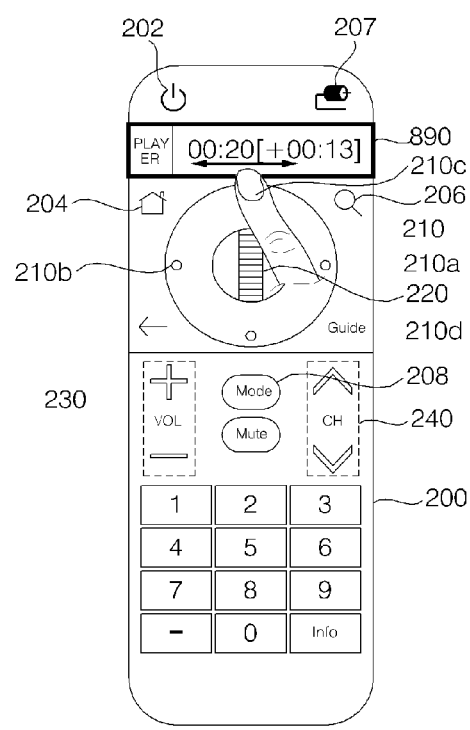

FIG. 23A
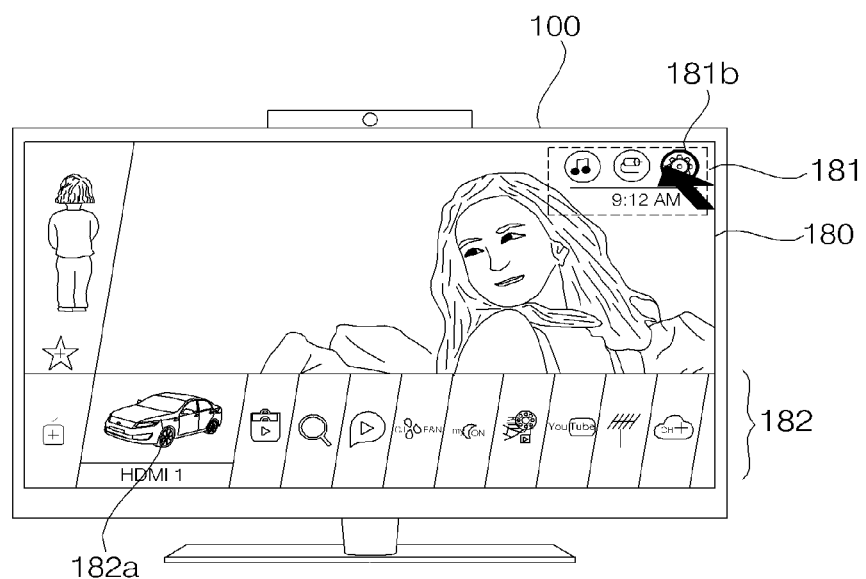
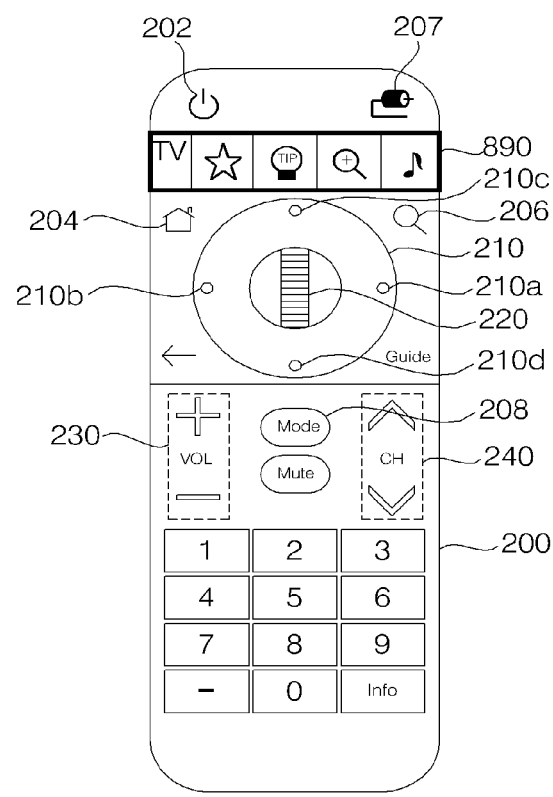

FIG. 23C
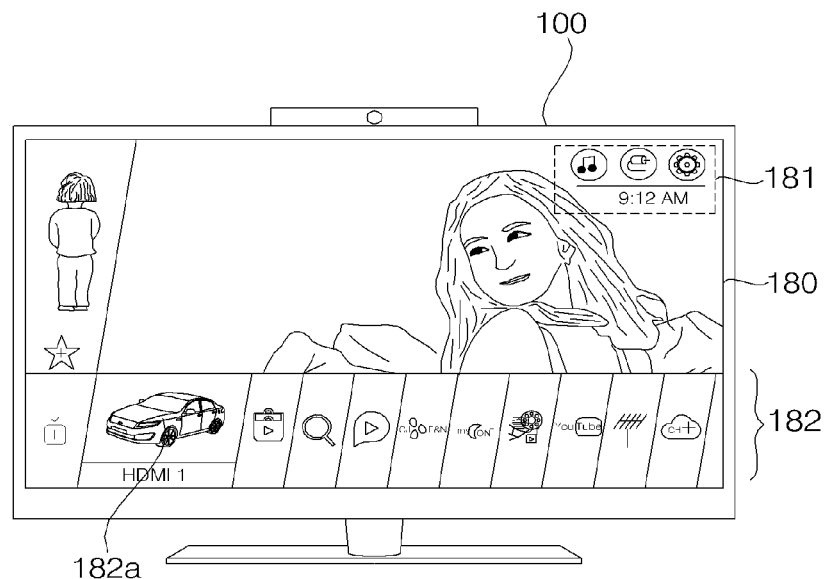
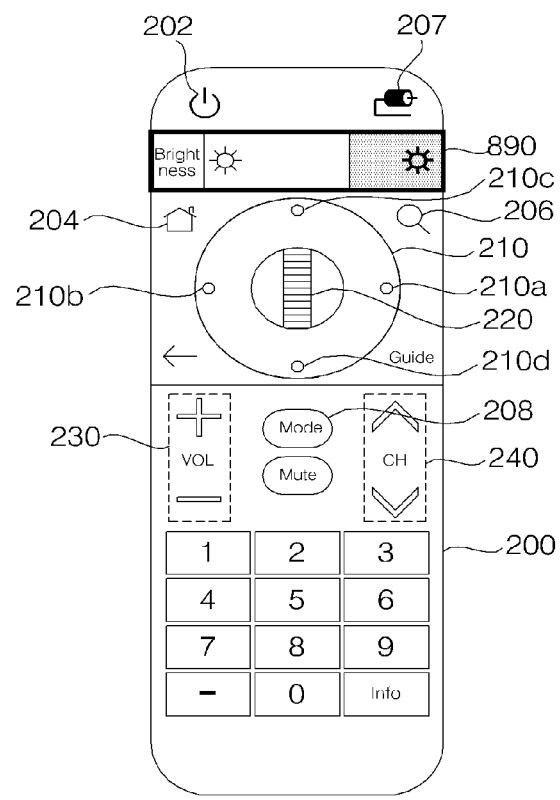

FIG. 23D
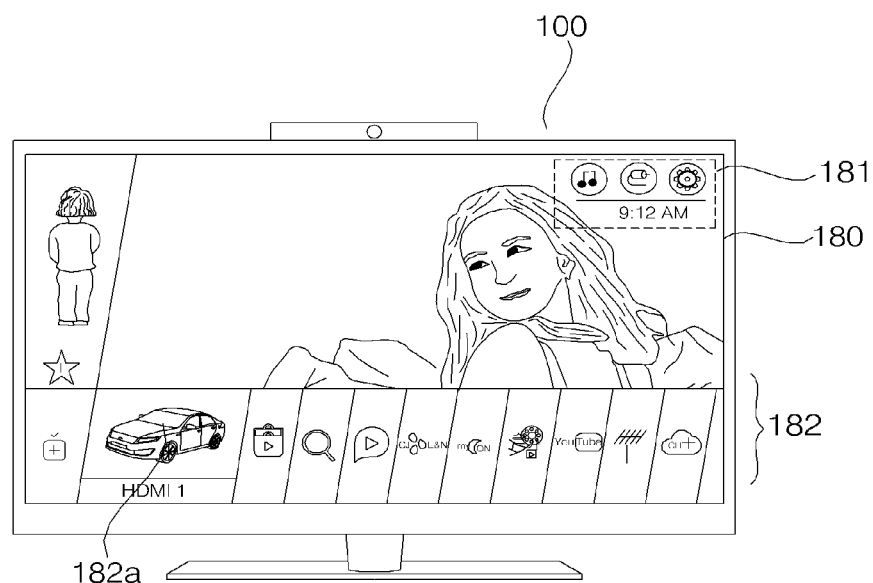
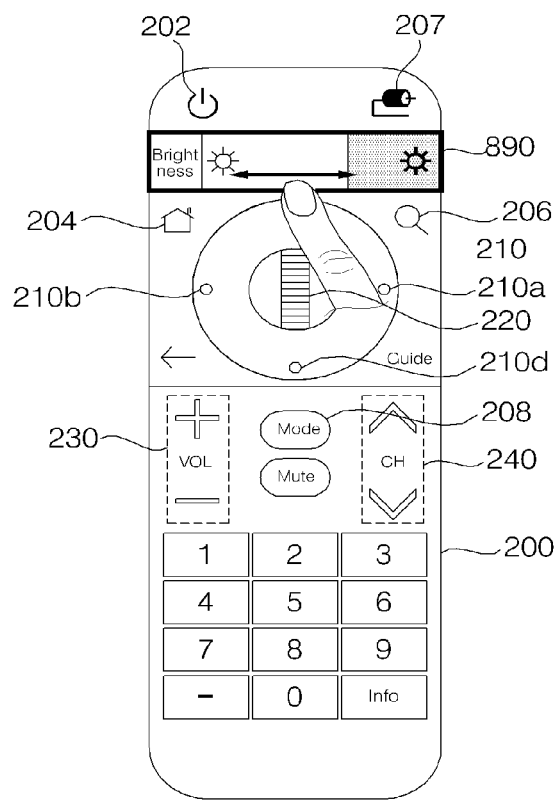

FIG. 23E
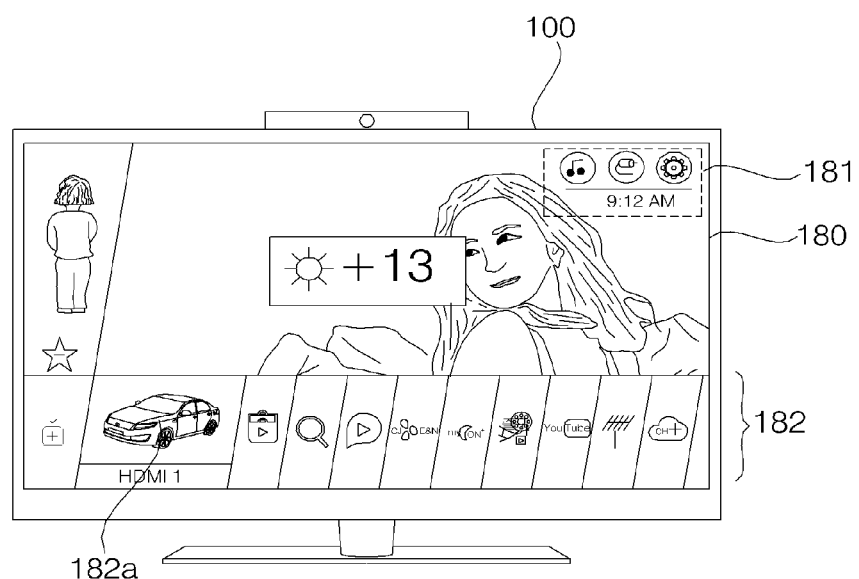
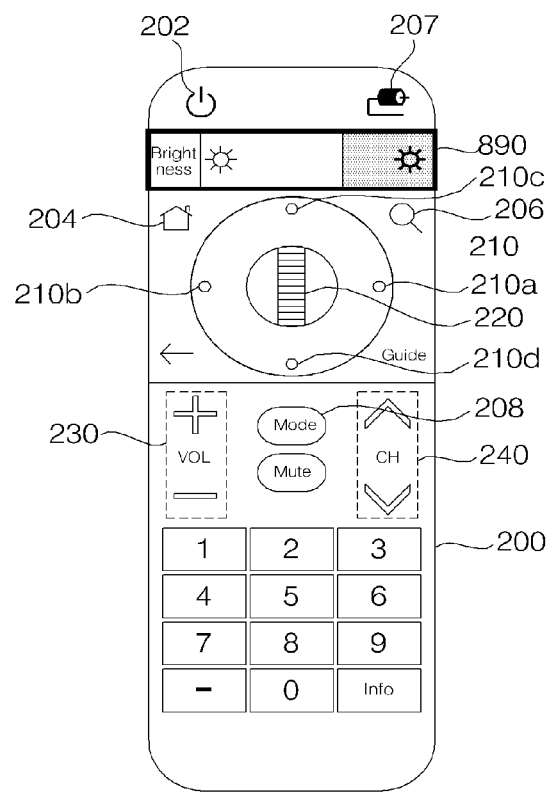

FIG. 23F
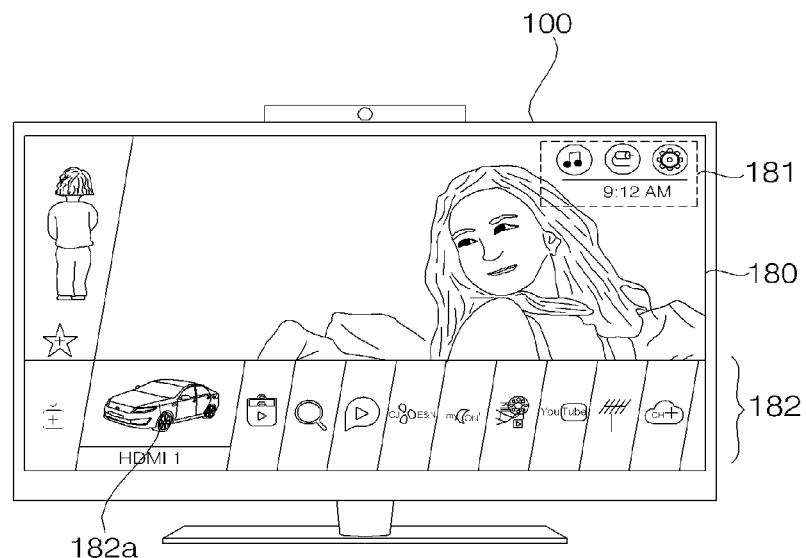
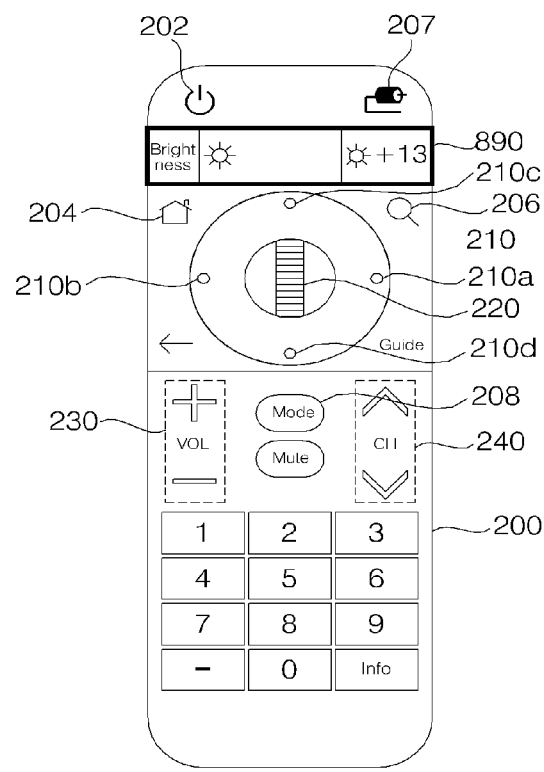

FIG. 24A
TV Notification
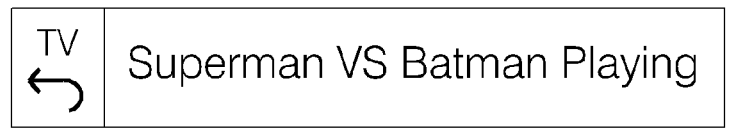

FIG. 24B
Assistance to TV Use

FIG. 24C

Additional Info

| Weather ↶ | 04:20: Weather PM ☁️ |

| Notification ↶ | Change Battery |

| Welcome ↶ | Hello, Mr. Jason. |

REMOTE CONTROLLER AND IMAGE DISPLAY APPARATUS HAVING THE SAME

CROSS-REFERENCE TO RELATED APPLICATION

Pursuant to 35 U.S.C. § 119, this application claims the benefit of earlier filing date and right of priority to Korean Application No. 10-2016-0097344, filed on Jul. 29, 2016, the contents of which is incorporated by reference herein in its entirety.

BACKGROUND OF THE INVENTION

1. Field of the Invention

The present disclosure relates to a remote controller and an image display apparatus having the same, and more particularly, to a remote controller and an image display apparatus having the same, which can improve the use convenience of a user.

2. Description of the Related Art

An image display apparatus is a device having the functionality of displaying an image so that a user may view the image. The user may view a broadcast program through the image display apparatus. The image display apparatus displays, on a display, a broadcast program selected by the user from among broadcast signals transmitted by broadcasting stations. At present, broadcasting has been shifting from analog broadcasting to digital broadcasting all over the world.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

Further, in regards to implementation of a remote controller that may be used along with an image display apparatus, there is a need for providing a user interface that enables more convenient use of a remote controller.

SUMMARY OF THE INVENTION

Therefore, the present disclosure has been made in view of the above problems, and an aspect of the present disclosure is to provide a remote controller and an image display apparatus having the same, which can improve the use convenience of a user.

Another aspect of the present disclosure is to increase the use convenience of a user interface for communication with an image display apparatus in a remote controller.

In an aspect of the present disclosure, the above and other objects can be accomplished by the provision of a remote controller including a key input unit for receiving a specific key input, a touch screen for receiving a touch input, a wireless communication unit for transmitting and receiving data to and from an image display apparatus, and a controller for controlling the touch screen to display usage mode information in response to a user input to the key input unit. The controller is configured to, in response to a first touch input for selecting at least one of at least one usage mode indicated by the usage mode information displayed on the touch screen, enter the selected usage mode, and control the touch screen to display a user interface corresponding to the selected usage mode.

The controller may be configured to receive a second touch input on the user interface corresponding to the selected usage mode.

The remote controller may further include a memory for storing a user interface corresponding to the at least one usage mode. The user interface corresponding to the selected usage mode may include a user interface pre-stored in the memory, and the controller may be configured to enter the selected usage mode and control the touch screen to automatically display the user interface pre-stored in the memory.

The usage mode information may include at least one of device list information and function list information. The device list information may include information about a list of external devices connected to the image display apparatus, and the function list information may include information about functions based on user inputs configured in the key input unit.

The touch screen may include a small-size display configured as a single line display, and the single line display may display at least one of text or a thumbnail image.

The first touch input may include at least one of a short touch, a long touch, a multi-touch, a swipe input including a bi-directional touch and drag, or a pinch input including a bi-directional touch and drag.

The controller may be configured to, in response to reception of the usage mode information through the wireless communication unit, display the received usage mode information on the touch screen.

In another aspect of the present disclosure, a remote controller includes a key input unit for receiving a specific key input, a touch screen for receiving a touch input, a wireless communication unit for transmitting and receiving data to and from an image display apparatus, and a controller for, upon operation of an external input key in the key input unit, receiving external device list information about the image display apparatus, and controlling display of the received external device list information on the touch screen.

In another aspect of the present disclosure, an image display apparatus includes a remote controller, a display, an interface unit for transmitting usage mode information, and a controller for controlling data transmission and reception to and from the image display apparatus through the interface unit. The remote controller receives a first touch input for selecting at least one of at least one usage mode indicated by the usage mode information, enters the selected usage mode, displays a user interface corresponding to the selected usage mode, and receive a second touch input on the user interface corresponding to the selected usage mode. The controller is configured to execute a command corresponding to the second touch input received from the remote controller.

BRIEF DESCRIPTION OF THE DRAWINGS

The above and other objects, features and other advantages of the present disclosure will be more clearly understood from the following detailed description taken in conjunction with the accompanying drawings, in which:

FIG. 2 is a block diagram illustrating an image display apparatus illustrated in FIG. 1A;

FIGS. 10A to 24C are views referred to for describing user interfaces through which to transmit and receive data between a remote controller and an image display apparatus according to another embodiment of the present disclosure.

DETAILED DESCRIPTION OF THE PREFERRED EMBODIMENTS

Embodiments of the present disclosure will be described below in detail with reference to the attached drawings.

The terms 'module' and 'unit' used to signify components are used herein to help the understanding of the components and thus they should not be considered as having specific meanings or roles. Accordingly, the terms 'module' and 'unit' may be used interchangeably. An image display apparatus described in the present disclosure is an intelligent one having the functionality of supporting computers in addition to the functionality of broadcasting reception, and thus may have a more user-friendly interface such as a handwriting input device, a touch screen, or a three-dimensional (3D) pointing device. The image display apparatus is capable of connecting to the Internet and a computer under support of a wired or wireless Internet functionality and thus executing functions including e-mail, Web browsing, banking, or gaming. For these various functions, a standardized general-purpose operating system (OS) may be used.

That is, since various applications may be freely added to or removed from a general-purpose OS kernel in the image display apparatus described in the present disclosure, a number of user-friendly functions may be executed. For example, the image display apparatus may be a smart TV.

Figure 1A:
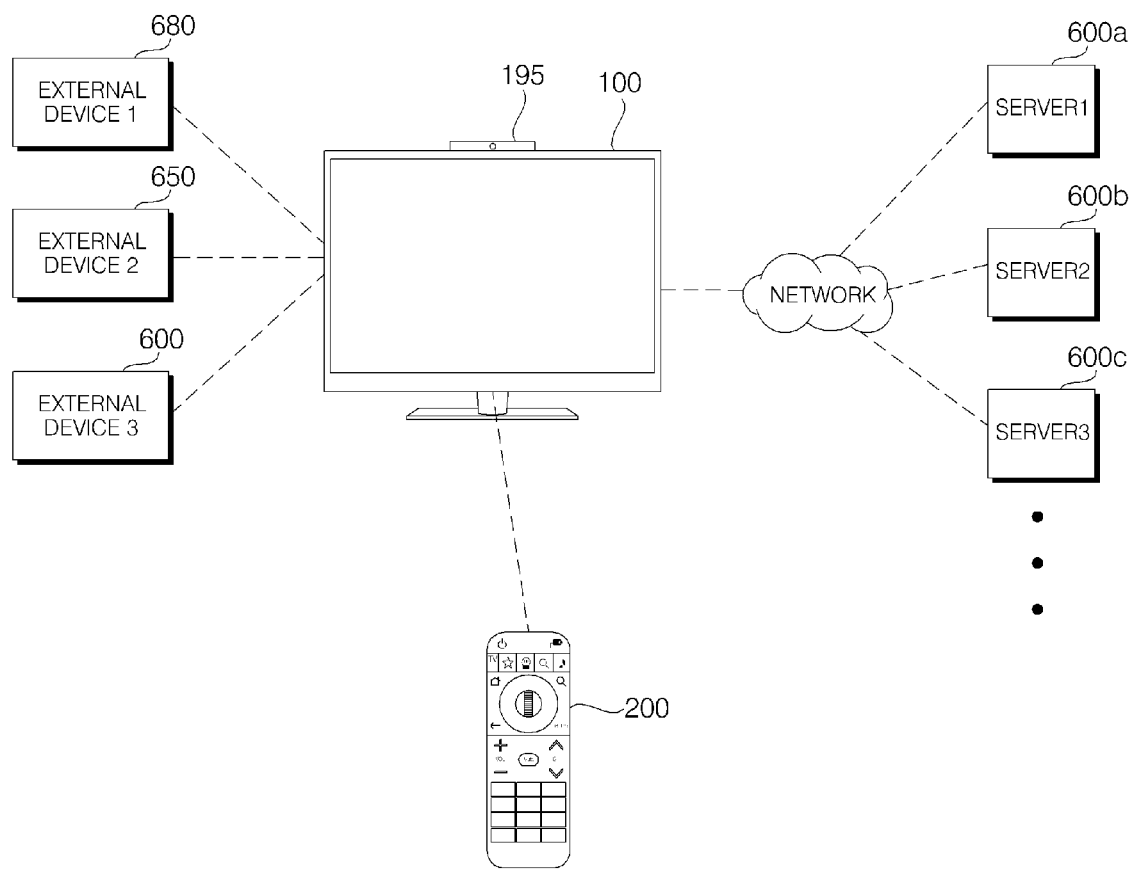
FIG. 1A is a view illustrating an image display system according to an embodiment of the present disclosure.

FIG. 1A is a view illustrating an image display system according to an embodiment of the present disclosure. Referring to FIG. 1A, the image display system according to the embodiment of the present disclosure may include an image display apparatus 100, a plurality of external devices (EXTERNAL DEVICE 1, EXTERNAL DEVICE 2, and EXTERNAL DEVICE 3) 680, 650, and 600, a remote controller 200, and a plurality of servers (SERVER 1, SERVER 2, and SERVER 3) 600a, 600b, and 600c connected through a network.

The image display apparatus 100 may exchange data with each external device through the network.

The image display apparatus 100 may exchange data with the plurality of servers, SERVER 1 600a, SERVER 2 600b, and SERVER 3 600c through the network. The plurality of servers, SERVER 1 600a, SERVER 2 600b, and SERVER 3 600c may be Content Providers (CPs) that provide various types of content.

Unlike FIG. 1A, the image display apparatus 100 may exchange data with a User Equipment (UE) (not shown) through the network.

The image display apparatus 100 may operate in response to a remote control signal received from the remote controller 200. For this purpose, after the image display apparatus 100 is paired with the remote controller 200, they may exchange data with each other.

Particularly, the image display apparatus 100 according to the embodiment of the present disclosure may display a pointer corresponding to a motion of the remote controller 200 or text corresponding to input of a character key from the remote controller 200, through data exchange.

The image display apparatus 100 described in the present disclosure may be any of a TV receiver, a monitor, a projector, a laptop computer, a digital broadcasting terminal, and so on.

The image display apparatus 100 described in the present disclosure may be connected wirelessly or wiredly to the plurality of external devices, EXTERNAL DEVICE 1 680, EXTERNAL DEVICE 2 650, and EXTERNAL DEVICE 3 600 and thus transmit and receive data to and from the plurality of external devices, EXTERNAL DEVICE 1 680, EXTERNAL DEVICE 2 650, and EXTERNAL DEVICE 3 600. For this purpose, the image display apparatus 100 may receive a remote control signal from the remote controller 200 or transmit an audio or video processing result to the remote controller 200.

According to an embodiment of the present disclosure, the image display apparatus 100, which is a device configured to display images, may be a fixed or mobile image display apparatus.

Figure 1B:
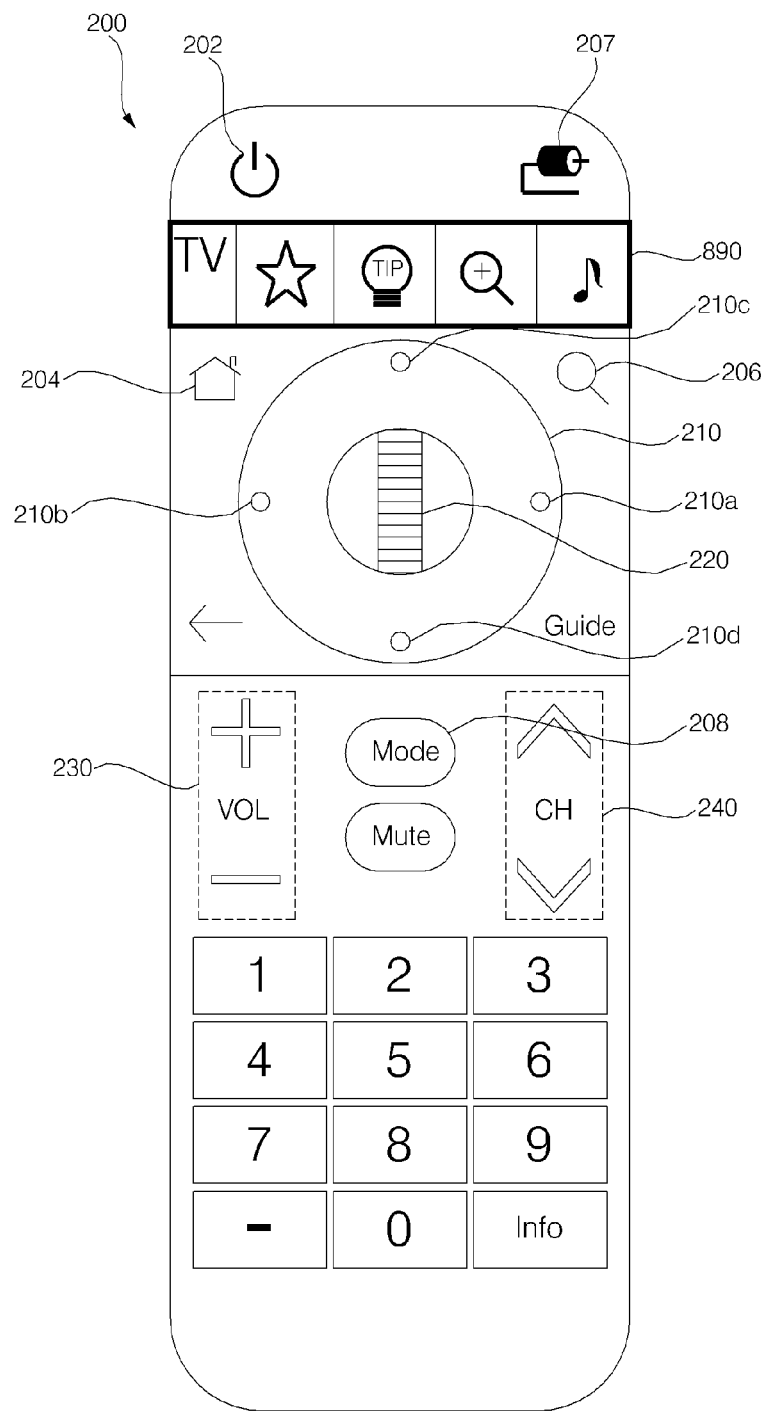
FIG. 1B is a view illustrating the front surface of a remote controller illustrated in FIG. 1A.

FIG. 1B is a view illustrating the front surface of the remote controller 200 illustrated in FIG. 1A. Referring to FIG. 1B, operation keys such as a power key 202 may be arranged on the front surface of the remote controller 201.

Various operation keys of the remote controller 200 will be described below. The power key 202 is used to turn on/off the image display apparatus 100. A home key 204 is used to display a home screen, if the home screen is set for the image display apparatus 100. A search key 206 may be used to display a search window on the image display apparatus 100 or to perform search upon input of a search keyword.

An external input key 207 according to the present disclosure may be used to display a list of play modes of videos receivable through a broadcasting receiver 105 of the image display apparatus 100, a list of play modes of videos wirelessly or wiredly receivable through a network interface 130 of the image display apparatus 100, or a list of play modes for various devices (described later) connected to the image display apparatus 100 through an external device interface 135 of the image display apparatus 100, so that the user may select a specific mode in the play mode list.

A mode key 208 according to the present disclosure may include key information required for accessing function list information indicating functions of the image display apparatus 100, such as an audio play function, a zoom function including magic zoom or pinch zoom, a function of searching for an Electronic Program Guide (EPG) through a set top box, and an auto channel complete function during Web browsing. Upon input of the mode key 208 of the remote controller 200, the use function list information may be displayed.

A 4-directional key 210 is used to move a pointer or cursor up, down, to the left, or to the right. An up key 210c, a down key 210d, a left key 210b, and a right key 210a may be integrated into the 4-directional key 210.

A wheel key 220 may be disposed at the center of the 4-directional key 210. The wheel key 220 is used to move a screen or item displayed on the image display apparatus 100.

The wheel key 220 may move up and down a screen or item of the image display apparatus 100.

According to the present disclosure, a specific object may be selected from a screen or image displayed on the image display apparatus 100 by means of the wheel key 220. The wheel key 220 may also be used to display a pointer or cursor on the selected specific object.

A volume key 230 is used to adjust an audio volume, and a channel key 240 is used to switch between channels.

While not shown, the remote controller 200 may further include the following keys.

A Three-Dimensional (3D) key (not shown) may be used to convert a Two-Dimensional (2D) image displayed on the image display apparatus 100 to a 3D image, or to display a list of 3D images available in the image display apparatus 100.

A Picture-In-Picture (PIP) key (not shown) is used to display a plurality of images on the image display apparatus 100. A plurality of images may be displayed in a picture-in-picture manner on the display 180 by manipulating the PIP key. Or With the PIP key, a plurality of images may be displayed in parallel.

One of a plurality of images may be floated and thus displayed at varying positions. In this case, a PIP image may be referred to as a dynamic screen image.

A guide key for displaying a guide, a mute key, a color key, and so on are further provided, by way of example.

Particularly, as a touch screen 890 is further configured in the remote controller 200 in the present disclosure, key buttons configured in a conventional remote controller may be displayed on the touch screen 890, thereby reducing the number of physical key buttons (hot keys) in the remote controller 200, relative to that in the conventional remote controller. As a consequence, fabrication cost may be reduced.

Each component of the remote controller 200 according to the embodiment of the present disclosure is not mandatory. Rather, the components of the remote controller 200 may be configured in various manners, for example, by adding or deleting some component.

Figure 1C:
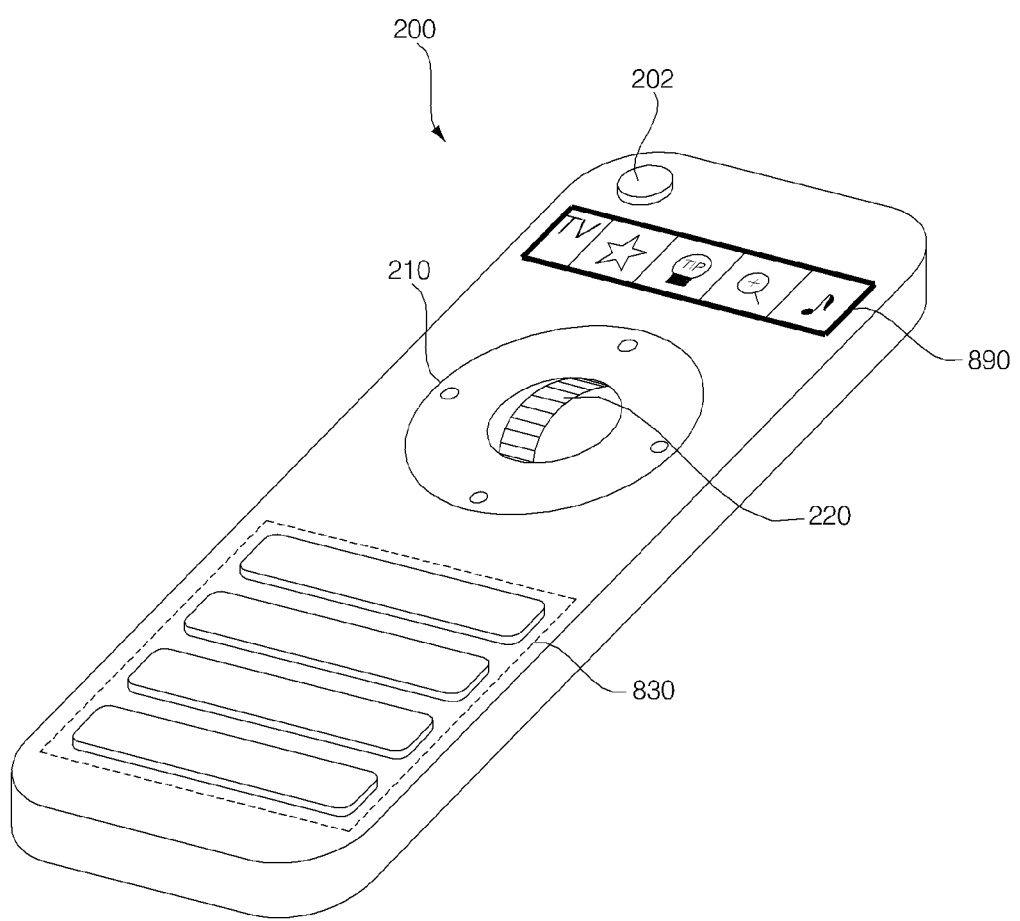
FIG. 1C is a perspective view illustrating the remote controller illustrated in FIGS. 1A and 1B.

FIG. 1C is a perspective view illustrating the remote controller illustrated in FIGS. 1A and 1B.

As illustrated in FIG. 1C, the remote controller 200 according to the embodiment of the present disclosure may include the power key 202, the touch screen 890, the wheel key 220, the 4-directional key 210, and a key input unit 830.

As the touch screen 890 is further configured in the remote controller 200 according to the present disclosure, key buttons configured in a conventional remote controller may be displayed on the touch screen 890, thereby reducing the number of physical key buttons (hot keys) in the remote controller 200, relative to that in the conventional remote controller. As a consequence, fabrication cost may be reduced.

According to an embodiment of the present disclosure, the touch screen 890 may include a small-size display configured as a single line display or a multi-line display. Further, the touch screen 890 may preferably include a small-size display having a horizontal length of about 4 to 5 cm and a vertical length of about 1 cm.

According to an embodiment of the present disclosure, the touch screen 890 may include a touch sensor (not shown) for sensing a touch, and may be configured to be integrated or layered with the touch sensor. The touch sensor may include an Indium Tin Oxide (ITO) panel. The touch sensor may be implemented in a capacitive scheme in which a variation in the capacitance of the touch screen 890 is converted into an electrical input signal, a resistive scheme in which a variation in pressure applied to a specific part of the touch screen 890 is converted to an electrical input signal, an infrared scheme, or a magnetic scheme.

Further, the touch screen 890 may include at least one of a Liquid Crystal Display (LCD), a Thin Film Transistor-Liquid Crystal Display (TFT LCD), an Organic Light-Emitting Diode (OLED) display, a flexible display, a 3D display, and an e-ink display.

While the touch screen 890 is shown in FIG. 1C as disposed in an upper part of the remote controller 200, this embodiment does not limit the present disclosure. Thus, the touch screen 890 may be disposed in a center or lower part of the remote controller 200.

According to an embodiment of the present disclosure, the touch screen 890 may be controlled to receive a first touch input for selecting at least one of at least one usage mode indicated by usage mode information displayed on the touch screen 890, enter the usage mode selected by the first touch input, and display a User Interface (UI) corresponding to the selected usage mode. The touch screen 890 may be controlled to further receive a second touch input on the UI corresponding to the selected usage mode. A touch input on the touch screen 890 may be any of a short touch, a long touch, a multi-touch, a swipe input, and a pinch input. The short touch and the long touch are classified according to their touch durations, and each of the swipe input and the pinch input includes a bi-directional touch and drag.

FIG. 2 is a block diagram illustrating the image display apparatus illustrated in FIG. 1A.

Referring to FIG. 2, the image display apparatus 100 according to the embodiment of the present disclosure may include the broadcasting receiver 105, the external device interface 135, a memory 140, a user input interface 150, a controller 170, a display 180, an audio output unit 185, a power supply 190, and a camera (195 in FIG. 1A). The broadcasting receiver 105 may include a tuner 110 and a demodulator 120. The broadcasting receiver 105 may further include the network interface 130.

The tuner 110 selects a Radio Frequency (RF) broadcast signal corresponding to a channel selected by a user or an RF broadcast signal corresponding to each of pre-stored channels from among a plurality of RF broadcast signals received through an antenna, and downconverts the selected RF broadcast signal into an Intermediate Frequency (IF) signal or a baseband Audio/Video (A/V) signal.

For example, if the selected RF broadcast signal is a digital broadcast signal, the tuner 110 downconverts the selected RF broadcast signal into a digital IF signal. On the other hand, if the selected RF broadcast signal is an analog broadcast signal, the tuner 110 downconverts the selected RF broadcast signal into an analog baseband A/V signal.

The tuner 110 may sequentially select a number of RF broadcast signals corresponding to all broadcast channels previously stored in the image display apparatus 100 by a channel add function from among a plurality of RF signals received through the antenna, and may downconvert the selected RF broadcast signals into IF signals or baseband A/V signals.

The demodulator 120 receives the digital IF signal from the tuner 110 and demodulates the digital IF signal. The demodulator 120 may perform demodulation and channel decoding on the digital IF signal, thereby obtaining a stream signal. The stream signal may be a signal in which a video signal, an audio signal and/or a data signal are multiplexed. The stream signal may be input to the controller 170 and then subjected to demultiplexing and A/V signal processing.

The controller 170 outputs the processed video and audio signals to the display 180 and the audio output unit 185, respectively.

The external device interface 135 may connect the image display apparatus 100 to an external device. For this purpose, the external device interface 135 may include an A/V Input/Output (I/O) unit (not shown).

The external device interface 135 may be connected to an external device, wirelessly or wiredly, such as a Digital Versatile Disk (DVD) player, a Blu-ray Disk (BD) player, a game console, a camera, a camcorder, a computer (e.g. a laptop computer), or a set-top box. Then, the external device interface 135 may transmit and receive signals to and from the external device.

The A/V I/O unit may include a Universal Serial Bus (USB) port, a Composite Video Banking Sync (CVBS) port, a component port, an S-video port (analog), a Digital Visual Interface (DVI) port, a High Definition Multimedia Interface (HDMI) port, a Red, Green, Blue (RGB) port, a D-SUB port, and so on, so that audio and video signals from an external device may be received in the image display apparatus 100.

The external device interface 135 may be connected to various set-top boxes through at least one of the above-described ports, and perform an input/output operation with the set-top box.

The network interface 130 serves as an interface between the image display apparatus 100 and a wired/wireless network such as the Internet. For example, the network interface 130 may receive content or data from the Internet or from a CP or a Network Provider (NP) over a network.

The network interface 130 may access a specific Web page through a connected network or another network linked to the connected network. That is, the network interface 130 may transmit data to or receive data from a server by accessing the specific Web page through the network. Further, the network interface 130 may receive content or data from a CP or an NP.

The network interface 130 may select a desired one of applications open to the public and receive the selected application through a network.

The network interface 130 may include a wired communication unit (not shown) or a wireless communication unit (not shown).

The wireless communication unit may conduct short-range wireless communication with another electronic device. The image display apparatus 100 may be connected to another electronic device through a network in compliance to a communication standard such as Bluetooth, Radio Frequency Identification (RFID), Infrared Data Association (IrDA), Ultra Wideband (UWB), ZigBee, or Digital Living Network Alliance (DLNA).

The memory 140 may store programs necessary for the controller 170 to process signals and control, and may also store a processed audio, video, or data signal.

The memory 140 may also temporarily store an audio, video or data signal received from the external device interface 135 or the network interface 130. The memory 140 may store information about broadcast channels by the channel-add function.

The memory 140 may also store an application or a list of applications received through the external device interface 135 or the network interface 130.

The image display apparatus 100 may play a content file (e.g., a video file, a still image file, a music file, a text file, or an application file) stored in the memory 140, and provide the played content file to the user.

While the memory 140 is shown in FIG. 2 as configured separately from the controller 170, to which the present disclosure is not limited, the memory 140 may be incorporated into the controller 170.

The user input interface 150 transmits a signal received from the user to the controller 170 or transmits a signal received from the controller 170 to the user.

For example, the user input interface 150 may receive user input signals such as a power-on/off signal, a channel selection signal, and a screen setting signal from the remote controller 200, provide the controller 170 with user input signals received from local keys (not shown), such as inputs of a power key, a channel key, a volume key, and a setting value, transmit a user input signal received from a sensor unit (not shown) that senses a user gesture to the controller 170, or transmit a signal received from the controller 170 to the sensor unit.

The controller 170 may demultiplex a stream signal received from the tuner 110, the demodulator 120, or the external device interface 135 into a number of signals, and process the demultiplexed signals into audio and video data.

The video signal processed by the controller 170 may be displayed as an image corresponding to the video signal on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to an external output device through the external device interface 135.

While not shown in FIG. 2, the controller 170 may include a Demultiplexer (DEMUX) and a video processor, which will be described later with reference to FIG. 3.

In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. Particularly, the controller 170 may connect to a network and control download of a user-intended application or application list to the image display apparatus 100.

For example, the controller 170 controls the tuner 110 to receive a signal of a channel selected according to a specific channel selection command received through the user input interface 150, and processes an audio, video or data signal of the selected channel. The controller 170 may control output of information about the user-selected channel along with the processed audio or video signal through the display 180 or the audio output unit 185.

In another example, the controller 170 may control output of an audio or video signal received from an external device, for example, a camera or a camcorder through the external device interface to the display 180 or the audio output unit 185, according to an external device image play command received through the user input interface 150.

The controller 170 may control the display 180 to display an image. The image displayed on the display 180 may be a 2D or 3D still image or video.

The controller 170 may control a particular 2D object in the image displayed on the display 180 to be rendered as a 3D object. For example, the particular 2D object may be at least one of a linked Web page (e.g. from a newspaper or a magazine), an EPG, a menu, a widget, an icon, a still image, a video, or text.

The controller 170 may locate the user based on an image captured by the camera 195. For example, the controller 170 may determine the distance (a z-axis coordinate) between the user and the image display apparatus 100. In addition, the controller 170 may determine x-axis and y-axis coordinates corresponding to the position of the user on the display 180.

If an application view item is selected, the controller 170 may control display of applications or an application list available in the image display apparatus 100 or downloadable from an external network.

The controller 170 may control installation and execution of an application downloaded from an external network in conjunction with various UIs. Further, upon user selection, the controller 170 may control display of an image related to an executed application on the display 180.

The controller 170 may receive a captured user image from the camera 195, recognize the user based on the captured user image, and control log-in of the recognized user to the image display apparatus 100. The controller 170 may provide services per logged-in user.

Further, the controller 170 may recognize a user gesture based on a user image captured by the camera 195. Particularly, the controller 170 may recognize the face and hands of the user in the captured image and determine whether a specific gesture has been made.

The display 180 generates drive signals by converting a processed video signal, a processed data signal, and an On Screen Display (OSD) signal received from the controller 170 or a video signal and a data signal received from the external device interface 135 to RGB signals.

The display 180 may be any of various types of displays such as a Plasma Display Panel (PDP), an LCD, an OLED display, and a flexible display. The display 180 may also be a 3D display.

The display 180 may also be a touch screen that may be used not only as an output device but also as an input device.

The audio output unit 185 may receive a processed audio signal from the controller 170 and output the received audio signal as voice.

The power supply 190 supplies power across the whole image display apparatus 100. Particularly, the power supply 190 may supply power to the controller 170 which may be implemented as a System On Chip (SOC), the display 180 for displaying an image, and the audio output unit 185 for outputting an audio signal.

For this purpose, the power supply 190 may include a converter (not shown) for converting Alternating Current (AC) power to Direct Current (DC) power. For example, if the display 180 is configured as an LCD panel having a number of backlight lamps, the power supply 190 may further include an inverter (not shown) for luminance change or dimming.

The camera 195 may capture a user and transmit the captured image to the controller 170 in the image display apparatus 100. While the single camera 195 is shown in FIG. 1A, by way of example, a plurality of cameras may be provided in the image display apparatus 100. Meanwhile, the camera 195 may be a 2D or 3D camera.

The remote controller 200 transmits a user input to the user input interface 150. For transmission of a user input, the remote controller 200 may operate based on various communication standards such as Bluetooth, RF communication, IR communication, UWB, and ZigBee.

In addition, the remote controller 200 may receive an audio signal, a video signal, or a data signal from the user input interface 150, and output the received signal as an image, sound, or vibration.

The block diagram of the image display apparatus 100 illustrated in FIG. 2 is an exemplary embodiment of the present disclosure. The image display apparatus 100 is shown in FIG. 2 as having a number of components in a given configuration. However, the image display apparatus 100 may include fewer components or more components than those shown in FIG. 2. Also, two or more components of the image display apparatus 100 may be combined into a single component or a single component thereof may be separated into two or more components. The functions of the components of the image display apparatus 100 as set forth herein are illustrative in nature and may be modified, for example, to meet the requirements of a given application.

Unlike the configuration illustrated in FIG. 2, the image display apparatus 100 may be configured so as to receive and play broadcast images through the network interface 130 or the external device interface 135, without the tuner 110 and the demodulator 120.

Figure 3:
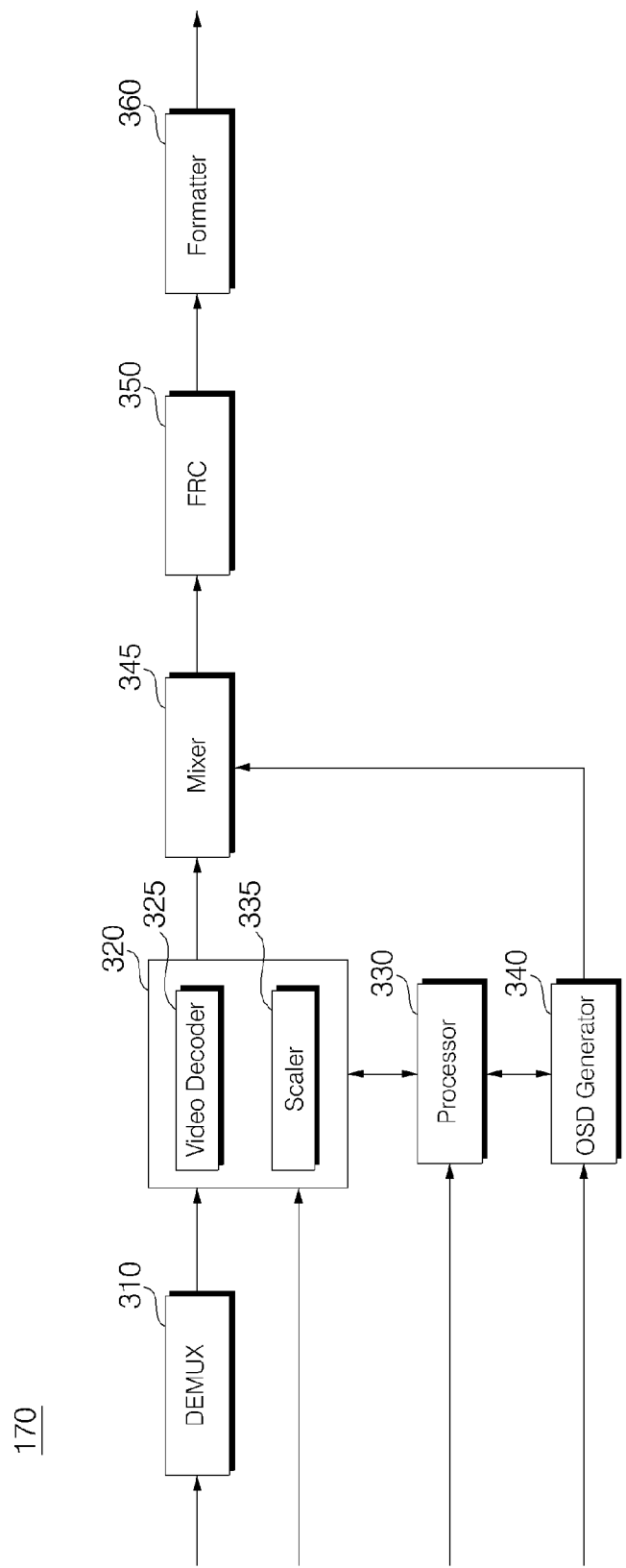
FIG. 3 is a block diagram illustrating a controller illustrated in FIG. 2.

FIG. 3 is a block diagram illustrating the controller illustrated in FIG. 2.

Referring to FIG. 3, the controller 170 may include a DEMUX 310, a video processor 320, a processor 330, an OSD generator 340, a mixer 345, a Frame Rate Converter (FRC) 350, and a formatter 360 according to an embodiment of the present disclosure. The controller 170 may further include an audio processor (not shown) and a data processor (not shown).

The DEMUX 310 demultiplexes an input stream. For example, the DEMUX 310 may demultiplex an MPEG-2 Transport Stream (TS) into an audio signal, a video signal, and a data signal. The input stream signal may be received from the tuner 110, the demodulator 120, or the external device interface 135.

The video processor 320 may process the demultiplexed video signal. For video signal processing, the video processor 320 may include a video decoder 325 and a scaler 335.

The video decoder 325 decodes the demultiplexed video signal, and the scaler 335 scales the resolution of the decoded video signal so that the video signal may be displayed on the display 180.

The video decoder 325 may be provided with decoders that operate in conformance to various standards.

The decoded video signal decoded by the video processor 320 is input to the mixer 345.

The processor 330 may provide overall control to the image display apparatus 100 or the controller 170. For example, the processor 330 may control the tuner 110 to tune to an RF broadcasting corresponding to a user-selected channel or a pre-stored channel.

The processor 330 may also control the image display apparatus 100 according to a user command received through the user input interface 150 or an internal program.

The processor 330 may control data transmission through the network interface 130 or the external device interface 135.

The processor 330 may control operations of the DEMUX 310, the video processor 320, and the OSD generator 340 in the controller 170.

The OSD generator 340 generates an OSD signal autonomously or according to a user input. For example, the OSD generator 340 may generate signals by which a variety of information is displayed as graphics or text on the display 180, according to user input signals or control signals. The OSD signal may include various data such as a UI, a variety of menus, widgets, and icons.

Further, the OSD generator 340 may generate a signal by which to display subtitles of broadcast images or EPG-based broadcasting information.

The OSD generator 340 may be referred to as a graphic processor in the sense that it generates an OSD signal or a graphic signal.

The mixer 345 may mix the decoded video signal processed by the video processor 320 with the OSD signal generated from the OSD generator 340. The mixed signal is provided to the formatter 360. As the OSD signal is mixed with the decoded video signal or an external input signal, an OSD may be overlaid on a broadcast image or an external input image.

The FRC 350 may change the frame rate of an input video signal or simply output the video signal without frame rate conversion.

The formatter 360 changes the format of the signal received from the FRC 350 adaptively to the display 180. For example, the formatter 360 may convert a received signal into an RGB data signal. The RGB data signal may be output in the form of a Low Voltage Differential Signal (LVDS) or mini-LVDS.

The formatter 360 may change the format of a 3D video signal or convert a 2D image to a 3D image.

The audio processor (not shown) of the controller 170 may process the demultiplexed audio signal. For audio signal processing, the audio processor may have a plurality of decoders.

The audio processor of the controller 170 may also adjust the bass, treble or volume of the audio signal.

The data processor (not shown) of the controller 170 may process the data signal obtained by demultiplexing the input stream signal. For example, if the data signal is an encoded signal, the data processor may decode the data signal. The coded data signal may be an EPG which includes broadcasting information specifying the starting time, ending time, and so on of scheduled broadcast TV or radio programs.

The block diagram of the controller 170 illustrated in FIG. 3 is an embodiment of the present disclosure. Depending on the specification of the controller 170, some components of the controller 170 may be combined, or omitted. Or new components may be added to the controller 170.

Particularly, the FRC 350 and the formatter 360 may be configured separately outside the controller 170.

Figure 4:
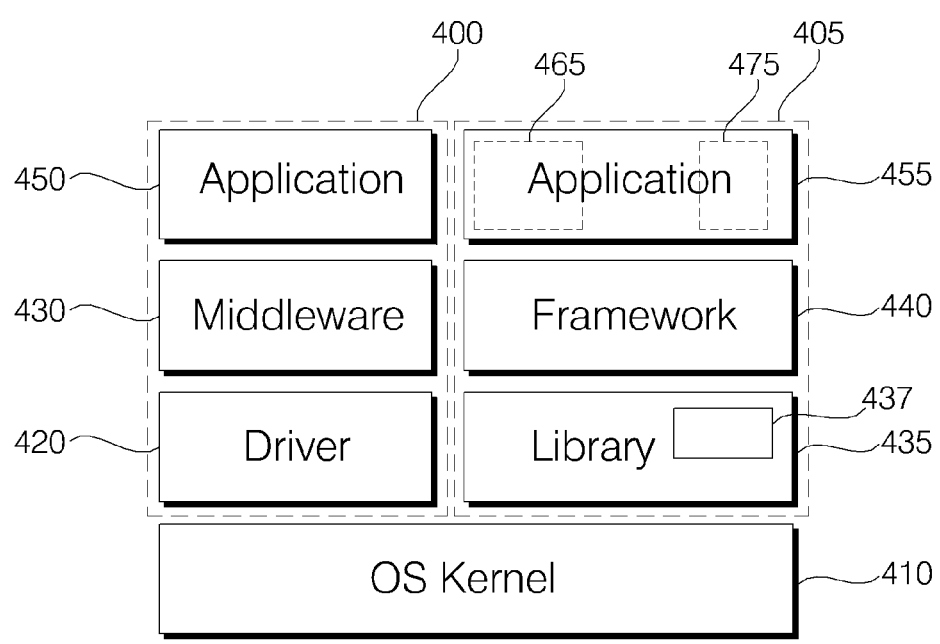
FIGS. 4 and 5 are views illustrating various examples of the architecture of a smart system platform in the image display apparatus illustrated in FIG. 2.
Figure 5:
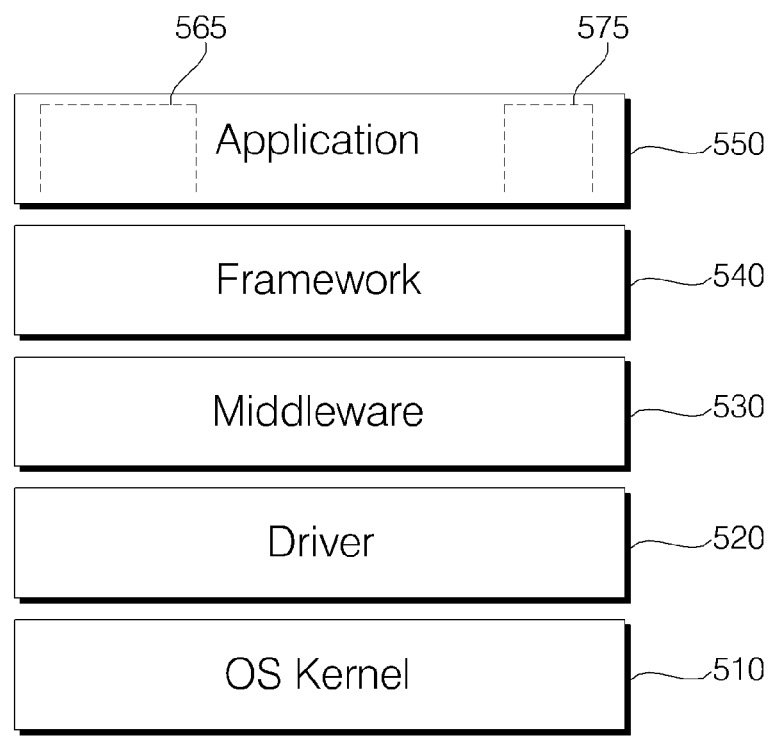

FIGS. 4 and 5 illustrate exemplary platform architectures for the image display apparatus illustrated in FIG. 2.

A platform for the image display apparatus 100 may have OS-based software to implement the above-described various operations according to an embodiment of the present disclosure.

Referring to FIG. 4, a platform for the image display apparatus 100 is a separate type according to an embodiment of the present disclosure. The platform may be designed separately as a legacy system platform 400 and a smart system platform 405. An OS kernel 410 may be used commonly for the legacy system platform 400 and the smart system platform 405.

The legacy system platform 400 may include a stack of a driver 420, middleware 430, and an application layer 450 on the OS kernel 410. On the other hand, the smart system platform 405 may include a stack of a library 435, a framework 440, and an application layer 455 on the OS kernel 410.

The OS kernel 410 is the core of an OS. When the image display apparatus 100 is driven, the OS kernel 410 may be responsible for operation of at least one of hardware drivers, security protection for hardware and processors in the image display apparatus 100, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wireless Fidelity (Wi-Fi) driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering as much data as a unit, because data is transmitted in blocks. The character device driver may not need a buffer since data is transmitted on a basic data unit basis, that is, on a character basis.

The OS kernel 410 may be implemented based on any of various OSs such as Unix (Linux) and Windows. The OS kernel 410 may be a general-purpose open OS kernel which may be implemented in other electronic devices.

The driver 420 is interposed between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, an HDMI, a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller 200, especially a 3D pointing device to be described below. The 3D pointing device driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 may provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display apparatus 100. The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 above the framework 440 includes a variety of programs that are executed and displayed in the image display apparatus 100. The application layer 455 may include, for example, a core application that is a suit having at least one solution of e-mail, Short Message Service (SMS), calendar, map, or browser. The application layer 455 may be written in Java.

In the application layer 455, applications may be categorized into user-undeletable applications 465 stored in the image display apparatus 100 that cannot be modified and user-installable or user-deletable applications 475 that are downloaded from an external device or a network and stored in the image display apparatus 100.

With the applications of the application layer 455, a variety of functions such as Internet telephony, Video ON Demand (VOD), Web album, Social Networking Service (SNS), Location-Based Service (LBS), map service, Web browsing, and application search may be performed through network access. In addition, other functions such as gaming and schedule management may be performed by the applications.

Referring to FIG. 5, a platform for the image display apparatus 100 according to another embodiment of the present disclosure is an integrated type. The integrated platform may include an OS kernel 510, a driver 520, middleware 530, a framework 540, and an application layer 550.

Compared to the separate-type platform illustrated in FIG. 4, the integrated-type platform is characterized by the absence of the library 435 and the application layer 550 being an integrated layer. The driver 520 and the framework 540 correspond to the driver 420 and the framework 440 of FIG. 4, respectively.

The library 435 of FIG. 4 may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, whereas the image display system middleware includes SSL as a security-related library, WebKit as a Web engine-related library, libc, and Media Framework as a media-related library. The middleware 530 may further include the afore-described runtime.

The application layer 550 may include a menu-related application, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus 100 and user-installable or user-deletable applications 575 that are downloaded from an external device or a network and stored in the image display apparatus 100.

The platforms illustrated in FIGS. 4 and 5 may be general-purpose ones that may be implemented in many other electronic devices as well as in the image display apparatus.

The platforms illustrated in FIGS. 4 and 5 may be stored or loaded in the memory 140, the controller 170, or any other processor (not shown).

Figure 6:
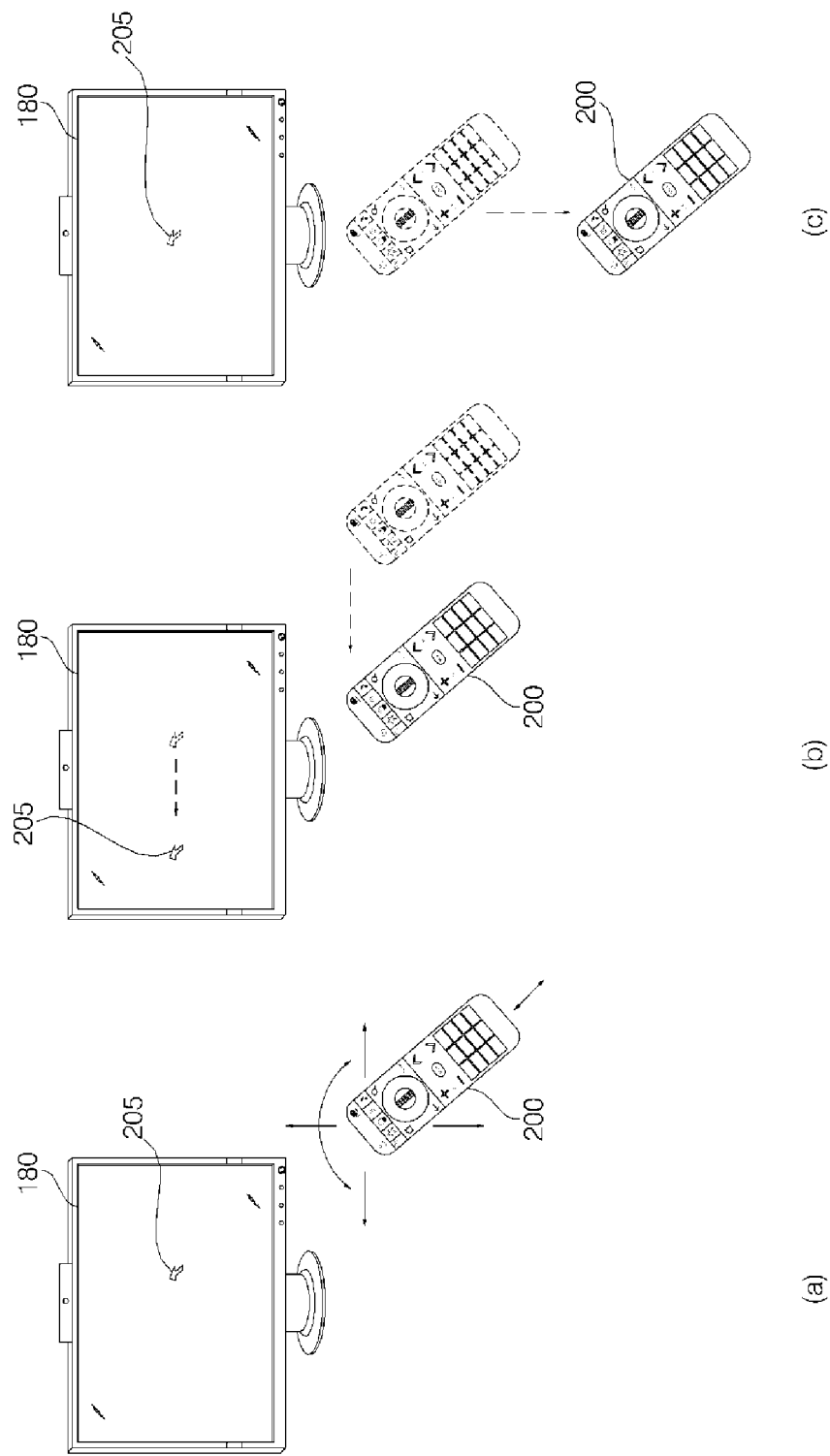
FIG. 6 is a view illustrating an exemplary operation method using the front surface of the remote controller illustrated in FIG. 1B.

FIG. 6 is a view illustrating an exemplary operation method using the front surface of the remote controller illustrated in FIG. 1B.

In FIG. 6, with the front surface of the remote controller 200 facing up, a pointer 205 is displayed in correspondence with a motion of the remote controller 200.

(a) of FIG. 6 illustrates the pointer 205 corresponding to the remote controller 200, displayed at a specific position on the display 180, by way of example.

The user may move or rotate the remote controller 200 up and down, side to side ((b) of FIG. 6), and back and forth ((c) of FIG. 6). The pointer 205 displayed on the display 180 of the image display apparatus represents movement of the remote controller 200. Since the pointer 205 moves in accordance with the movement of the remote controller 200 in a 3D space, the remote controller 200 may be referred to as a spatial remote controller or a 3D pointing device.

Referring to (b) of FIG. 6, if the user moves the remote controller 200 to the left, the pointer 205 also moves to the left on the display 180 of the image display apparatus.

A sensor of the remote controller 200 senses the movement of the remote controller 200 and transmits motion information corresponding to the result of the sensing to the image display apparatus. Then, the image display apparatus may calculate the coordinates of a target point to which the pointer 205 should be shifted based on the motion information. The image display apparatus may then display the pointer 205 at the calculated coordinates.

Referring to (c) of FIG. 6, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 may be zoomed out and thus contracted on the display 180. Meanwhile, when the remote controller 200 moves away from the display 180, the selection area may be zoomed out and when the remote controller 200 approaches the display 180, the selection area may be zoomed in.

With a predetermined button pressed in the remote controller 200, the up, down, left and right movements of the remote controller 200 may be ignored. That is, when the remote controller 200 moves away from or approaches the display 180, only the back and forth movements of the remote controller 200 may be sensed, while the up, down, left and right movements of the remote controller 200 may be ignored. Unless the predetermined button is pressed in the remote controller 200, the pointer 205 moves in accordance with the up, down, left or right movement of the remote controller 200.

The speed or direction of the pointer 205 may correspond to the speed or direction of the remote controller 200.

Figure 7:
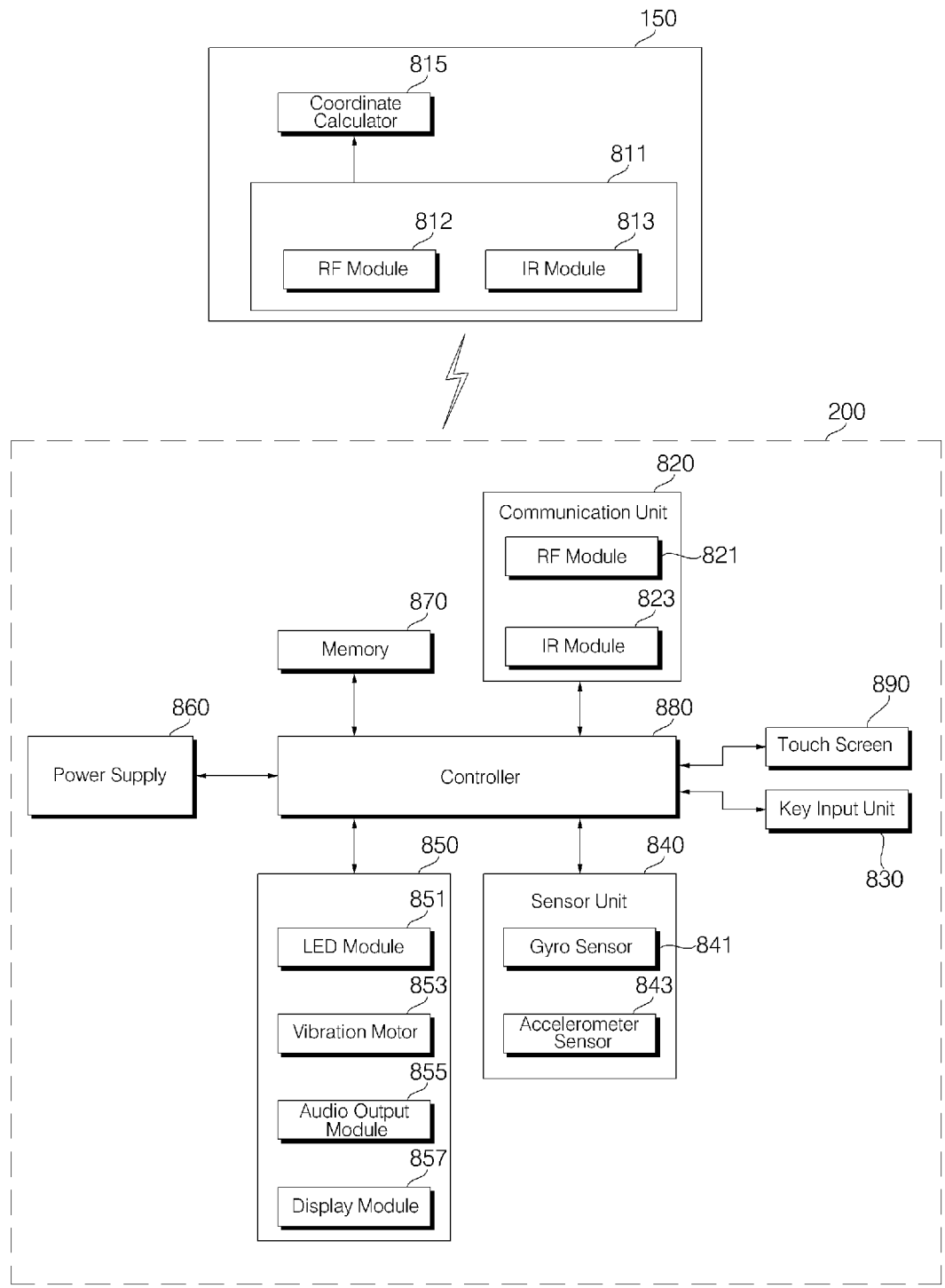
FIG. 7 is a block diagram illustrating the remote controller illustrated in FIGS. 1A, 1B, and 1C.

FIG. 7 is a block diagram illustrating the remote controller illustrated in FIGS. 1A, 1B, and 1C.

Referring to FIG. 7, the remote controller 200 may include a communication unit 820, the key input unit 830, a sensor unit 840, an output unit 850, a power supply 860, a memory 870, a controller 880, and the touch screen 890.

The communication unit 820 transmits signals to and/or receives signals from the image display apparatus 100 according to the foregoing embodiment of the present disclosure.

In the embodiment of the present disclosure, the communication unit 820 may include an RF module 821 for transmitting RF signals to and/or receiving RF signals from the image display apparatus 100 according to an RF communication standard. The communication unit 820 may also include an IR module 823 for transmitting IR signals to and/or receiving IR signals from the image display apparatus 100 according to an IR communication standard.

The remote controller 200 transmits motion information regarding the movement of the remote controller 200 to the image display apparatus 100 through the RF module 821 in the embodiment of the present disclosure.

The remote controller 200 may also receive signals from the image display apparatus 100 through the RF module 821. The remote controller 200 may transmit commands, such as a power on/off command, a channel switching command, or a sound volume change command, to the image display apparatus 100 through the IR module 823, as needed.

In the embodiment of the present disclosure, the key input unit 830 may include various operation keys (physical hot keys, scroll keys, and so on) arranged on the front surface of the remote controller 200, as described before with reference to FIG. 1B.

The user may enter a command for remotely controlling the image display apparatus 100 by manipulating the key input unit 830. If the key input unit 830 includes hard key buttons, the user may enter a command related to the image display apparatus 100 into the remote controller 200 by pushing a hard key button.

The key input unit 830 may also include various input tools other than those set forth herein, such as a scroll key and/or a jog key, which should not be construed as limiting the present disclosure.

The sensor unit 840 may sense the movement of the remote controller 200 and output information about the sensed movement. For this purpose, the sensor unit 840 may include a gyro sensor 841 or an accelerometer sensor 843.

The gyro sensor 241 may sense motion information about the remote controller 200. For example, the gyro sensor 841 may sense motion information about the remote controller 200 in x-, y-, and z-axis directions.

The accelerometer sensor 843 may sense speed information about of the remote controller 200. For example, the accelerometer sensor 843 may sense speed information about the remote controller 200 in x-, y-, and z-axis directions.

The sensor unit 840 may further include a distance sensor for sensing the distance between the remote controller 200 and the display 180.

The motion information output from the sensor unit 840 may include motion information about the remote controller 200, received from the gyro sensor 841 and speed information about the remote controller 200, received from the accelerometer sensor 843. The motion information output from the sensor unit 840 may further include distance information.

Further, function list information may be displayed on the touch screen 890 based on the motion information (e.g., sideway or vertical shaking) about the remote controller 200, received from the sensor unit 840.

The output unit 850 may output an audio or video corresponding to a manipulation of the key input unit 830 or a signal transmitted by the image display apparatus 100. The user may easily identify whether the key input unit 830 has been manipulated or whether the image display apparatus 100 has been controlled based on the audio or video signal output from the output unit 850.

For example, the output unit 850 may include a Light Emitting Diode (LED) module 851 which is turned on or off whenever the key input unit 830 is manipulated or whenever a signal is received from or transmitted to the image display apparatus 100 through the communication unit 820, a vibration module 853 which generates vibrations, an audio output module 855 which outputs audio data, or a display module 857 which outputs an image.

The power supply 860 supplies power to the remote controller 200. If the remote controller 200 is kept stationary for a predetermined time or longer, the power supply 860 may cut off supply of power to the remote controller 200 in order to save power. The power supply 860 may resume supply of power if a specific key on the remote controller 200 is manipulated.

The memory 870 may store various programs and application data for controlling or operating the remote controller 200. The remote controller 200 may wirelessly transmit signals to and/or receive signals from the image display apparatus 100 in a predetermined frequency band through the RF module 821. The controller 880 of the remote controller 200 may store information regarding the frequency band used for the remote controller 200 to wirelessly transmit signals to and/or wirelessly receive signals from the paired image display apparatus 100 in the memory 870 and may then refer to this information for use at a later time.

The controller 880 provides overall control to the remote controller 200.

The controller 880 may transmit a signal corresponding to a key manipulation detected from the key input unit 830 or a signal corresponding to a motion of the remote controller 200, as sensed by the sensor unit 840, to the image display apparatus 100 through the communication unit 820.

According to an embodiment of the present disclosure, the controller 880 may control the touch screen 890 to display usage mode information indicating at least one usage mode in response to a user input to the key input unit 830.

The controller 880 may control the touch screen 890 to receive a first touch input for selecting at least one of at least one usage mode indicated by the usage mode information displayed on the touch screen 890, enter the usage mode selected by the first touch input, and control the touch screen 890 to display a UI corresponding to the selected usage mode. The controller 880 may control the touch screen 890 to further receive a second touch input to the UI corresponding to the selected usage mode.

The image display apparatus 100, particularly the user input interface 150 receives key manipulation information or motion information. For this purpose, the user input interface 150 may include a wireless communication unit 811.

The wireless communication unit 811 may include an RF module 812 for RF communication with the remote controller 200, and an IR module 813 for IR communication with the remote controller 200.

The user input interface 150 may further include a coordinate calculator 815 for calculating coordinates representing the position of the pointer corresponding to the movement of the remote controller 200.

On behalf of the coordinate calculator 815, the controller 170 may calculate the coordinates of the pointer. For this purpose, the user input interface 150 may transmit motion information about the remote controller 200 to the controller 170.

The remote controller 200 of the present disclosure may include the touch screen 890.

The user may enter a command related to the image display apparatus to the remote controller 200 by touching a soft key on the touch screen 890. The user may enter a command related to the image display apparatus 100 to the remote controller 200 by a soft key on the touch screen 890.

The touch screen 890 according to the present disclosure may include an ITO panel. The touch screen 890 may be implemented capacitively or resistively. A touch input on the touch screen 890 may be any of a short touch, a long touch, a multi-touch, a swipe input, and a pinch input. The short touch and the long touch are classified according to their touch durations, and each of the swipe input and the pinch input includes a bi-directional touch and drag.

Particularly, as the touch screen 890 is further configured in the remote controller 200 in the present disclosure, key buttons configured in a conventional remote controller may be displayed on the touch screen 890, thereby reducing the number of physical key buttons (hot keys) in the remote controller 200, relative to that in the conventional remote controller. As a consequence, fabrication cost may be reduced.

Figure 8:
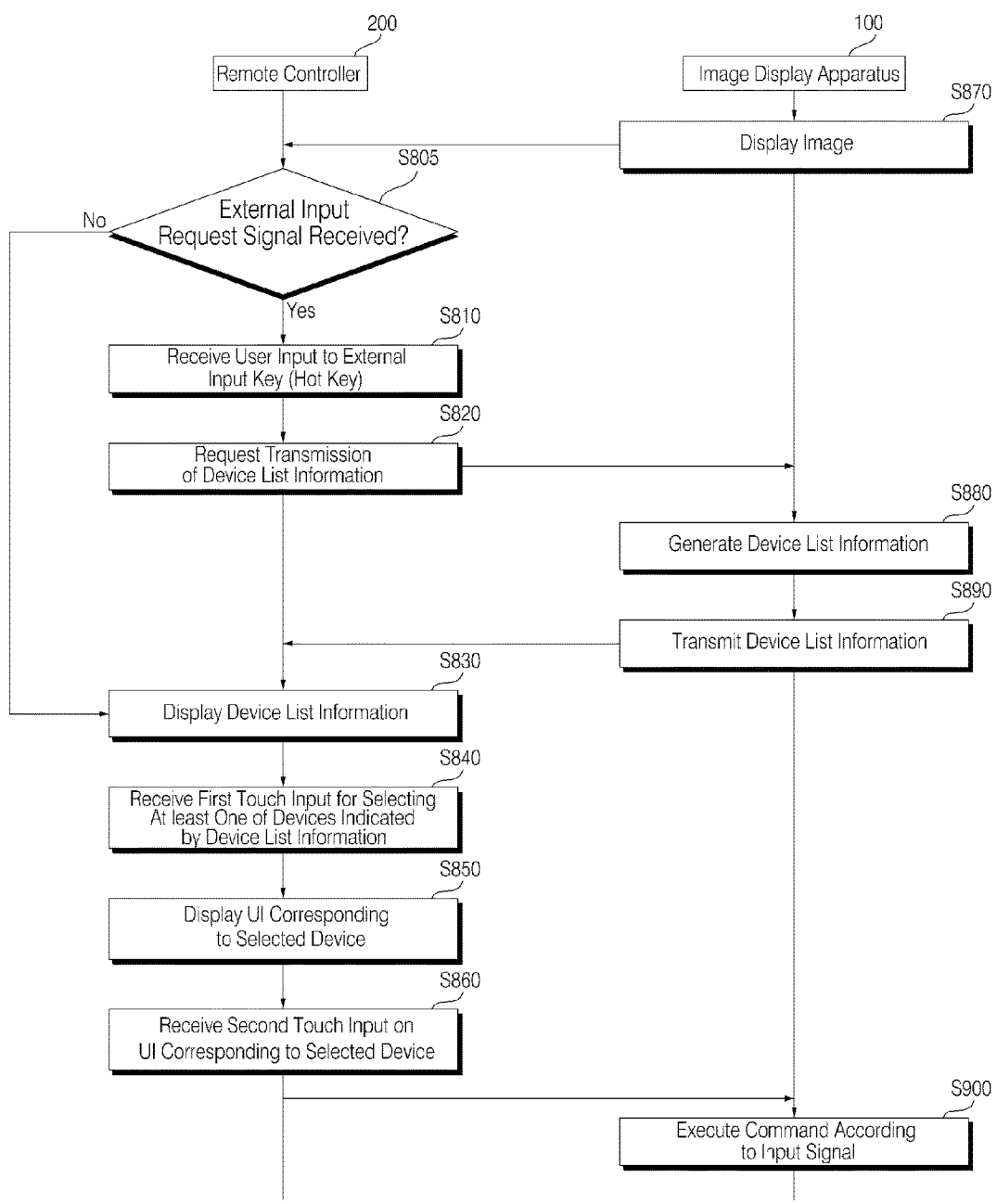
FIGS. 8 and 9 are flowcharts illustrating operation methods for transmitting and receiving data between a remote controller and an image display apparatus according to embodiments of the present disclosure.

FIG. 8 is a flowchart illustrating an operation method for transmitting and receiving data between a remote controller and an image display apparatus according to an embodiment of the present disclosure.

Referring to FIG. 8, the image display apparatus 100 of the present disclosure may display an image (S870). According to the present disclosure, the image may be pre-stored in the image display apparatus 100, received through the broadcasting receiver 105, or received from the outside through the network interface 130 or the external device interface 135.

While the image is being displayed on the image display apparatus 100, the remote controller 200 may receive a user input through the key input unit 830. According to the present disclosure, the key input unit 830 may include various hot keys as illustrated in FIG. 1B, and receive an input to the external input key 207 of the remote controller 200.

The remote controller 200 determines whether an external input request signal has been received (S805).

Upon receipt of an input to the external input key 207 of the remote controller 200 (S810), the remote controller 200 may transmit to the image display apparatus 100 a request signal for transmission of usage mode information including device list information including information about a device list (S820).

For example, upon operation of the external input key in the key input unit, the controller 880 of the remote controller 200 receives device list information about the image display apparatus 100, indicating a list of external devices, and control display of the device list information on the touch screen.

Upon selection of one of thumbnail images representing the external devices, the controller 880 may control display of an image corresponding to the selected external device in the image display apparatus 100.

According to the present disclosure, the usage mode information may include device list information or function list information. The device list information may include information about a list of the external devices 600, 650, and 680 connected to the image display apparatus 100, and the function list information may include information about a list of functions of the image display apparatus 100, based on user inputs configured in the key input unit 830 of the remote controller 200.

For example, the device list information may include information about a list of the external devices 600, 650, and 680, such as HDMI information for connection to a set-top box, a BD player, or the like, connection information about a USB connector, real-time broadcasting information, or connection information for broadcasting reception through a cable or a satellite.

The function list information may include information about functions of the image display apparatus 100, such as an audio play function, a zoom function including a magic zoom or a pinch zoom, an EPG search function through a set-top box, and an auto channel complete function for Web browsing.

In another embodiment of the present disclosure, while the usage mode information may be activated by a physical key input (push) through the key input unit 830 of the remote controller 200, the usage mode information may be displayed by a touch input to the touch screen 890 of the remote controller 200.

Upon receipt of the request signal for transmission of device list information, the image display apparatus 100 may generate device list information based on the request signal (S880) and transmit the generated device list information to the remote controller (S890).

The device list information may be pre-stored in the memory 140. The device list information may be updated in real time according to connection states between the external devices 600, 650, and 680 and the image display apparatus 100, and stored in the memory 140. Alternatively or additionally, the device list information may be pre-stored in the memory 870 of the remote controller 200.

Upon receipt of the device list information from the image display apparatus 100, the remote controller 200 may display the device list information (S830).

Specifically, the image display apparatus 100 may transmit the generated device list information to the remote controller 200 through the user input interface 150 of the image display apparatus 100, and the remote controller 200 may output the device list information received through the communication unit 820 on the touch screen 890.

According to the present disclosure, as the device list information is displayed on the image display apparatus 100, the device list information may also be displayed on the touch screen 890 of the remote controller 200. Alternatively or additionally, the device list information may be displayed only in the remote controller 200. Therefore, the user may view usage mode information including the device list information on the touch screen 890 of the remote controller 200 which is near to the user relative to the image display apparatus 100, without viewing the display of the image display apparatus 100.

The remote controller 200 may receive a first touch input for selecting at least one of devices indicated by the device list information displayed on the touch screen 890 (S840). That is, the controller 880 of the remote controller 200 may control the touch screen 890 to receive the first touch input for selecting at least one of the devices indicated by the device list information displayed on the touch screen 890.

According to an embodiment of the present disclosure, the touch screen 890 may include a small-size display configured as a single line or multi-line display. Preferably, the touch screen 890 may include a small-size display with a horizontal length of about 4 to 5 cm and a vertical length of about 1 cm. According to an embodiment of the present disclosure, the single line display may display at least one of text including characters, numbers, special characters, symbols, and so on, or a thumbnail image.

According to the present disclosure, a single line may mean that in the case of text, the text is confined in a single line. However, depending on the size of text, the text may be displayed in two or more lines on the small-size display. In the case of thumbnail images, the thumbnail images may also be displayed in an area corresponding to one or more lines of text.

Figure 14A:
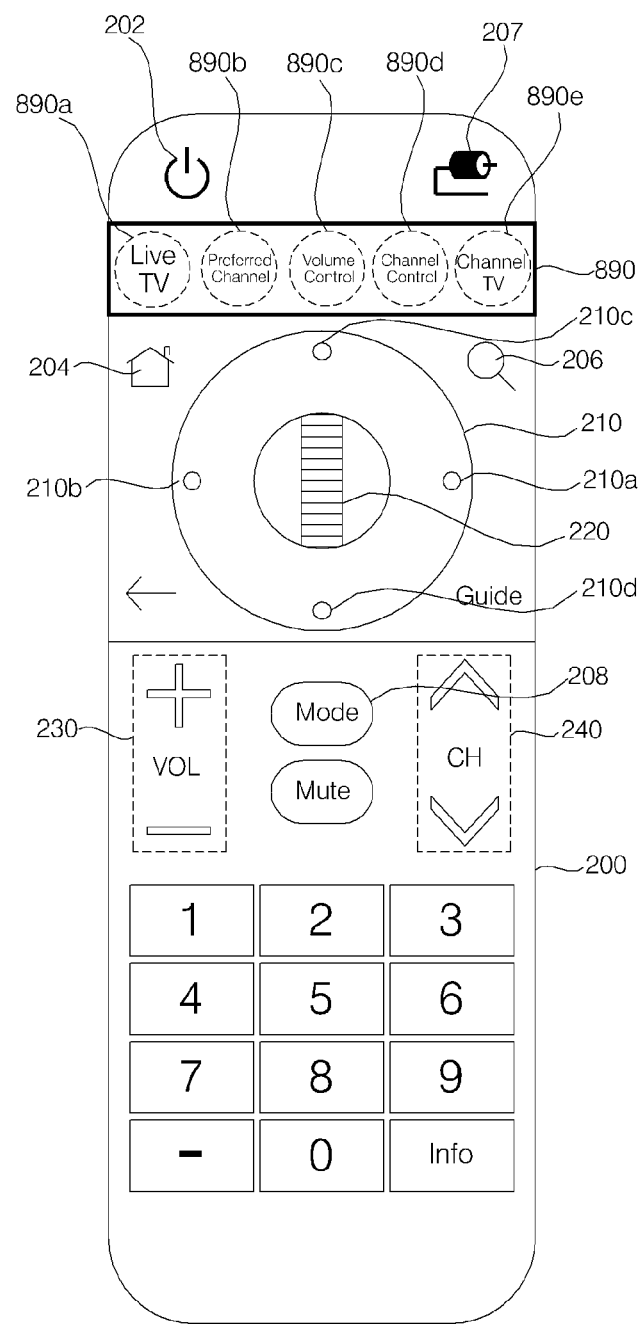

According to an embodiment of the present disclosure, a touch input for selecting at least one of devices indicated by device list information displayed on the single line display may be a touch input for selecting at least one of text or thumbnail images. Usage modes indicated by the usage mode information may be displayed separately in boxes on the touch screen 890. For example, as illustrated in FIG. 14A, usage modes indicated by usage mode information may be displayed in separate regions 890a, 890b, 890c, 890d, and 890e on the touch screen 890, and the regions 890a, 890b, 890c, 890d, and 890e may be shaped into, but not limited to, circles. Each region may be formed into any of various shapes other than circle.

While the small-size display preferably includes five regions in the embodiment of the present disclosure, the present disclosure is not limited to the specific number of regions and the number of regions may be any other value according to the size of the small-size display.

According to an embodiment of the present disclosure, touch inputs may include a first touch input and a second touch input. Depending on a touch input duration, a touch input may be a short touch or a long touch. The touch input may also be a swipe or pinch input including a bi-directional touch and drag.

The controller 880 of the remote controller 200 may receive a first touch input for selecting at least one of the devices indicated by the device list information (S840), enter a usage mode of the device selected by the first touch input according to the received first touch input, and display a UI corresponding to the selected device (S850).

According to an embodiment of the present disclosure, a different UI may be displayed based on a usage mode of a device selected by a touch input to the touch screen 890 of the remote controller 200. Since each usage mode is identified by a different UI in this manner, the user may easily identify the usage mode.

The remote controller 200 may further include the memory 870 for storing UIs corresponding to at least one usage mode, and a UI corresponding to a selected usage mode may be a UI pre-stored in the memory 870. The controller 880 of the remote controller 200 may enter the usage mode of the device selected by the first touch input, and control the touch screen 890 to automatically display a UI pre-stored in the memory 870.

According to the present disclosure, each of the pre-stored UIs may include information about frequently used functions in a device corresponding to the UI.

For example, if a BD player mode is selected by the first touch input, information about frequently used functions in the BD player mode, such as BD power, BD home, disk menu, or disk information, may be provided as a UI, and at least one of the functions may be selected by a second touch input to the UI.

According to an embodiment of the present disclosure, a UI may be displayed on a small-size display configured as a single line display. The UI may be represented as at least one of text including characters, numbers, special characters, symbols, and so on, or a thumbnail image.

The controller 880 of the remote controller 200 may enter the usage mode of the device selected by the first touch input, display a UI corresponding to the selected device, and control the touch screen 890 to receive a second touch input to the UI corresponding to the selected device (S860). The second touch input of the present disclosure is a touch input to a different interface corresponding to a selected device, including a touch input to a plurality of functions available in the device. Further, the second touch input to the UI may be a touch input for selecting at least one of text or thumbnail images, and the UI may be represented in the form of boxes on the touch screen 890. The UI may be represented as circles instead of boxes on the touch screen 890. The shape in which a UI is represented is not limited to any specific shape.

The image display apparatus 100 may execute a command corresponding to the second touch input based on a second touch input signal received from the remote controller 200 (S900).

For example, upon input of the external input key 207, BD Player, Set-Top, Cable, and so on are displayed as device list information. If a BD player mode is selected by a first touch input to the displayed device list information, frequently used functions in the BD player mode, such as BD power, BD home, disk menu, or disk information may be provided as a UI. If BD home is selected by a second touch input to the UI, the image display apparatus 100 may enter a BD home screen.

Figure 9:
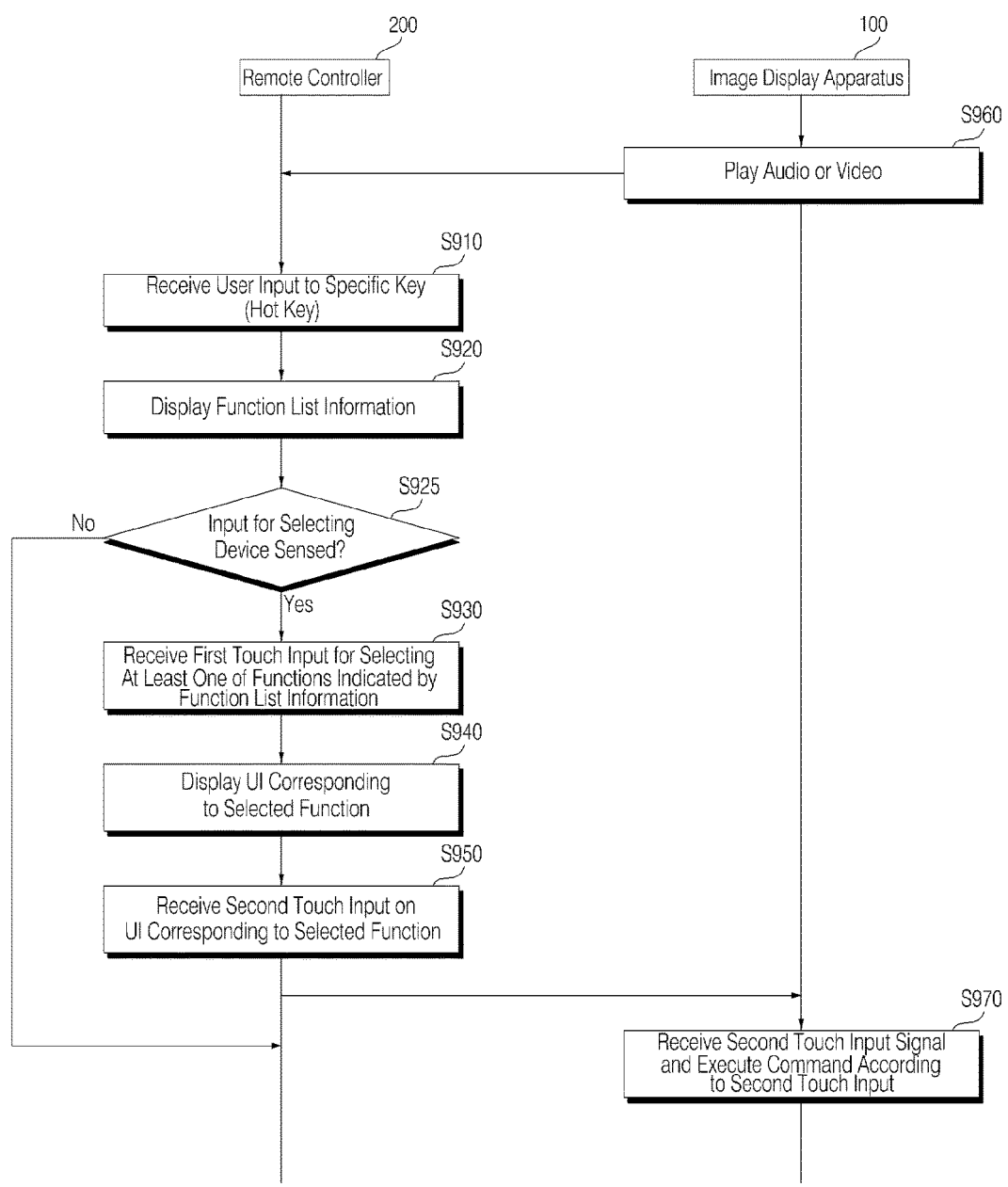

FIG. 9 is a flowchart illustrating an operation method for transmitting and receiving data between a remote controller and an image display apparatus according to another embodiment of the present disclosure.

Referring to FIG. 9, the image display apparatus 100 of the present disclosure may display an image or play an audio (S960). The remote controller 200 may receive a user input though the key input unit 830 during the image display or audio play (S910). With no image or audio play, a user input may also be received through the key input unit 830.

According to the present disclosure, the key input unit 830 may include various hot keys illustrated in FIG. 1B, and receive an input of a specific key such as the mode key 208 of the remote controller 200 from the user. The mode key 208 may include key information for accessing function list information indicating functions available in the image display apparatus 100, such as an audio play function, a zoom function including a magic zoom or pinch zoom, an EPG search function through a set-top box, and an auto channel complete function for Web browsing. Upon input of the mode key 208 of the remote controller 200, function list information may be displayed (S920).

Alternatively or additionally, the function list information may be displayed on the touch screen 890 based on motion information (e.g., sideway or vertical shaking) about the remote controller 200, as received from the sensor unit 840 of the remote controller 200.

According to the present disclosure, usage mode information may include device list information or function list information. The device list information may include information about a list of the external devices 600, 650, and 680 connected to the image display apparatus 100, and the function list information may include information about a list of functions of the image display apparatus 100, based on user inputs configured in the key input unit 830 of the remote controller 200.

For example, the function list information may include information about functions of the image display apparatus 100, such as an audio play function, a zoom function including a magic zoom or a pinch zoom, an EPG search function through a set-top box, and an auto channel complete function for Web browsing. These functions will be described in detail later.

The function list information may be pre-stored in the memory 140 of the image display apparatus 100. The function list information may be updated in real time according to connection states between the external devices 600, 650, and 680 and the image display apparatus 100, and stored in the memory 140.

Upon receipt of the function list information from the image display apparatus 100, the remote controller 200 may display the function list information. Particularly, function list information pre-stored in the memory 870 of the remote controller 200 may be displayed on the touch screen 890 in an embodiment of the present disclosure.

According to the present disclosure, as the function list information is displayed on the image display apparatus 100, the function list information may also be displayed on the touch screen 890 of the remote controller 200. Alternatively or additionally, the function list information may be displayed only in the remote controller 200. Therefore, the user may view the usage mode information including the function list information on the touch screen 890 of the remote controller 200 which is near to the user relative to the image display apparatus 100, without viewing the display of the image display apparatus 100.

The remote controller 200 may receive a first touch input for selecting at least one of functions indicated by the function list information displayed on the touch screen 890 (S930). That is, the controller 880 of the remote controller 200 may control the touch screen 890 to receive the first touch input for selecting at least one of the functions indicated by the function list information displayed on the touch screen 890.

For example, as illustrated in FIG. 14A, usage modes indicated by usage mode information may be displayed in the separate regions 890a, 890b, 890c, 890d, and 890e on the touch screen 890, and the regions 890a, 890b, 890c, 890d, and 890e may be shaped into, but not limited to, circles. Each region may be formed into any of various shapes other than circle.

While the small-size display preferably includes five regions in the embodiment of the present disclosure, the present disclosure is not limited to the specific number of regions and the number of regions may be any other value according to the size of the small-size display.

The controller 880 of the remote controller 200 may receive the first touch input for selecting at least one of the functions indicated by the function list information, and display a UI corresponding to the selected function (S940). Further, the controller 880 of the remote controller 200 may receive a second touch input to the UI (S950). The image display apparatus 100 may execute a command corresponding to the second touch input based on a second touch input signal received from the remote controller 200 (S970).

For example, upon receipt of a user input to the mode key 208 or a user input of sideway or vertical shaking sensed by the sensor unit 850, function list information indicating Capture, Sport, Magnifier, Music, and so on is displayed. If Music is selected by a first touch input to the function list information, a UI including frequently used functions related to music, such as music selection, repeat, screen-off, and hide may be displayed. If at least one (e.g., music selection) of the related functions is selected by a second touch input to the UI, the image display apparatus 100 may play a selected music.

According to an embodiment of the present disclosure, a different UI may be displayed based on a usage mode selected by a touch input to the touch screen 890 of the remote controller 200. Since each usage mode is identified by a different UI in this manner, the user may easily identify the usage mode.

Further, the remote controller 200 of the present disclosure may further include the memory 870 for storing a UI corresponding to at least one function indicated by function list information, and a UI corresponding to a selected function may be a UI pre-stored in the memory 870. The controller 880 of the remote controller 200 may enter the mode of the function selected by the first touch input and control the touch screen 890 to automatically display the UI pre-stored in the memory 870.

According to the present disclosure, each of the pre-stored UIs may include information about frequently used functions in a device corresponding to the UI.

According to an embodiment of the present disclosure, a UI may be displayed on a small-size display configured as a single line or multi-line display. The UI may include at least one of text including characters, numbers, special characters, symbols, and so on, or a thumbnail image.

According to an embodiment of the present disclosure, a second touch input to a UI may be a touch input for selecting at least one of text or thumbnail images. In response to the second touch input to the UI, the image display apparatus 100 may execute a command corresponding to the second touch input.

FIGS. 10A and 10B are exemplary views illustrating display of states of the image display apparatus 100 on the touch screen 890 of the remote controller 200.

Referring to FIG. 10A, if the image display apparatus 100 is powered off, a message indicating the off state of the image display apparatus 100 may be displayed on the touch screen 890 of the remote controller 200.

The controller 880 of the remote controller 200 may transmit an IR power-on signal to the image display apparatus 100 in response to a power-on key operation. Thus, the image display apparatus 100 is powered on.

After the image display apparatus 100 is powered on, the image display apparatus 100 may be paired with the remote controller 200. For example, if the powered-on image display apparatus 100 transmits a pairing request signal to the remote controller 200, the remote controller 200 may transmit a pairing response signal to the image display apparatus 100. The pairing request signal and the pairing response signal may be RF signals, not IR signals.

After the image display apparatus 100 and the remote controller 200 are paired, they may exchange data with each other. Particularly, the remote controller 200 may receive information about an operation state of the image display apparatus 100, and display the received operation state information on the touch screen 890.

Referring to FIG. 10B, if the image display apparatus 100 is being booted, a message indicating that booting is in progress in the image display apparatus 100 may be displayed on the touch screen 890 of the remote controller 200. Booting in progress may mean a stage after power-on and before pairing completion.

A message displayed on the touch screen 890 of the remote controller 200 may be at least one of text, a thumbnail image, or video content.

Besides the power-on/off state, a reproduction state of the image display apparatus 100 may be displayed in real time on the touch screen 890 of the remote controller 200.

FIGS. 11 to 16 are exemplary views referred to for describing an operation method for transmitting and receiving data between the remote controller 200 and the image display apparatus 100 according to an embodiment of the present disclosure.

Referring to FIG. 11, the image display apparatus 100 may include the display 180, and at least one object 181 and 182 may be displayed on the display 180.

According to an embodiment of the present disclosure, the at least one object 181 is used to display a specific function for controlling the image display apparatus 100. If the user selects the specific function, the function may be executed. Particularly, a frequently used function such as music player, external input, or environment setting in the image display apparatus 100 may be configured to be displayed on the display 180.

According to an embodiment of the present disclosure, the at least one object 182 represents a list of applications configured in the image display apparatus 100. The applications may be default applications in the image display apparatus 100 or may be downloaded from the external server 600a or the like. Particularly in the present disclosure, if a specific object is selected, an application corresponding to the selected object may be displayed marked (not shown). Further, the at least one object 182 may include an object 182a corresponding to a recent application.

The at least one object 181 and 182 may be selected by manipulating a specific key (e.g., the 4-directional key 210 or the wheel key 220) of the remote controller 200 or by a pointer displayed based on a pointing signal.

According to an embodiment of the present disclosure, while an image is being displayed in the image display apparatus 100, the remote controller 200 illustrated in FIG. 11 may receive a user input through the key input unit 830. The key input unit 830 of the present disclosure may include various hot keys illustrated in FIG. 1B, and receive an input of the external input key 207 of the remote controller 200 from the user.

Upon receipt of the input of the external input key 207 of the remote controller 200 from the user, the remote controller 200 may transmit a request signal for transmission of usage mode information including device list information to the image display apparatus 100.

For example, the device list information may include information about a list of the external devices 600, 650, and 680, such as HDMI information for connection to a set-top box, a BD player, or the like, connection information about a USB connector, real-time broadcasting information, or connection information for broadcasting reception through a cable or a satellite.

If the specific object 181 is selected from among the objects displayed on the display 180 of the image display apparatus 100, a function corresponding to the object 181 may be executed. Particularly, upon selection of an object 181a representing external input as illustrated in FIG. 11, device list information may be displayed on the touch screen 890 as illustrated in FIG. 12.

According to an embodiment of the present disclosure, the device list information may be pre-stored in the memory 140 of the image display apparatus 100. The device list information may be updated in real time according to connection states between the external devices 600, 650, and 680 and the image display apparatus 100, and stored in the memory 140. The device list information may be pre-stored in the memory 870 of the remote controller 200.

As the device list information is displayed on the image display apparatus 100, the device list information may also be displayed on the touch screen 890 of the remote controller 200. Alternatively or additionally, the device list information may be displayed only in the remote controller 200. Therefore, the user may view usage mode information including the device list information on the touch screen 890 of the remote controller 200 which is near to the user relative to the image display apparatus 100, without viewing the display of the image display apparatus 100.

Figure 12:
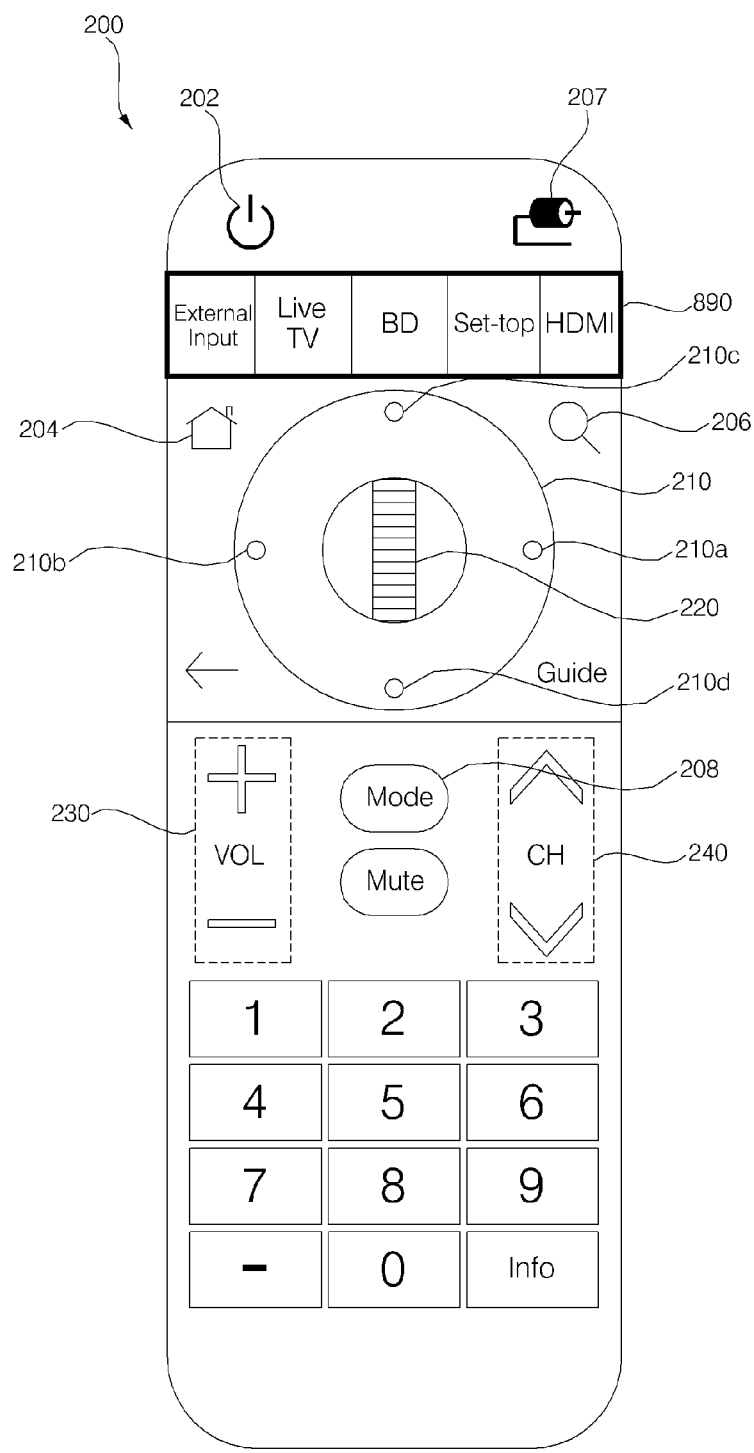

As illustrated in FIG. 12, the touch screen 890 may include a small-size display configured as a single line or multi-line display. Preferably, the touch screen 890 may include a small-size display with a horizontal length of about 4 to 5 cm and a vertical length of about 1 cm. According to an embodiment of the present disclosure, the single line display may display at least one of text including characters, numbers, special characters, symbols, and so on, or a thumbnail image.

According to the present disclosure, a single line may mean that in the case of text, the text is confined in a single line. However, depending on the size of text, the text may be displayed in two or more lines on the small-size display. In the case of thumbnail images, the thumbnail images may also be displayed in an area corresponding to one or more lines of text.

According to an embodiment of the present disclosure, a touch input for selecting at least one of devices indicated by device list information displayed on the single line display may be a touch input for selecting at least one of text or a thumbnail image. Each piece of information corresponding to the usage mode information may be displayed separately in a box on the touch screen 890. Usage modes indicated by the usage mode information may be displayed separately in boxes on the touch screen 890. The usage modes may be represented as circles instead of boxes on the touch screen 890. The shape in which a usage mode is represented is not limited to any specific shape.

While the small-size display preferably includes five regions in the embodiment of the present disclosure, the present disclosure is not limited to the specific number of regions and the number of regions may be any other value according to the size of the small-size display.

According to an embodiment of the present disclosure, touch inputs may include a first touch input and a second touch input. Depending on a touch input duration, a touch input may be a short touch or a long touch. The touch input may also be a swipe or pinch input including a bi-directional touch and drag.

Referring to FIGS. 13A to 13H, according to an embodiment of the present disclosure, the remote controller 200 may receive a first touch input for selecting at least one of devices indicated by device list information displayed on the touch screen 890. That is, the controller 880 of the remote controller 200 may control the touch screen 890 to receive the first touch input for selecting at least one of the devices indicated by the device list information displayed on the touch screen 890.

Alternative or additionally, the controller 880 of the remote controller 200 may control the touch screen 890 to receive the first touch input for selecting at least one of the devices indicated by the device list information displayed on the touch screen 890, enter a usage mode of the device selected by the first touch input according to the received first touch input, and display a UI corresponding to the selected device.

Figure 13A:
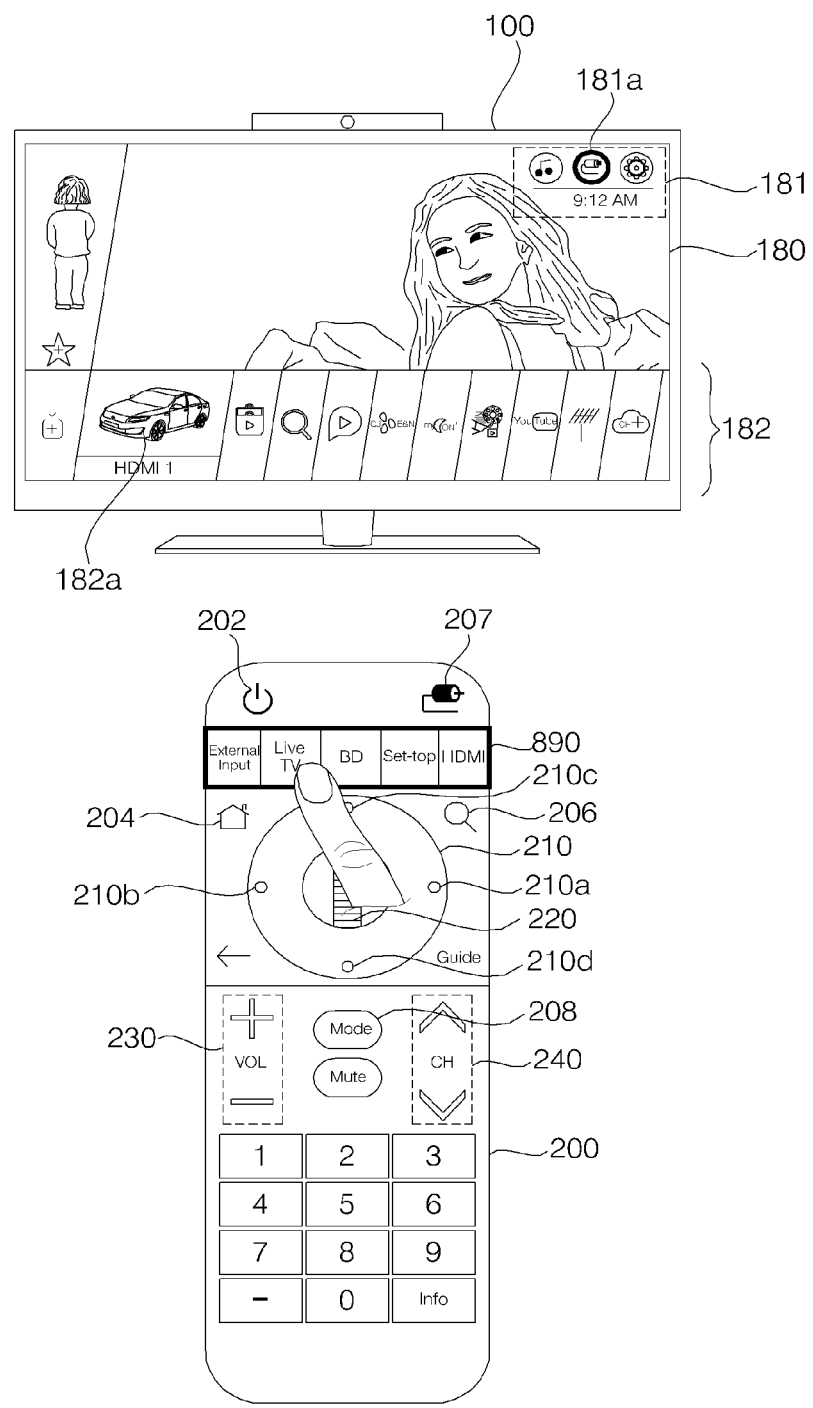
Figure 13B:
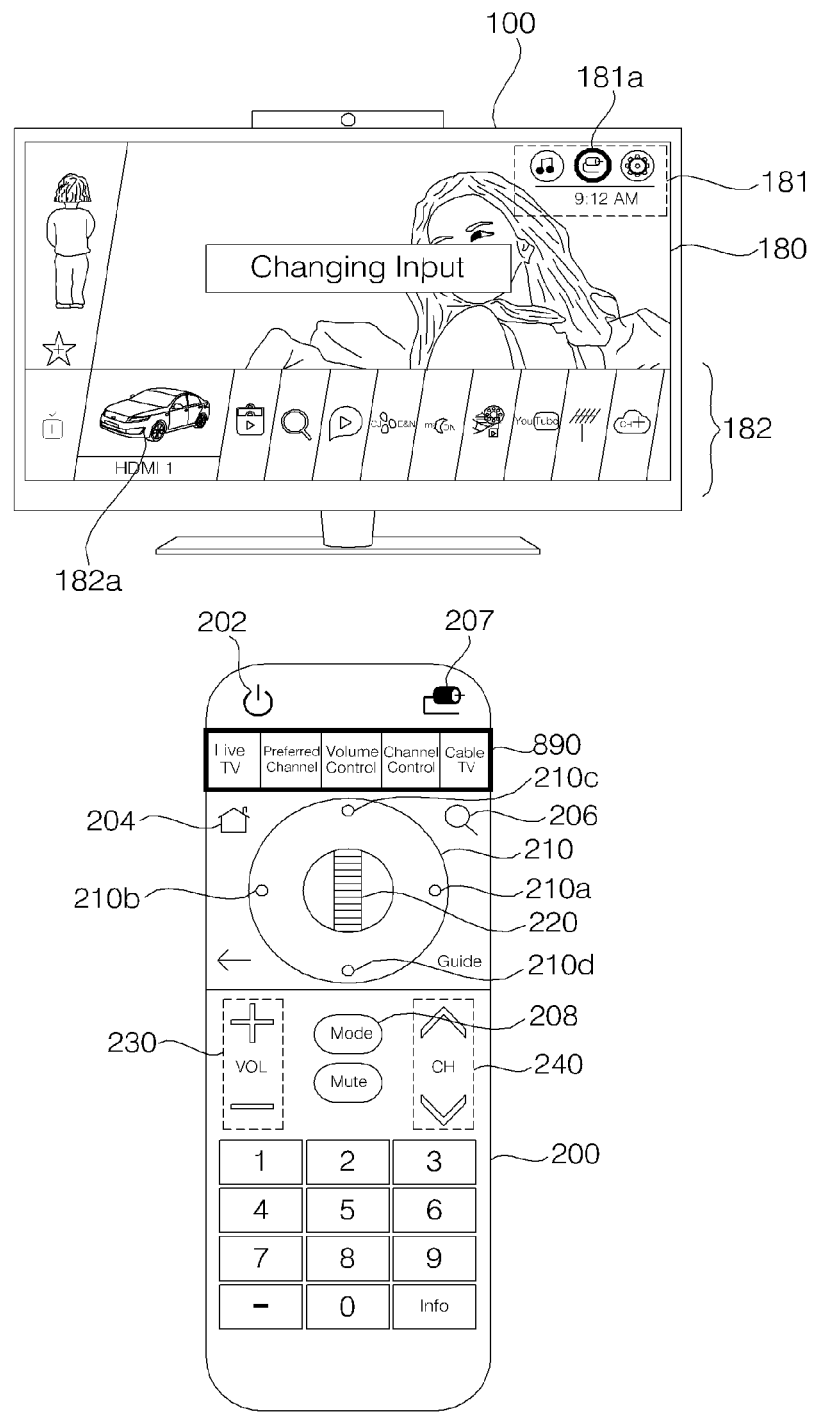

For example, referring to FIG. 13A, upon receipt of a first touch input for selecting Live TV, one of a plurality of devices indicated by the device list information, the image display apparatus 100 may display a notification indicating a mode changing state. Referring to FIG. 13B, the touch screen 890 of the remote controller 200 may display a UI corresponding to the Live TV mode.

Figure 13C:
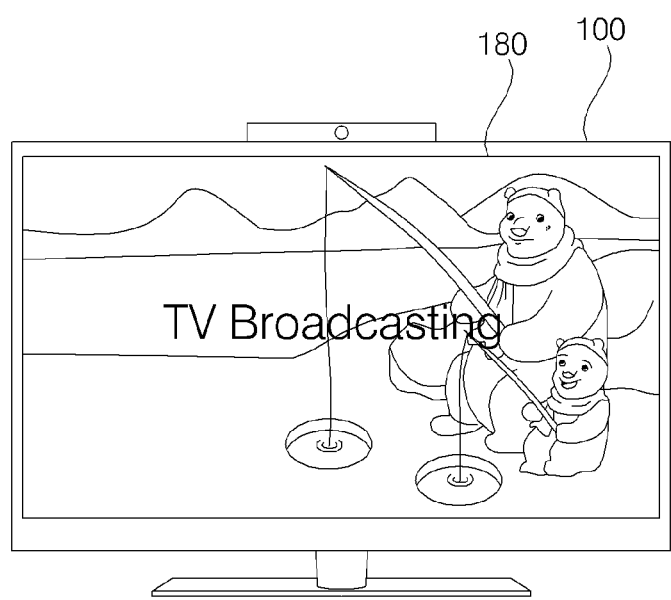

Referring to FIG. 13C, if the Live TV mode is entered, a mode entry result may be displayed, so that the user may be aware that the current mode is the Live TV mode.

Figure 13D:
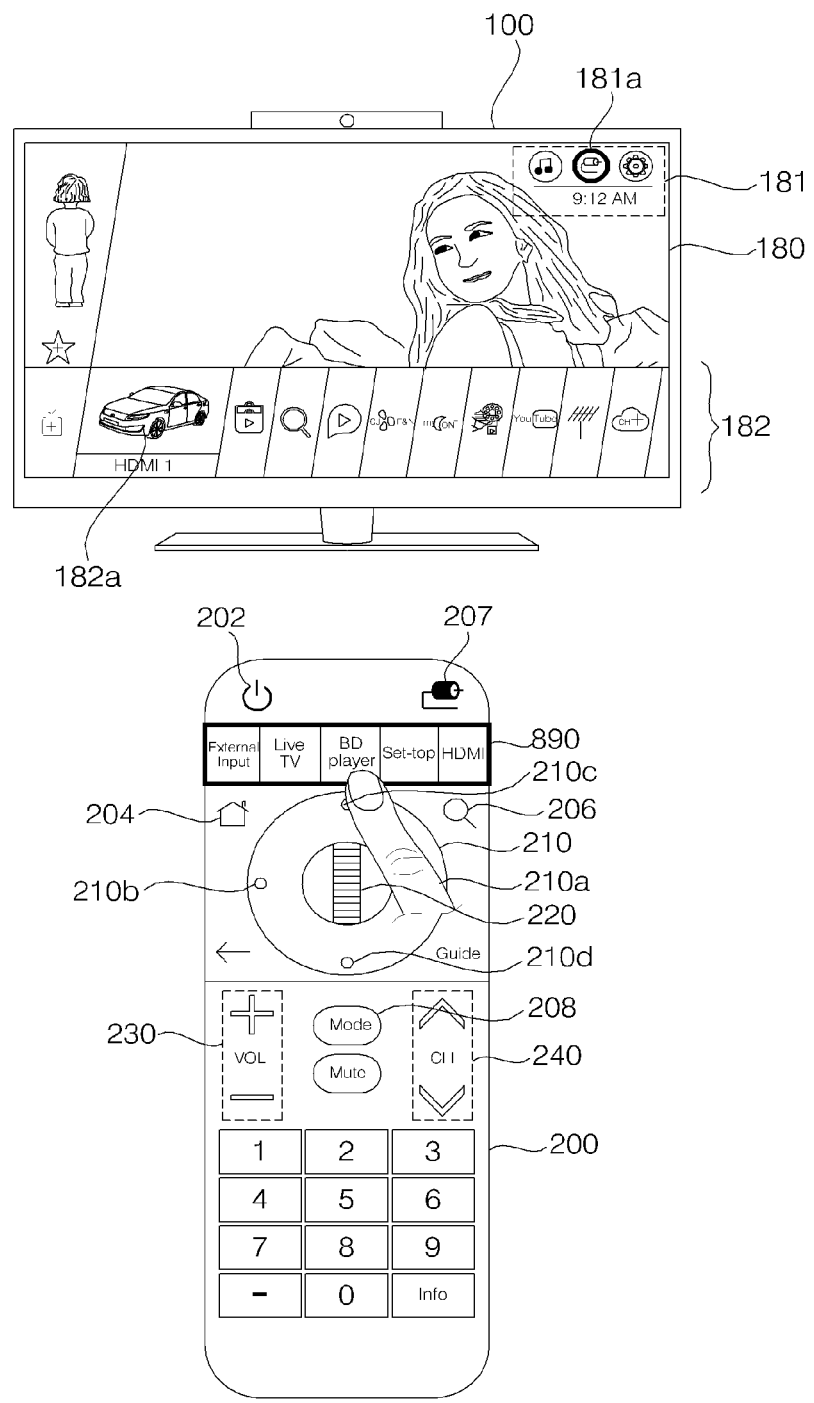
Figure 13E:
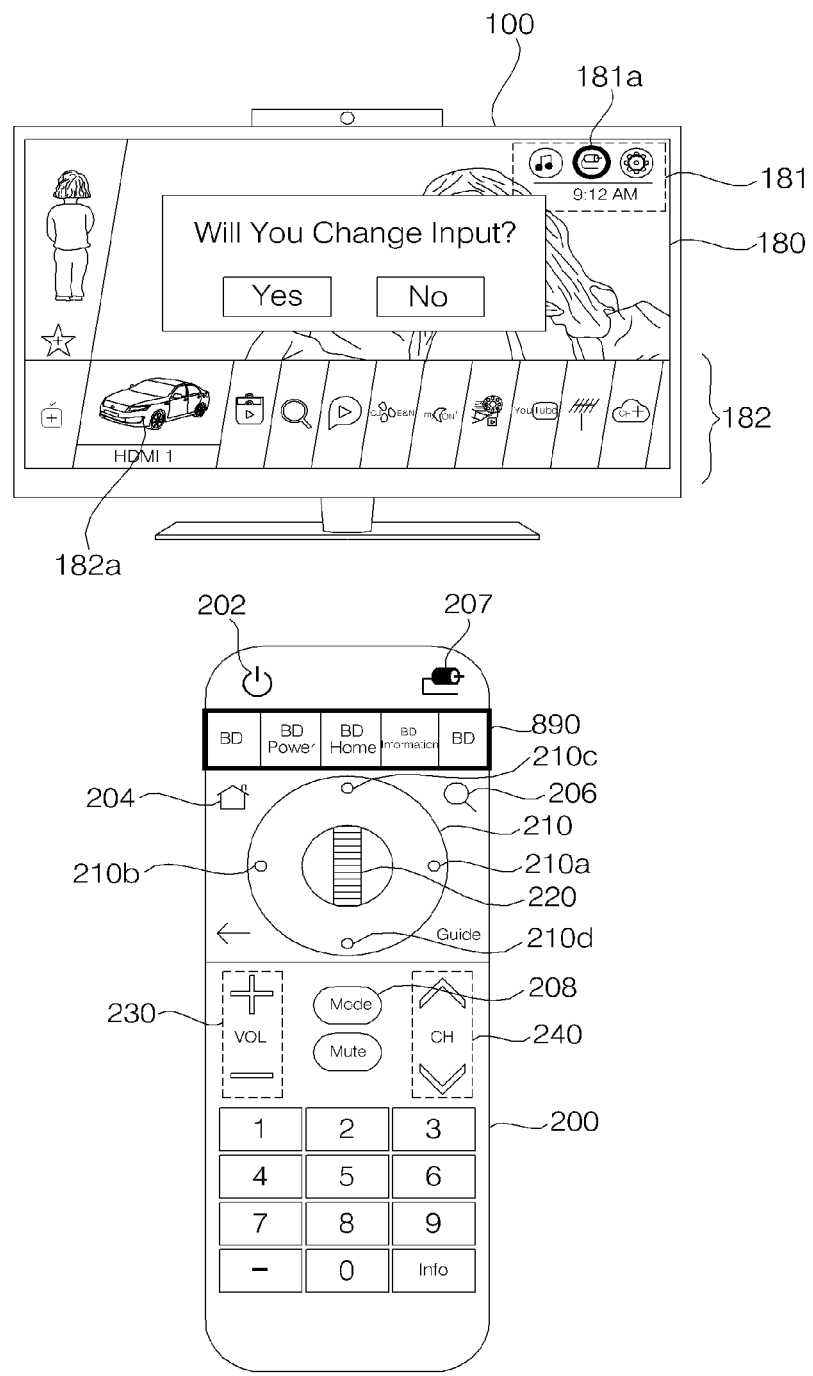
Figure 13F:
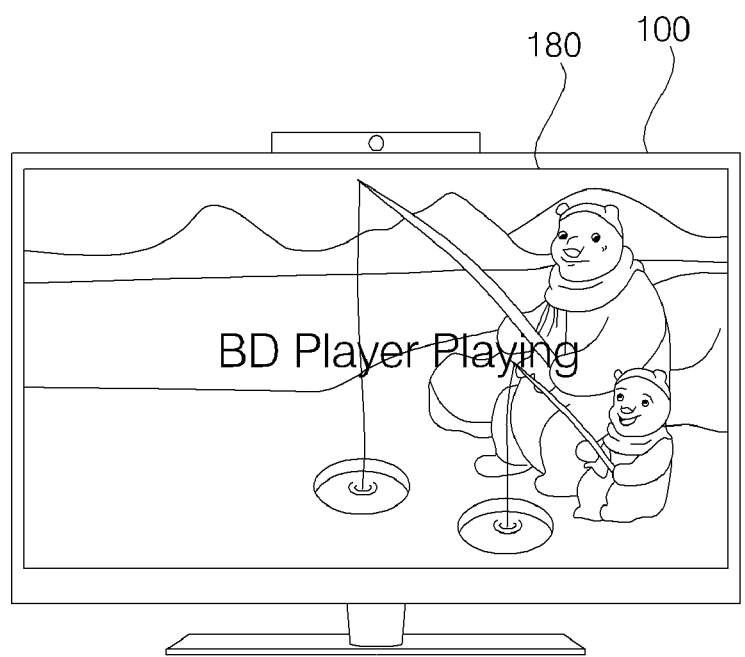

Upon receipt of a first touch input for selecting BD player, one of the devices indicated by the device list information as illustrated in FIG. 13D, the image display device 100 may display a screen asking the user whether the mode is to be changed and a UI corresponding to the BD player mode may be displayed, as illustrated in FIG. 13E. Referring to FIG. 13F, a result of entering the BD player mode is displayed, so that the user may be aware that the current mode is the BD player mode.

Figure 13G:
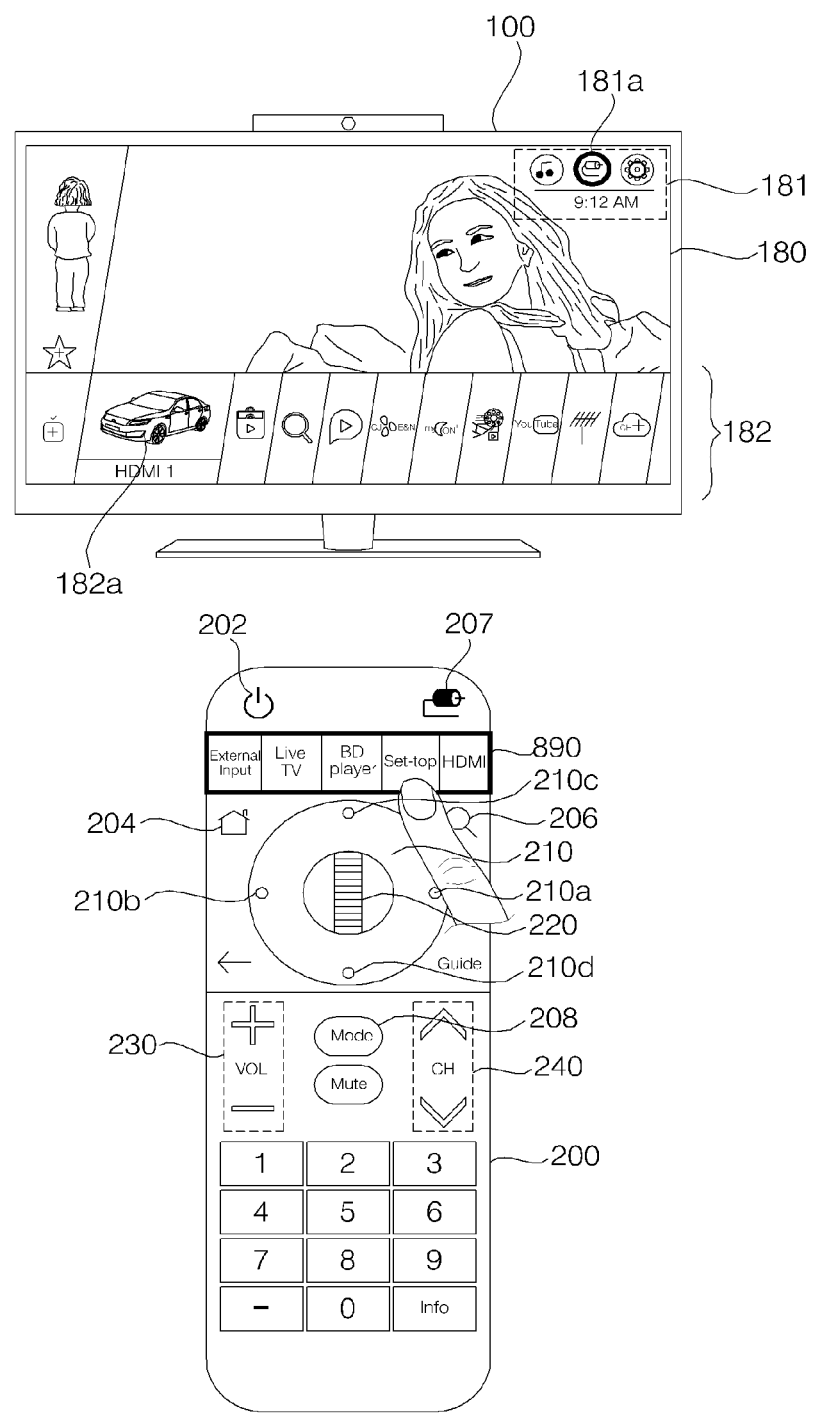
Figure 13H:
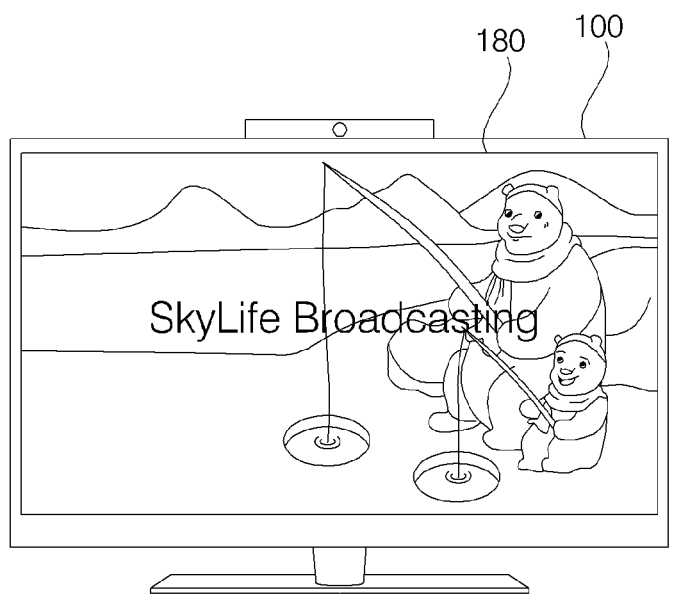

Upon receipt of a first touch input for selecting Set-Top, one of a plurality of devices indicated by the device list information as illustrated in FIG. 13G, a result of entering the set-top mode is displayed as illustrated in FIG. 13H so that the user may be aware that the current mode is the set-top mode. Herein, upon receipt of the first touch input, the image display apparatus 100 may automatically enter the set-top mode.

The controller 880 of the remote controller 200 may enter a usage mode of a device selected by a first touch input, and display a UI corresponding to the selected device. Further, the controller 880 of the remote controller 200 may control the touch screen 890 to receive a second touch input to the UI. The image display apparatus 100 may execute a command corresponding to the second touch input based on a second touch input signal received from the remote controller 200.

For example, upon input of the external input key 207, BD player, Set-Top, Cable, and so on are displayed as device list information. If the BD player mode is selected by a first touch input to the displayed device list information, information about frequently used functions in the BD player mode, such as BD power, BD home, disk menu, or disk information may be provided as a UI. If BD home is selected by a second touch input to the UI, the image display apparatus 100 may enter a BD home screen.

Figure 13I:
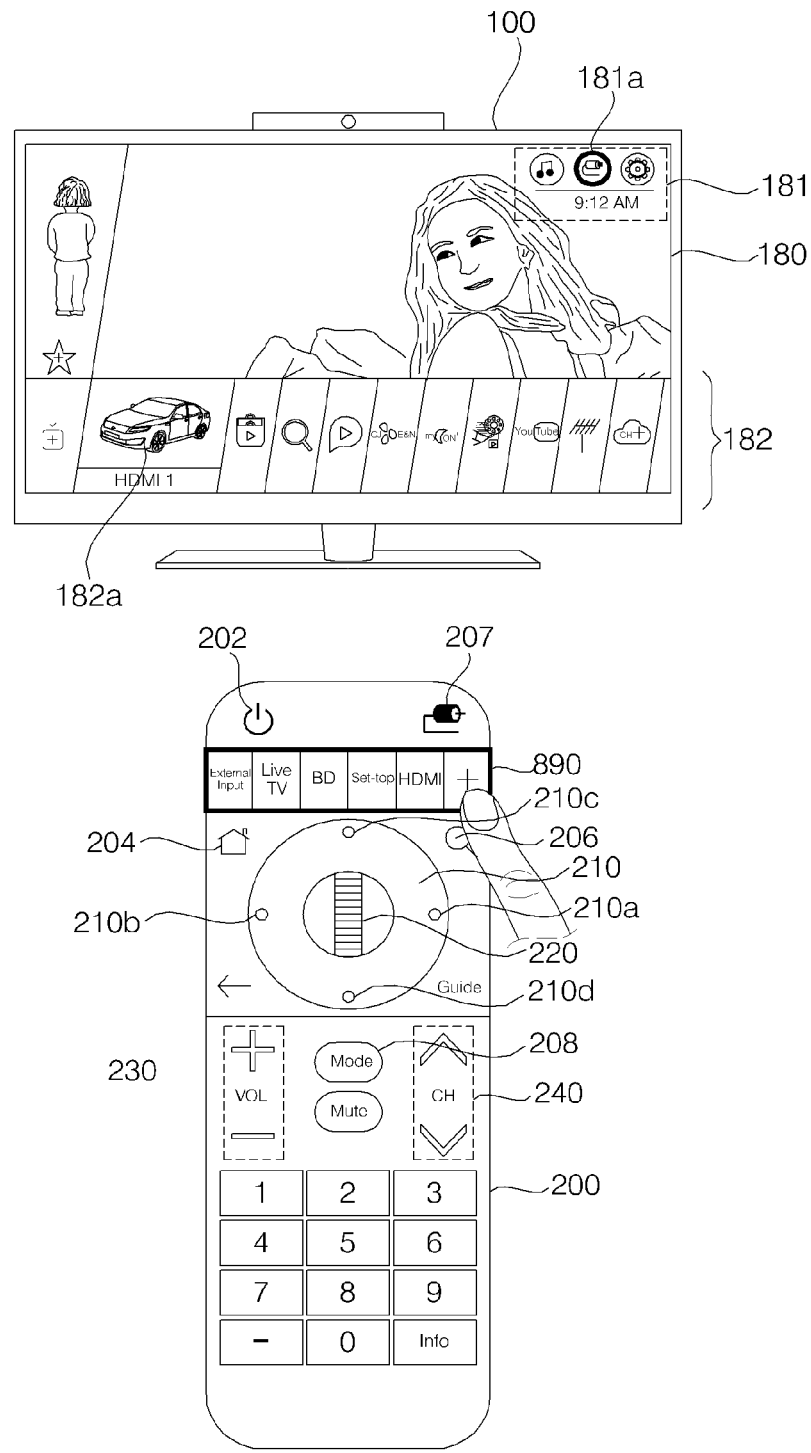
Figure 13J:
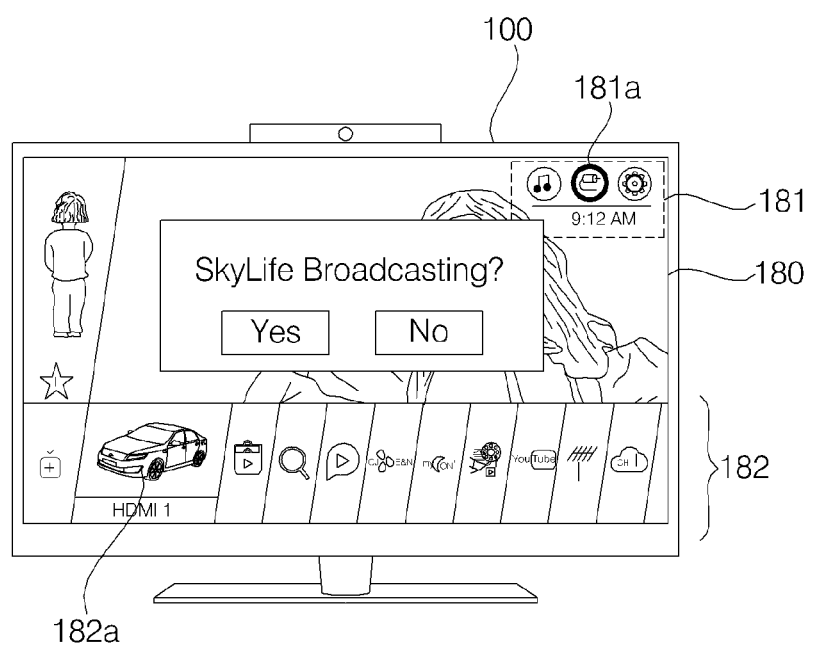
Figure 13K:
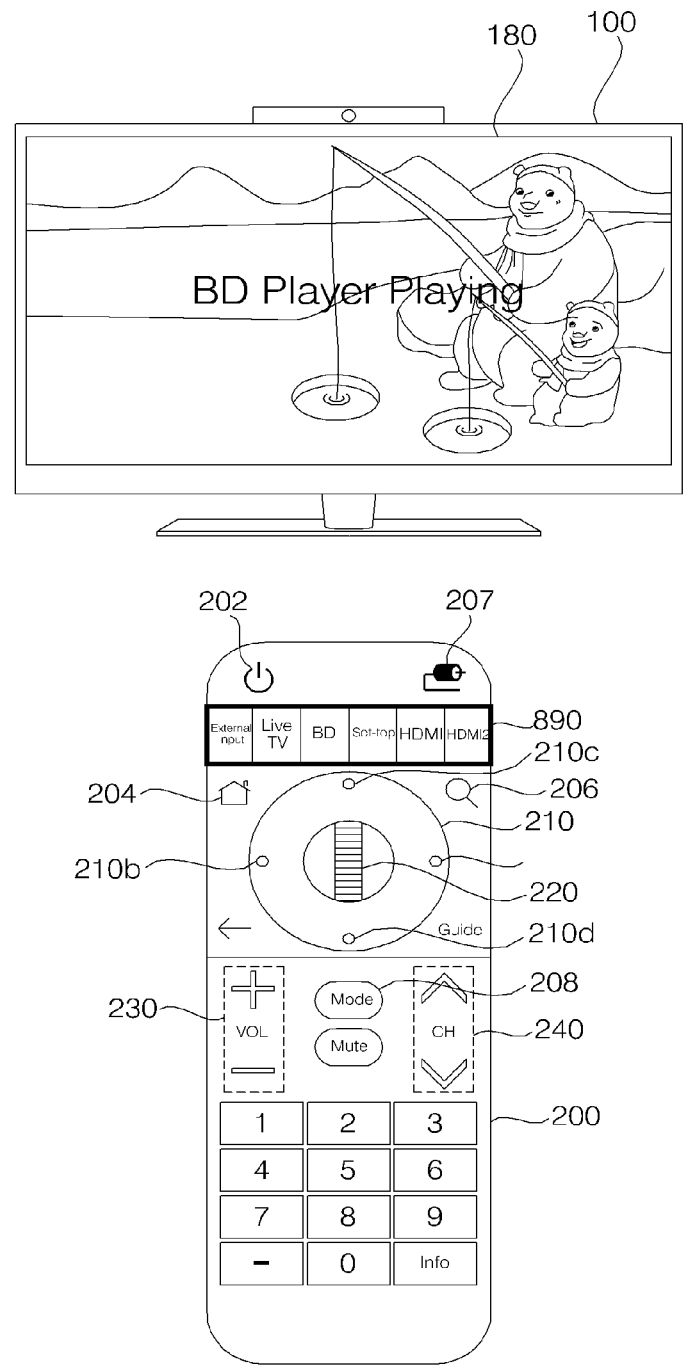

As illustrated in FIGS. 13I, 13J, and 13K, a new connected device may be added to the existing device list information.

In the presence of a touch input for adding a new connected device other than the devices corresponding to the existing device list information as illustrated in FIG. 13I, an input asking whether to add a device may be received as illustrated in FIG. 13J and a new device added state may be displayed as illustrated in FIG. 13K.

Figure 14B:
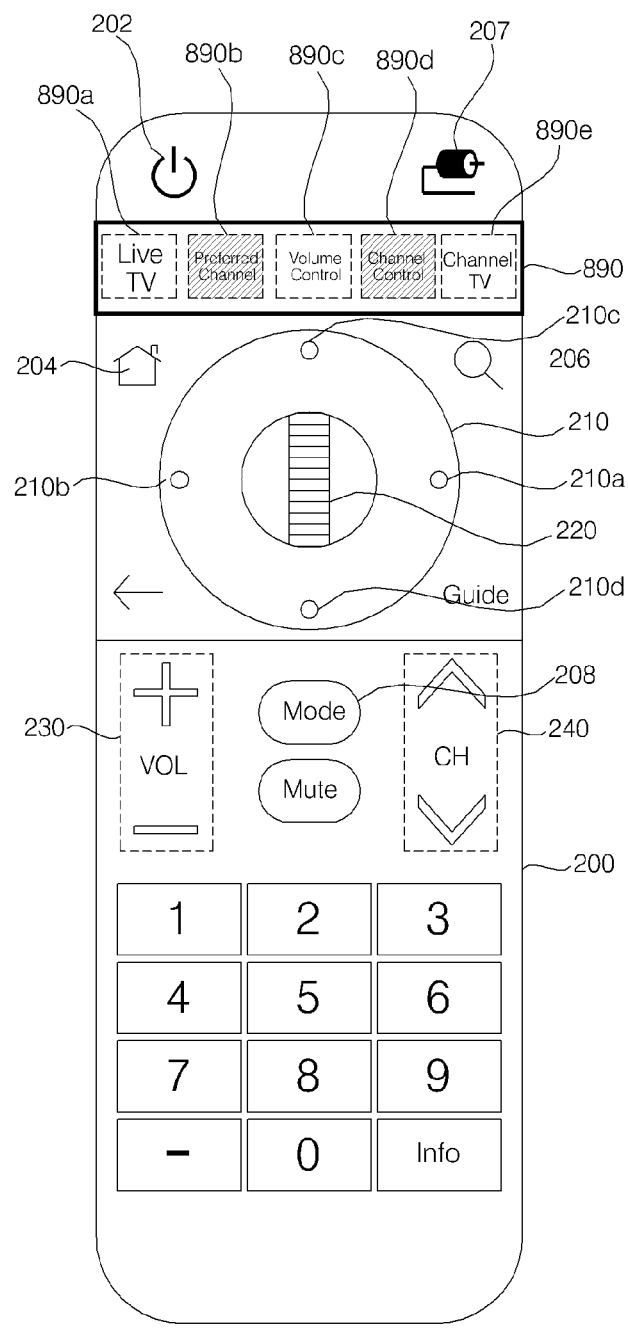

FIGS. 14A and 14B are exemplary views illustrating properties of a small-size display corresponding to the touch screen 890 of the remote controller 200.

Referring to FIG. 14A, devices corresponding to usage mode information may be represented separately in the respective regions 890a to 890e of the touch screen 890. Each of the regions 890a to 890e may be shaped into, but not limited to, circle.

Referring to FIG. 14B, various properties of each region, such as color and size may be changed. For example, the colors of some regions 890b and 890d may be changed to be different from those of the other regions 890a, 890c, and 890e.

While the small-size display preferably includes five regions in the embodiment of the present disclosure, the present disclosure is not limited to the specific number of regions and the number of regions may be any other value according to the size of the small-size display.

FIG. 15A to 16E are exemplary views illustrating display of a control object 891 for executing the function of a specific key (hot key) of the remote controller 200 on the touch screen 890 of the remote controller 200, upon pressing of the specific key (hot key).

According to an embodiment of the present disclosure, the controller 880 may control display of an object 183 for executing a function corresponding to a specific key included in the key input unit 830 on the display 180 of the image display apparatus 100, or another object 891 for executing the function corresponding to the specific key included in the key input unit 830 on the touch screen 890 of the remote controller 200.

Figure 15A:
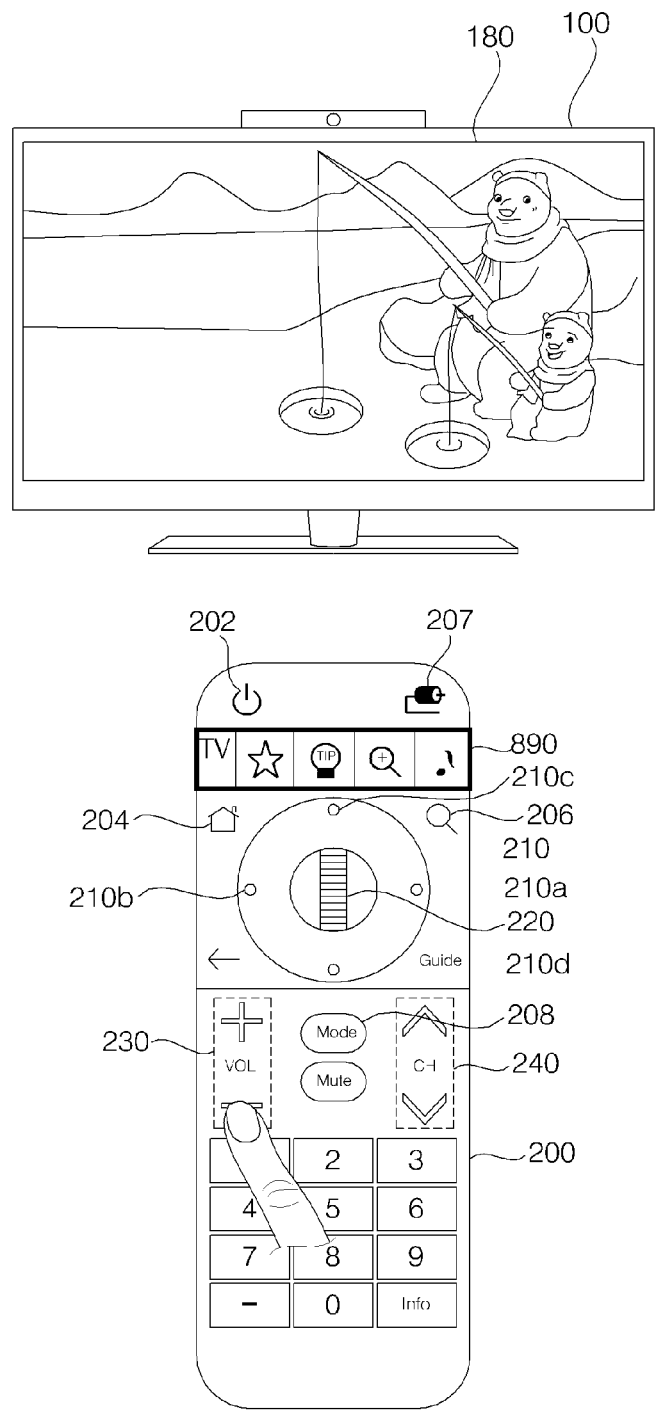
Figure 15B:
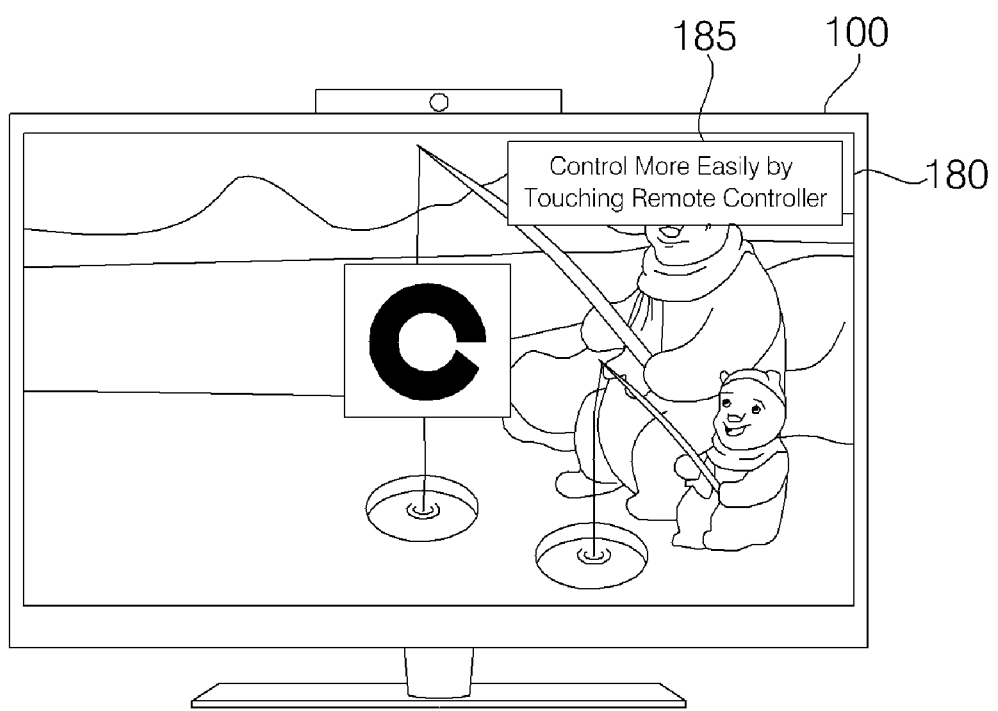
Figure 15C:
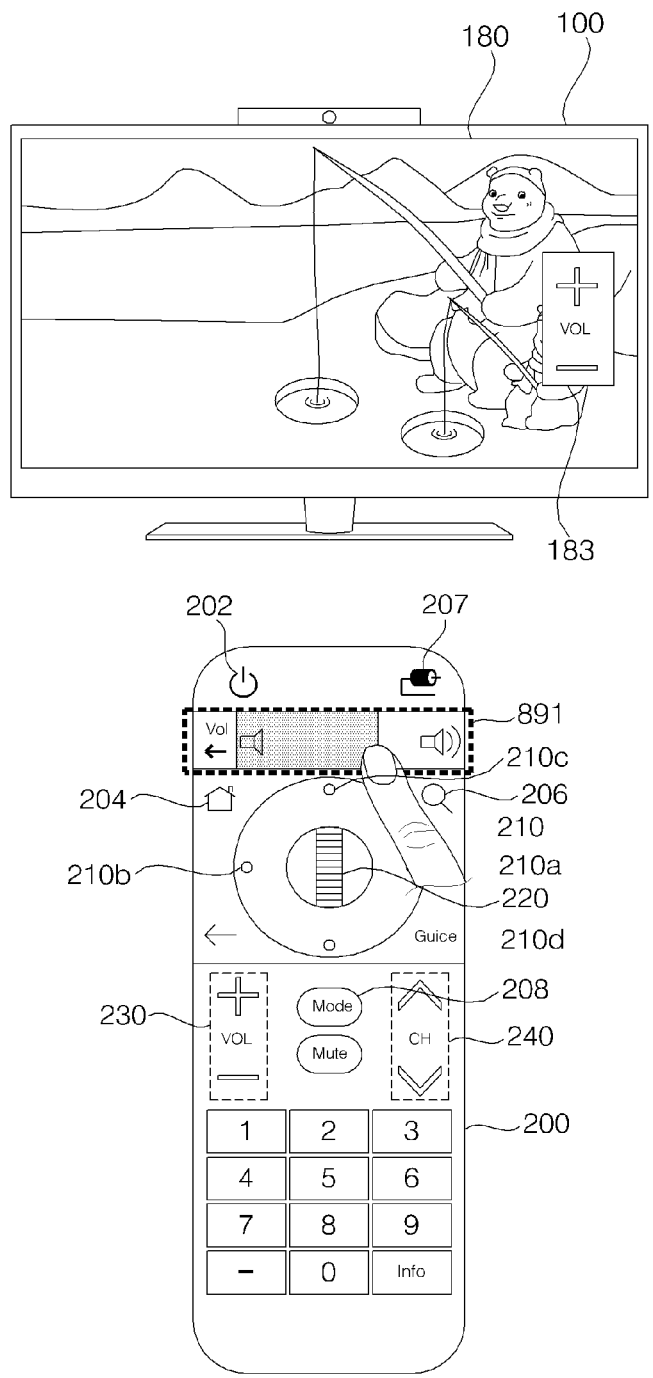
Figure 16A:
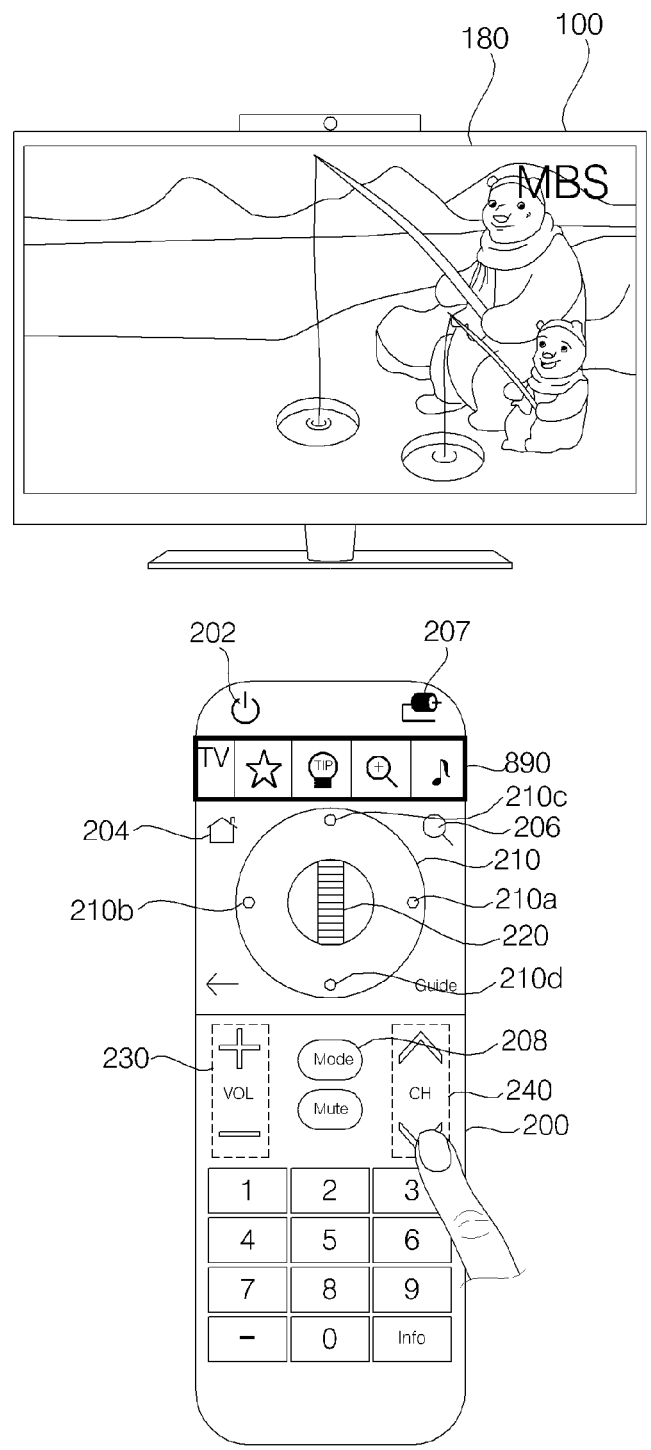
Figure 16B:
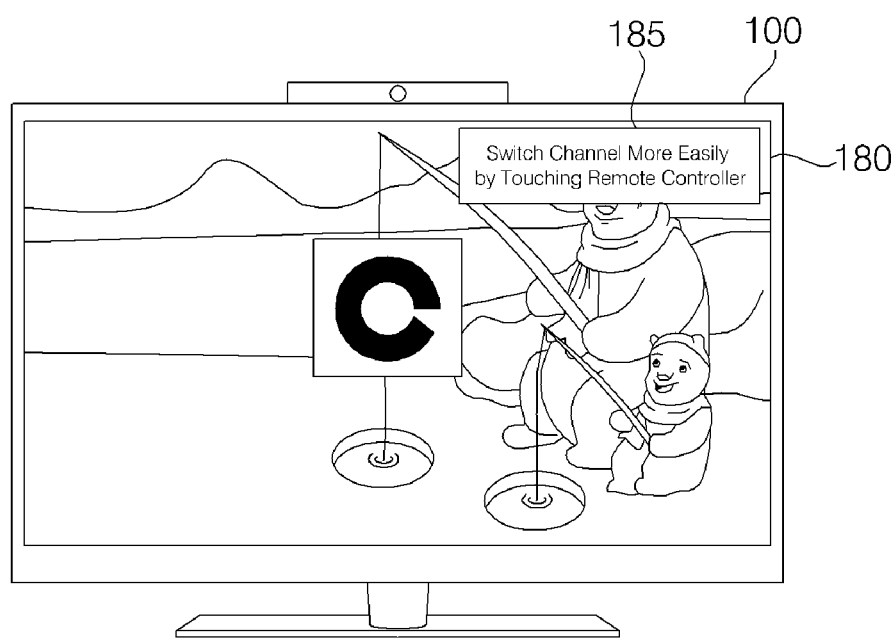
Figure 16C:
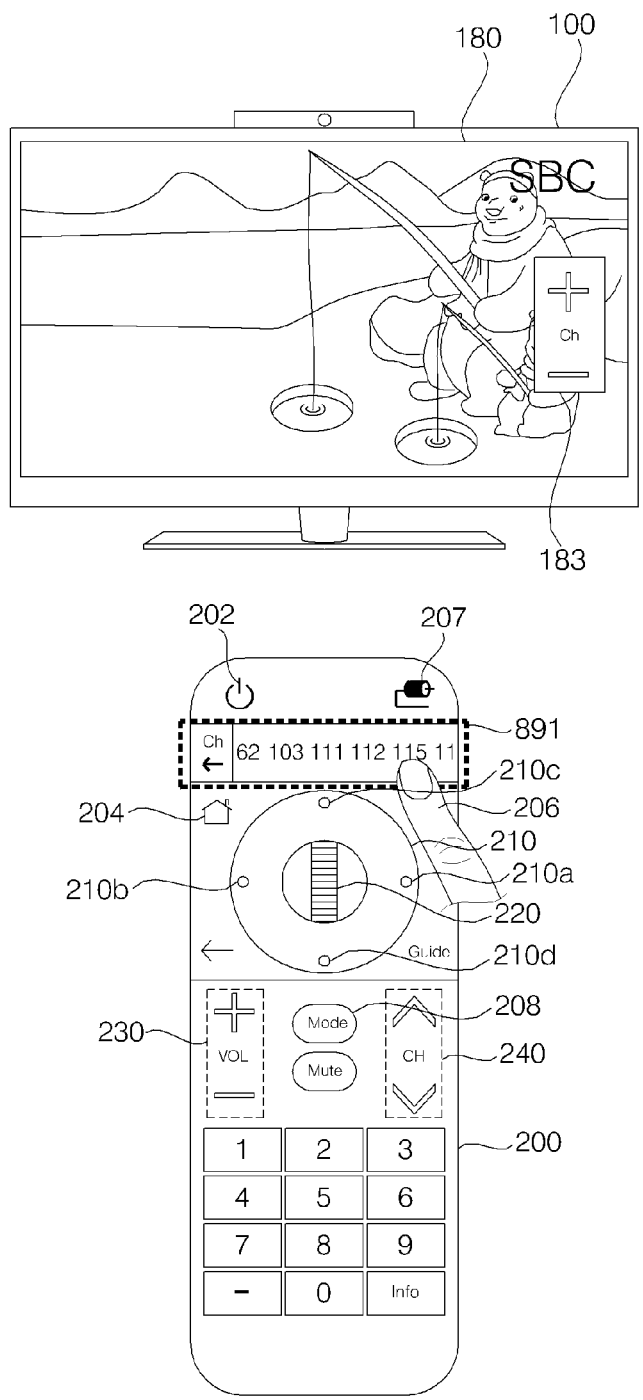

For example, upon pressing of a specific key (the volume key 230 or the channel key 240) in the key input unit 830 of the remote controller 200 as illustrated in FIG. 15A or 16A, the object 891 for controlling a sound volume or switching a channel may be displayed on the touch screen 890 as illustrated in FIG. 15C or 16C.

Another object 183 for controlling a sound volume or switching a channel may further be displayed on the display 180 of the image display apparatus 100 as illustrated in FIG. 15C or 16C.

A touch input may be applied to the object 891 for controlling a sound volume or switching a channel, displayed on the touch screen 890 as illustrated in FIG. 15C or 16C. This touch input may include at least one of a swipe input and a pinch input, which include a vertical or sideway bi-directional touch and drag.

Herein, the image display apparatus 100 may display guide information 185 indicating that an object for controlling a sound volume or switching a channel will be displayed on the touch screen 890 of the remote controller 200 or the display 180 of the image display apparatus 100, as illustrated in FIG. 15B or FIG. 16B.

Figure 15D:
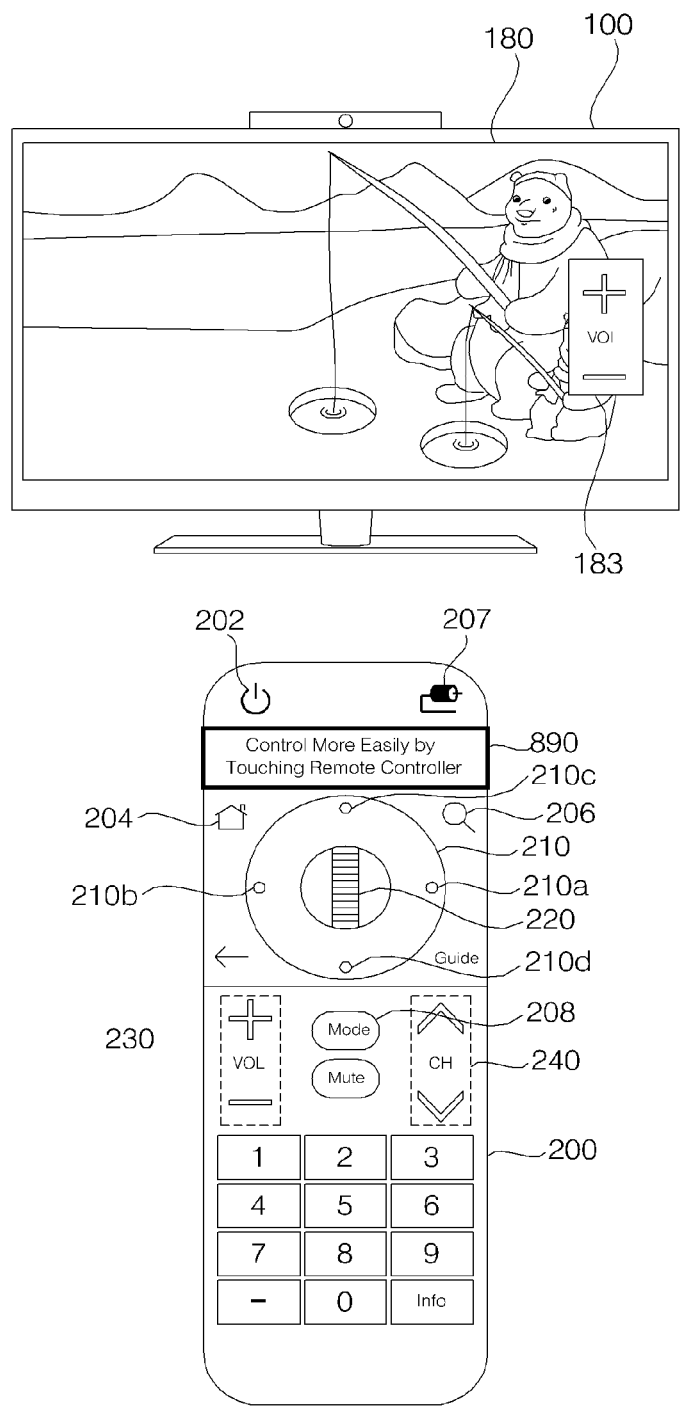
Figure 16D:
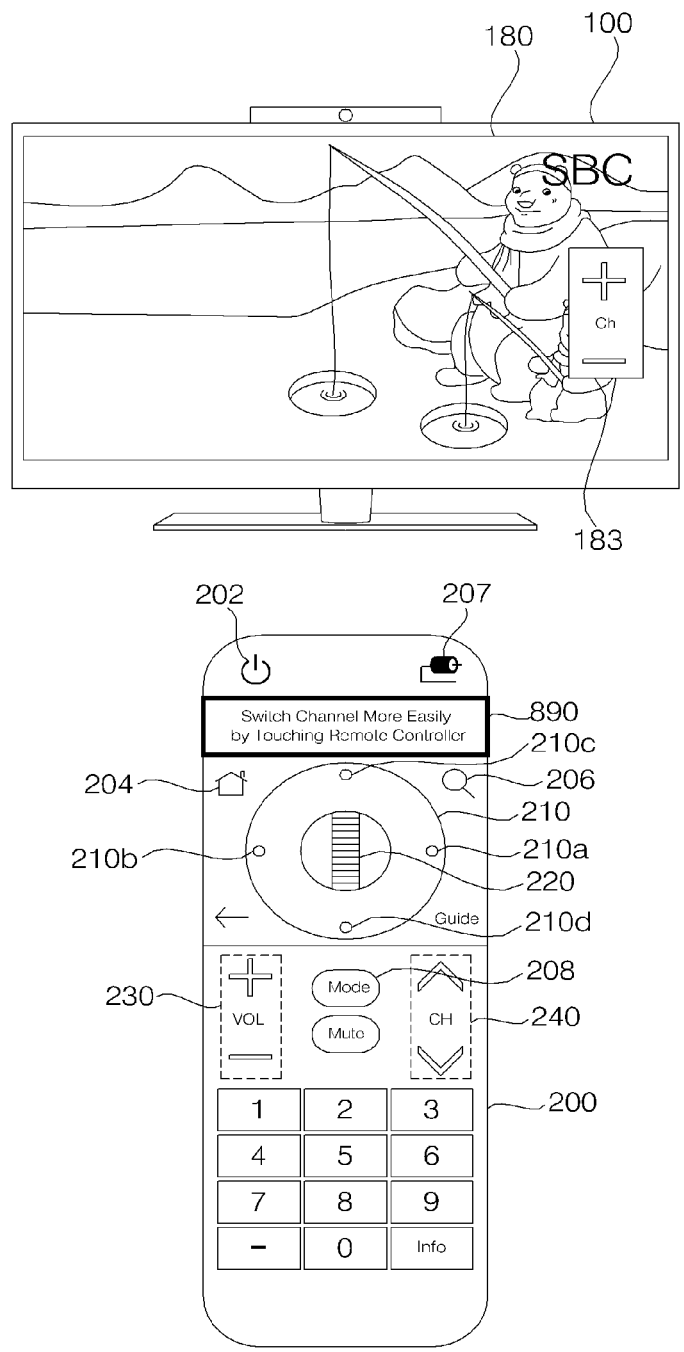

Upon pressing of a specific key (the volume key 230 or the channel key 240) in the key input unit 830 of the remote controller 200, the object 183 for controlling a sound volume or the object 891 for switching a channel may be displayed on the display 180 of the image display apparatus, as illustrated in FIG. 15D or 16D.

At the same time, the touch screen 890 of the remote controller 200 may display guide information indicating that an object for controlling a sound volume or switching a channel may be displayed on the touch screen 890 of the remote controller 200.

Figure 15E:
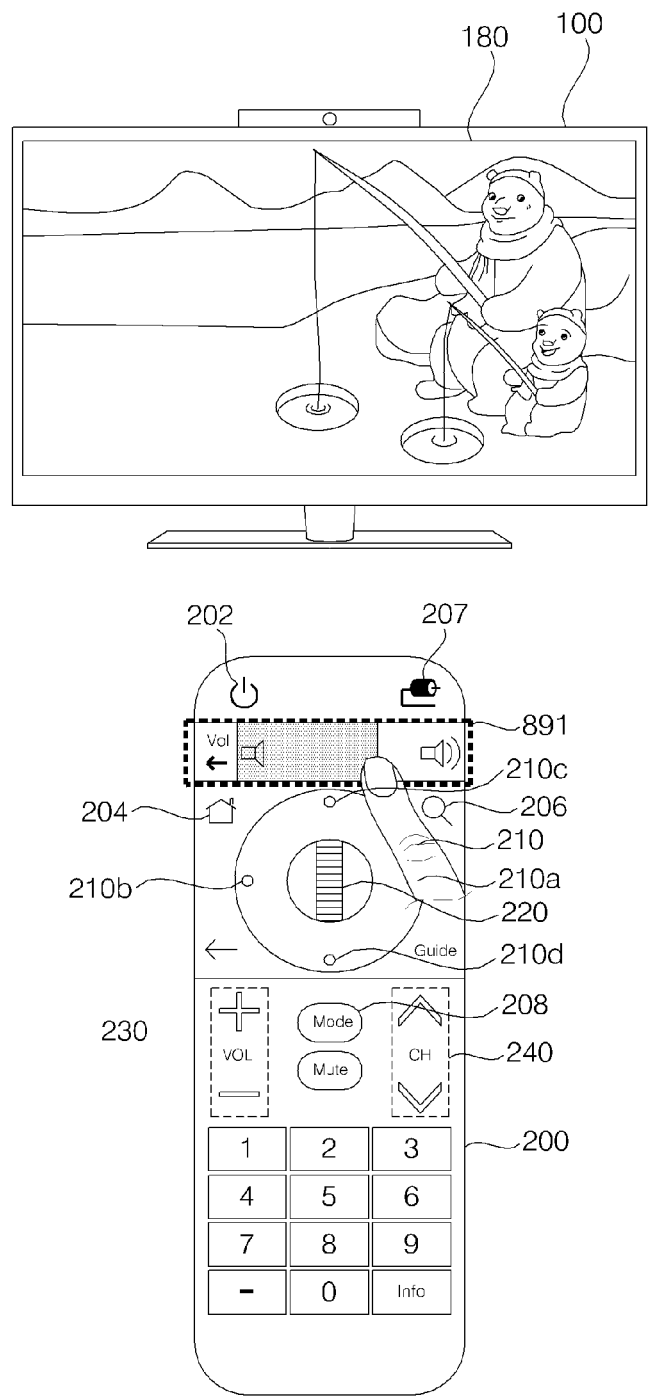
Figure 16E:
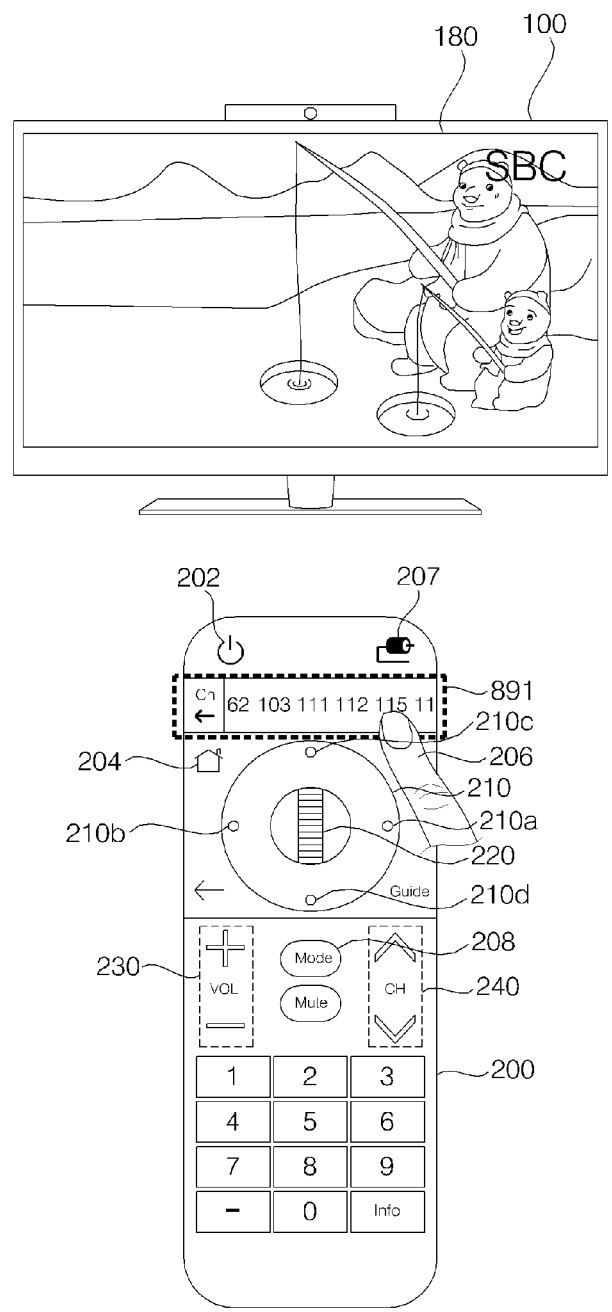

In this case, as illustrated in FIG. 15E or FIG. 16E, the object 891 for controlling a sound volume or switching a channel may be displayed only on the touch screen 890 of the remote controller 200, compared to FIG. 15C or FIG. 16C. That is, as the object 891 for controlling a sound volume is displayed on the touch screen 890 of the remote controller 200, the user may control the object 891 more conveniently on the touch screen 890 of the remote controller 200 relatively near to the user, without viewing the display 180 of the image display apparatus 100 relatively remote from the user.

Further, since a UI is provided on the touch screen 890 of the remote controller 200, micro-control is possible, compared to a UI configured on the display 180 of the image display apparatus 100.

For example, while the object 183 configured on the display 180 of the image display apparatus 100 may be controlled by pressing a specific key or transmitting a pointing signal in the remote controller 200, a fine touch may be applied to the object 891 configured on the touch screen 890 of the remote controller 200 by means of a finger or the like, thereby enabling micro-control.

FIGS. 17A to 24C are views referred to for describing an operation method for transmitting and receiving data between a remote controller and an image display apparatus according to another embodiment of the present disclosure.

Figure 17A:
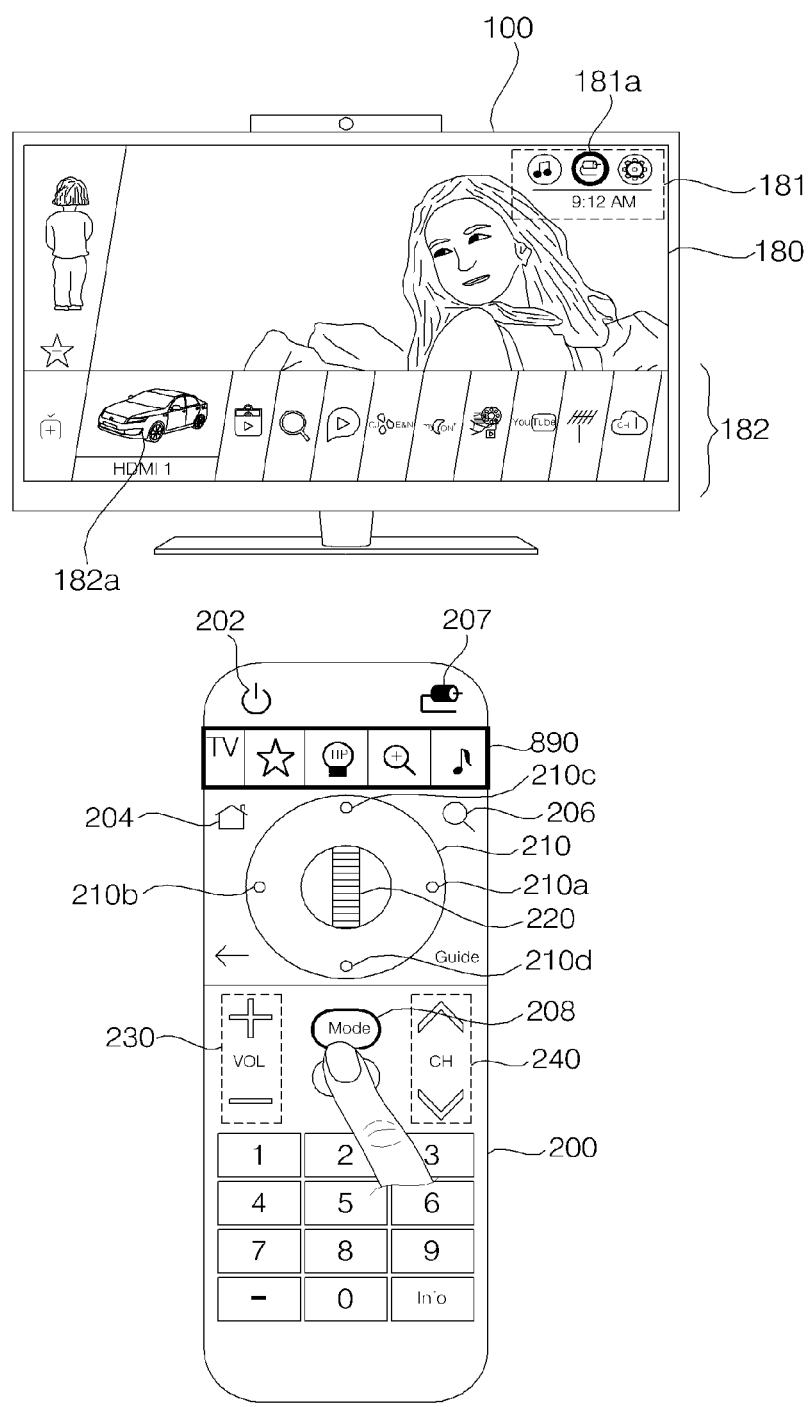

Referring to FIG. 17A, the remote controller 200 of the present disclosure may receive a user input through the key input unit 830, during audio or video play in the image display apparatus 100. With no audio or voice played, a user input may be received through the key input unit 830.

According to the present disclosure, the key input unit 830 may include various hot keys illustrated in FIG. 1B, and receive an input of a specific key such as the mode key 208 of the remote controller 200 from the user.

Figure 17B:
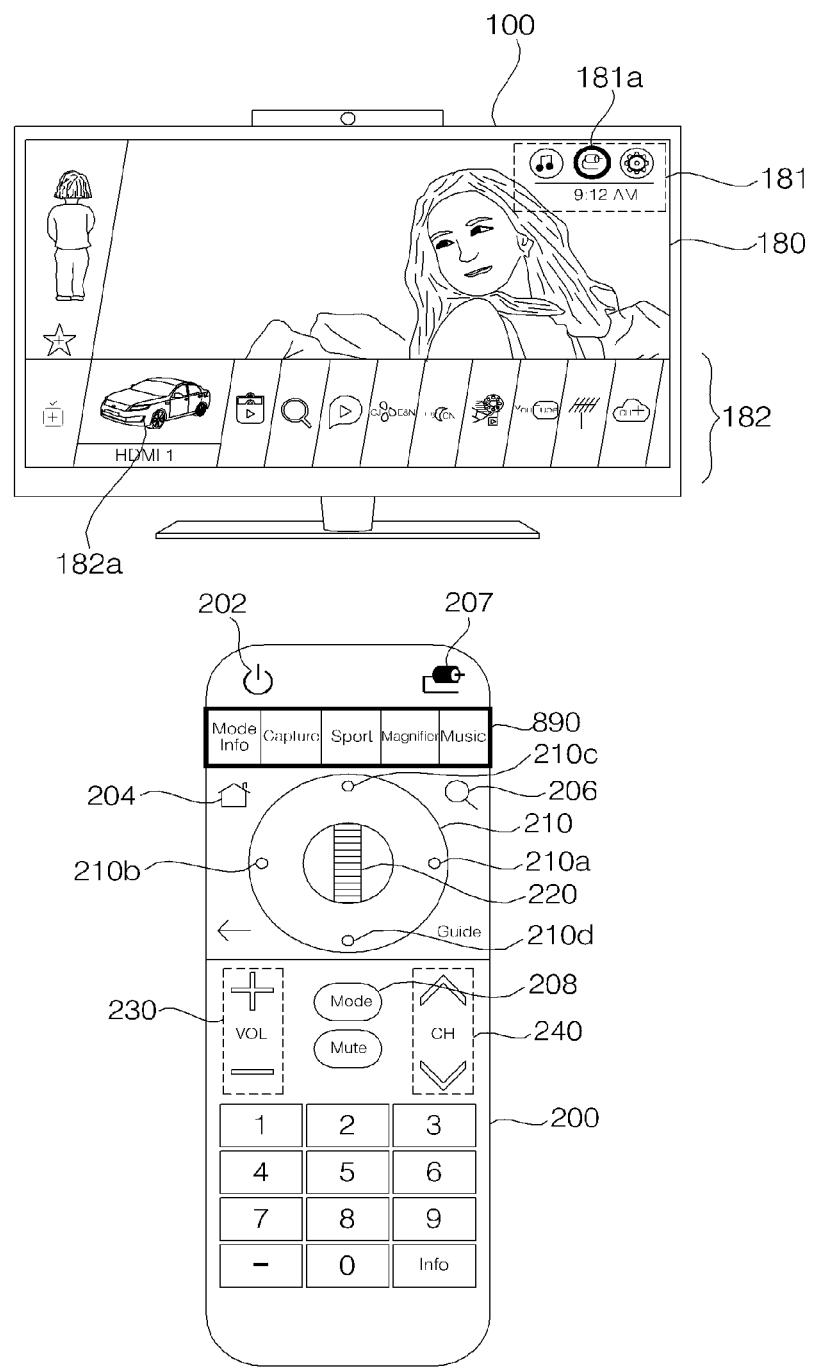

The mode key 208 may include key information needed for accessing function list information such as an audio play function, a zoom function including a magic zoom or pinch zoom, an EPG search function through a set-top box, and an auto channel complete function for Web browsing, which are available in the image display apparatus 100. Upon input of the mode key 208 of the remote controller 200, function list information may be displayed on the touch screen 890, as illustrated in FIG. 17B.

Alternatively or additionally, the function list information may be displayed on the touch screen 890 based on motion information (e.g., sideway or vertical shaking) about the remote controller 200, received from the sensor unit 840 of the remote controller 200.

According to an embodiment of the present disclosure, the function list information may include information about an audio play function, a zoom function including a magic zoom or pinch zoom, an EPG search function through a set-top box, and an auto channel complete function for Web browsing, which are available in the image display apparatus 100.

The function list information may be pre-stored in the memory 140 of the image display apparatus 100. The function list information may be updated in real time according to connection states between the external devices 600, 650, and 680 and the image display apparatus 100, and stored in the memory 140.

Upon receipt of the function list information from the image display apparatus 100, the remote controller 200 may display the function list information. Particularly, function list information pre-stored in the memory 870 of the remote controller 200 may be displayed on the touch screen 890 in an embodiment of the present disclosure.

The remote controller 200 may receive a first touch input for selecting at least one of functions indicated by the function list information displayed on the touch screen 890.

Figure 17C:
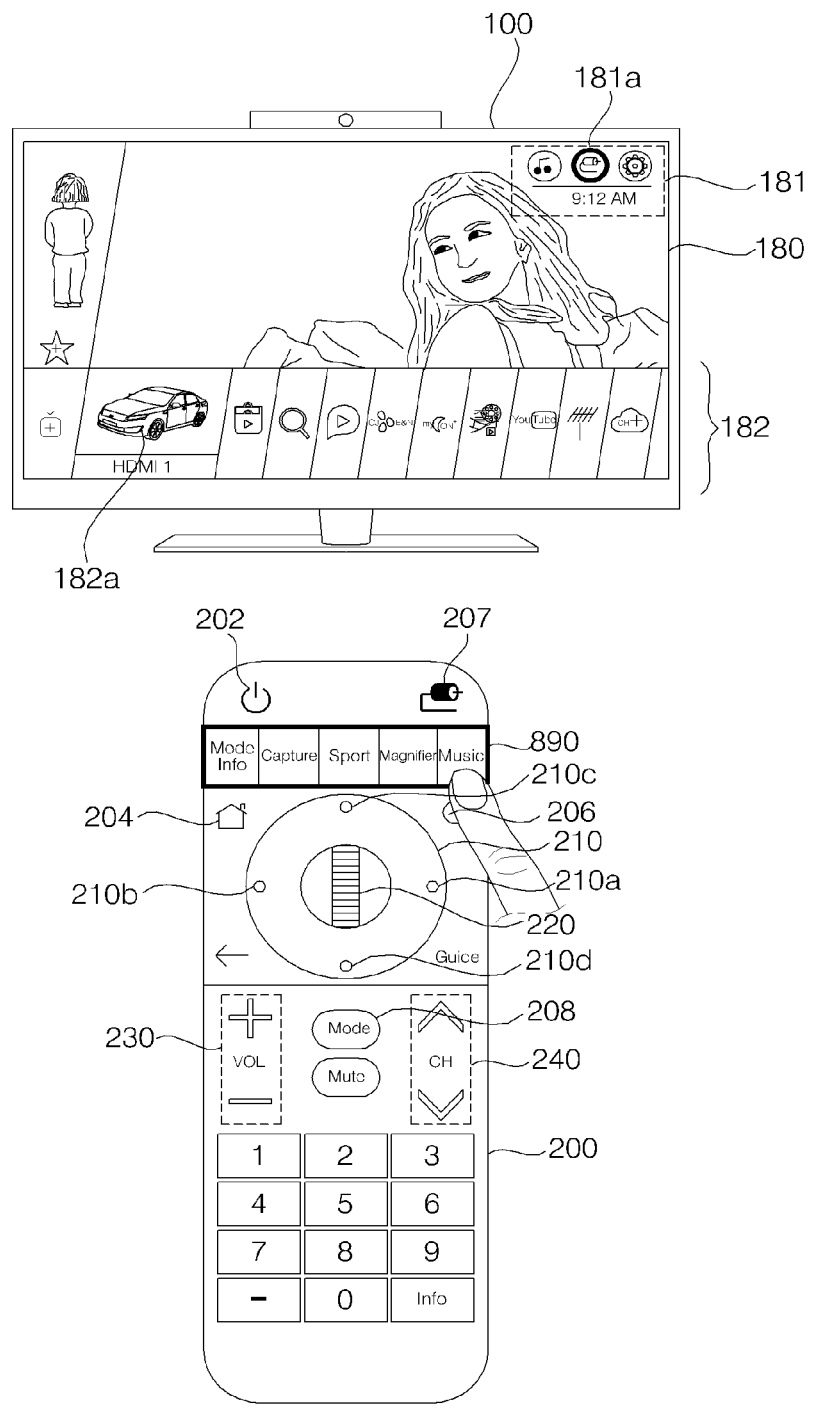

For example, referring to FIG. 17C, the controller 880 of the remote controller 200 may control the touch screen 890 to receive a first touch input for selecting a music play function from among the functions indicated by the function list information displayed on the touch screen 890.

While the small-size display preferably includes five regions in the embodiment of the present disclosure, the present disclosure is not limited to the specific number of regions and the number of regions may be any other value according to the size of the small-size display.

The controller 880 of the remote controller 200 may receive a first touch input for selecting at least one of the functions indicated by the function list information, and display a UI corresponding to the selected function.

Figure 17D:
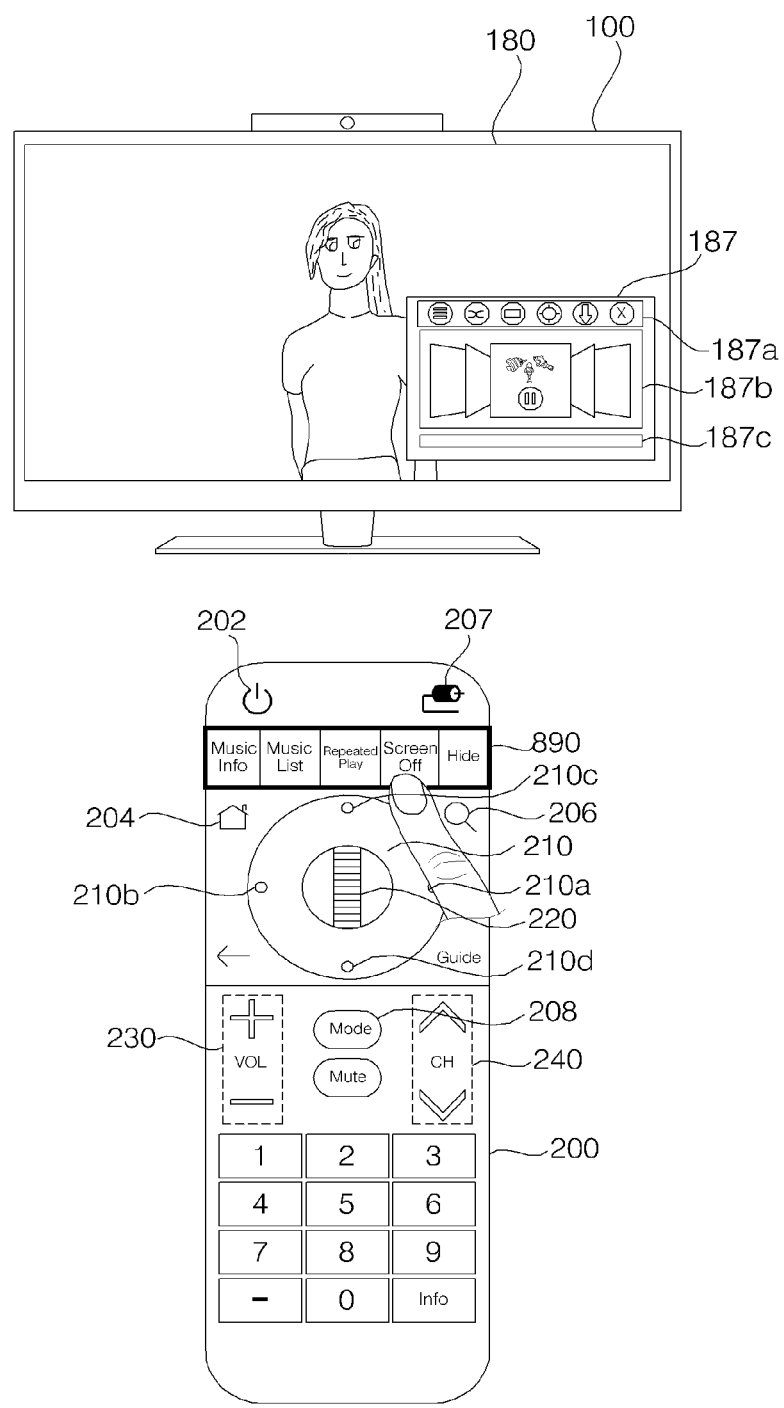

For example, referring to FIG. 17D, functions related to the music play function, such as music information, music list, repeated play, and screen-off may be displayed on the UI.

The functions related to the music play function may be displayed simultaneously on the touch screen 890 of the remote controller 200 and the display 180 of the image display apparatus 100.

Objects 187 representing the functions indicated by the function list information, displayed on the display 180 of the image display apparatus 100 may include an object 187 representing the music play function, as illustrated in FIG. 17D. Functions related to the music play function may be displayed as the object 187.

The object 187 representing the music play function may include music player control information 187a, music list information 187b, or play state information 187c, as illustrated in FIG. 17D.

The music player control information 187a may include music selection information, repeat/shuffle information, and so on, and the music list information 187b may include a list of music sources that can be played. As the play state information 187c, information about the played time of a music source may be displayed in the form of a progressive bar.

On the other hand, it may be configured that the functions related to the music play function are displayed only on the touch screen 890 (not shown).

Figure 17E:
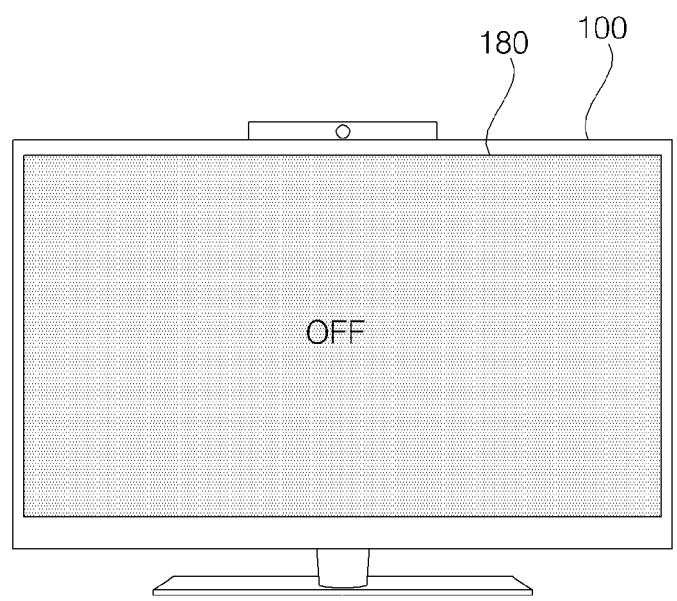

Referring to FIGS. 17D and 17E, the remote controller 200 may receive a second touch input for selecting one of the functions related to the music play function, screen off. Then, the remote controller 200 may execute the music play function with the screen turned off, by executing a command corresponding to the second touch input.

Figure 17F:
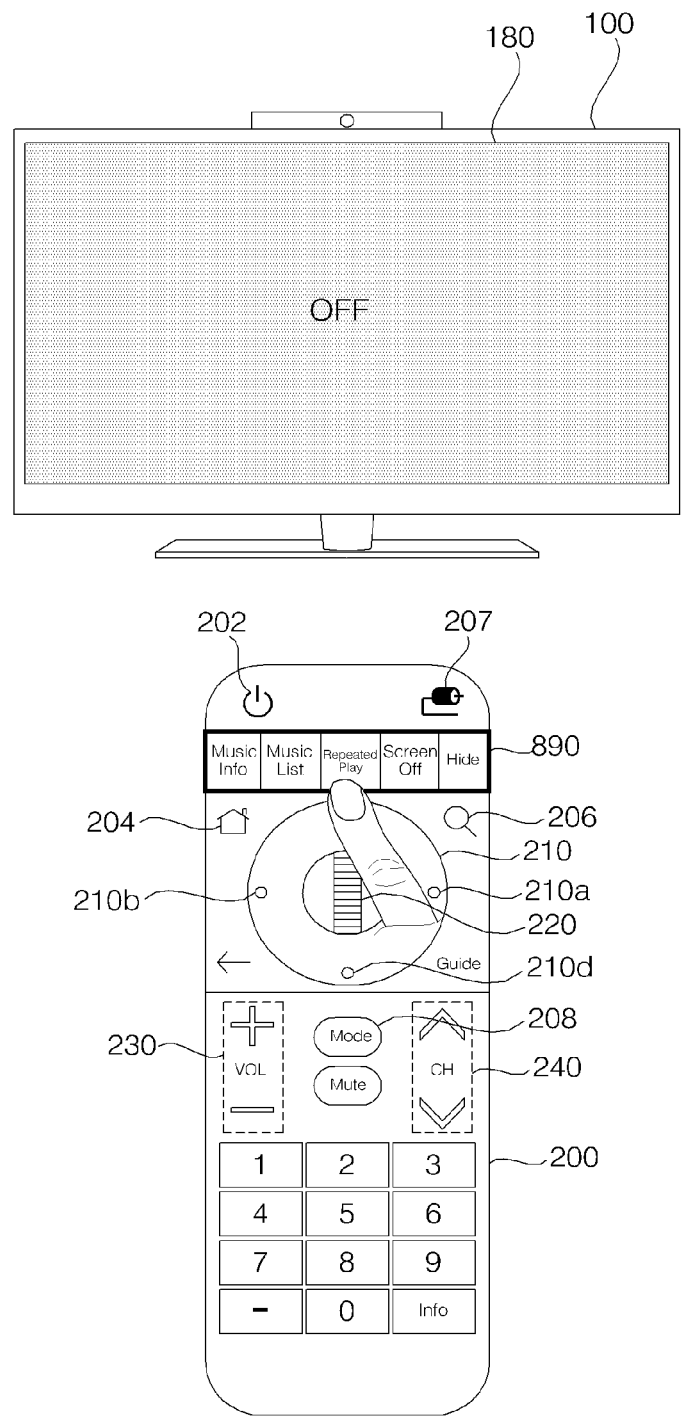

Referring to FIG. 17F, upon receipt of an input for selecting at least one of the functions displayed on the touch screen 890 of the remote controller 200, information about the selected function may be displayed on the touch screen 890 of the remote controller 200.

Figure 17G:
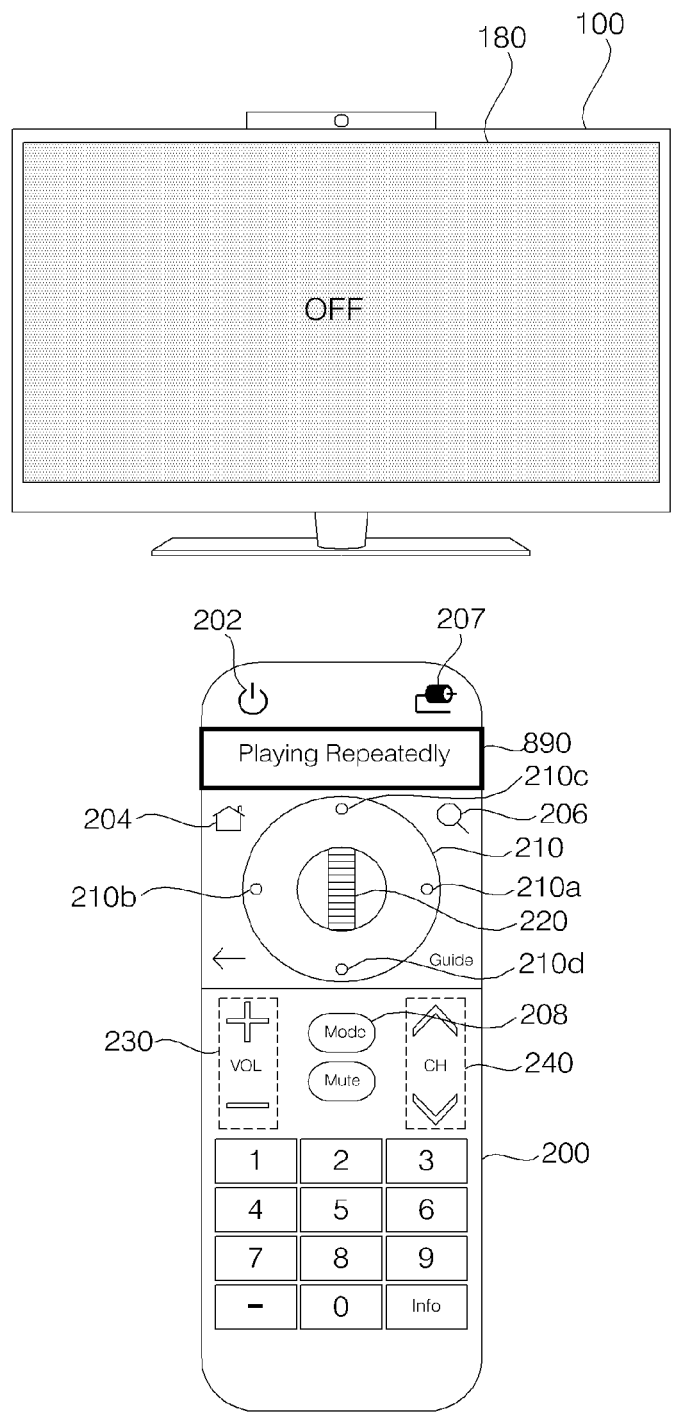

For example, upon receipt of a second touch input for selecting repeated play on the UI including music information, music list, repeated play, and screen-off in relation to the music play function, information about a repeated play state may be displayed on the touch screen 890 of the remote controller 200, as illustrated in FIG. 17G.

Meanwhile, upon selection of a play item from among music items displayed on the touch screen 890 with the display 180 of the image display apparatus 100 off, the controller 880 of the remote controller 200 may control music to be played in the image display apparatus 100.

Figure 17H:
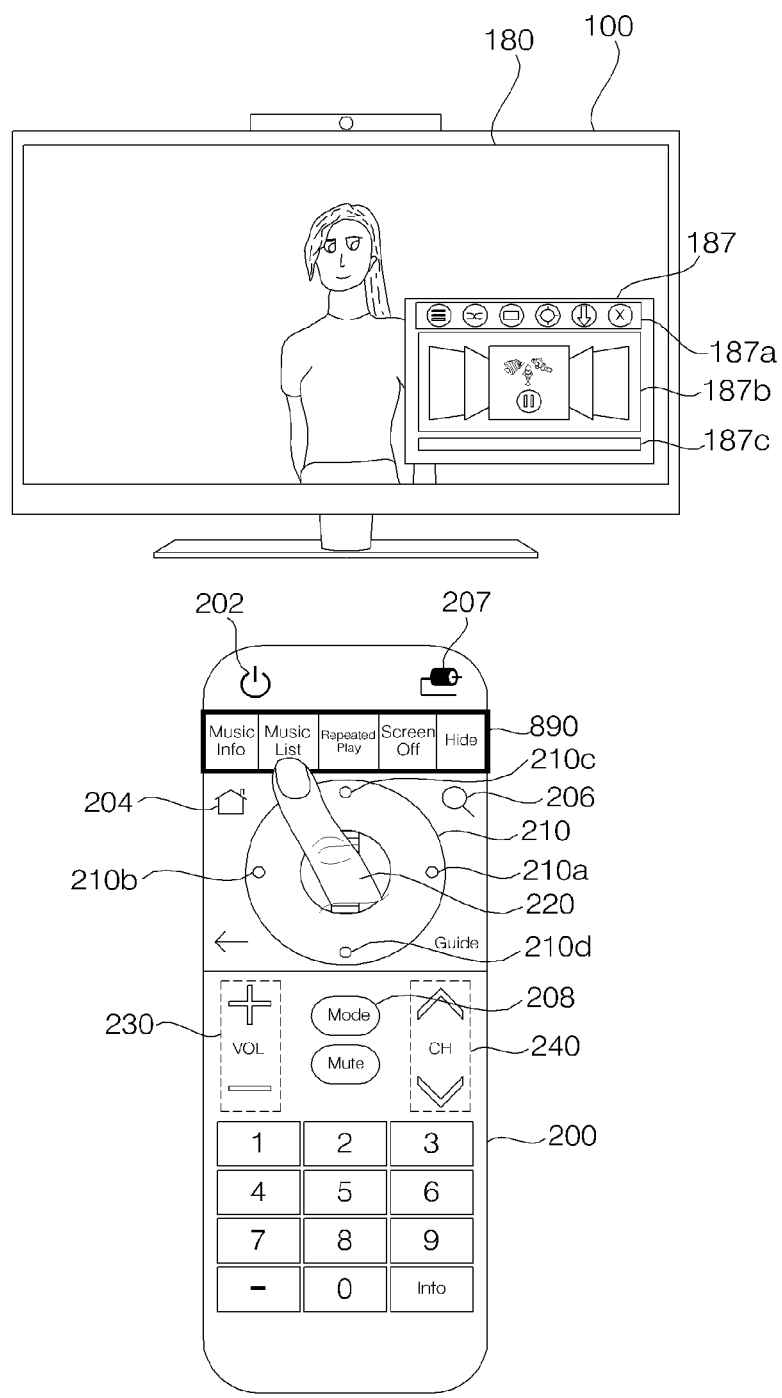
Figure 17I:
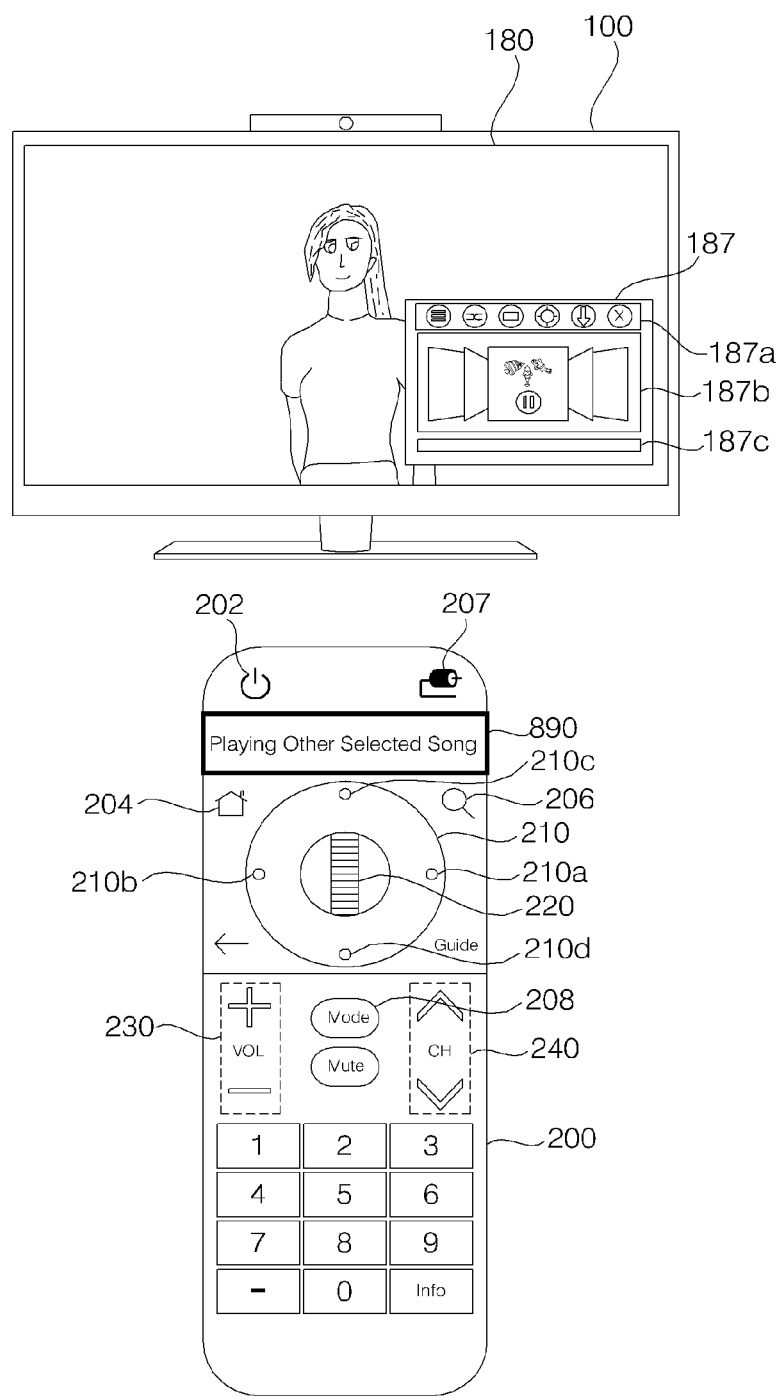

While music is played in a screen-off state of the image display apparatus 100 in FIGS. 17F and 17G, by way of example, the scenario of FIGS. 17A to 17E may also be applied to a case in which music is played in the screen-off state of the image display apparatus 100 as illustrated in FIGS. 17H and 17I. Upon receipt of a second touch input for selecting music list on the UI including music information, music list, repeated play, and screen-off in relation to the music play function as illustrated in FIG. 17H, information about a music source being played may be displayed on the touch screen 890 of the remote controller 200 as illustrated in FIG. 17I.

Figure 18B:
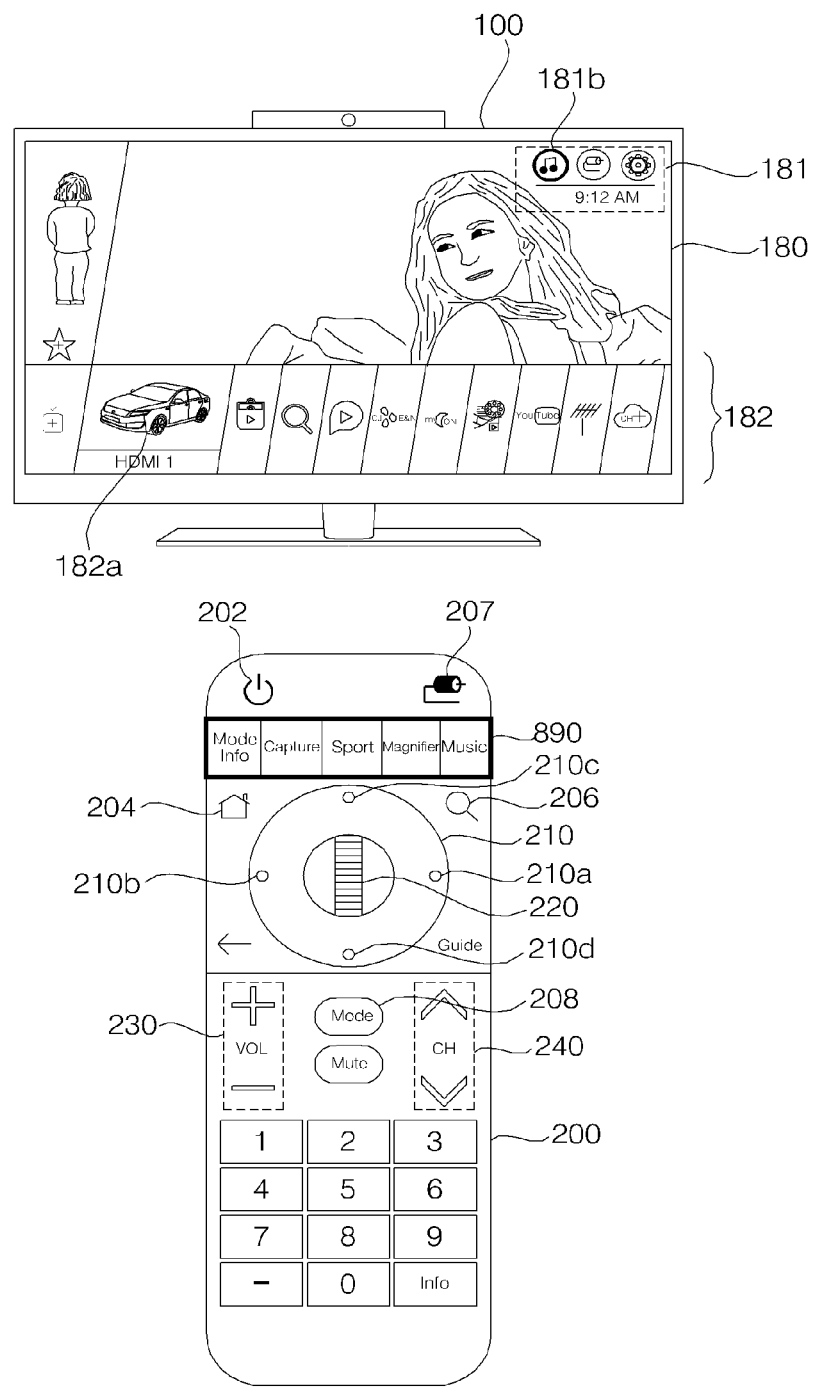

Referring to FIGS. 18A and 18B, the controller 880 of the remote controller 200 may control display of function list information on the touch screen 890 based on information about a motion (e.g., sideway or vertical shaking) of the remote controller 880, sensed by the sensor unit 840.

That is, sideway shaking of the remote controller 200 may be sensed as illustrated in FIG. 18A, and function list information may be displayed on the touch screen 890 as illustrated in FIG. 18B.

Figure 18C:
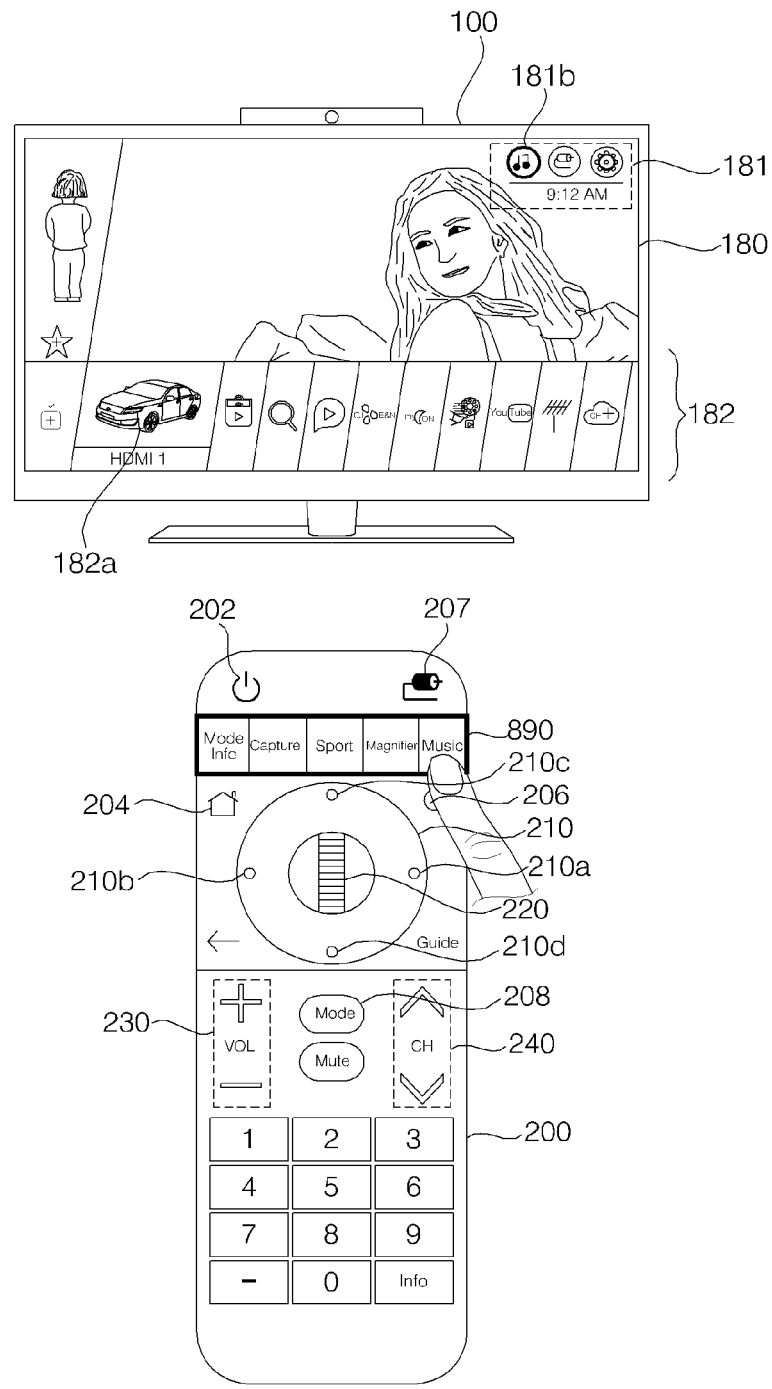
Figure 18D:
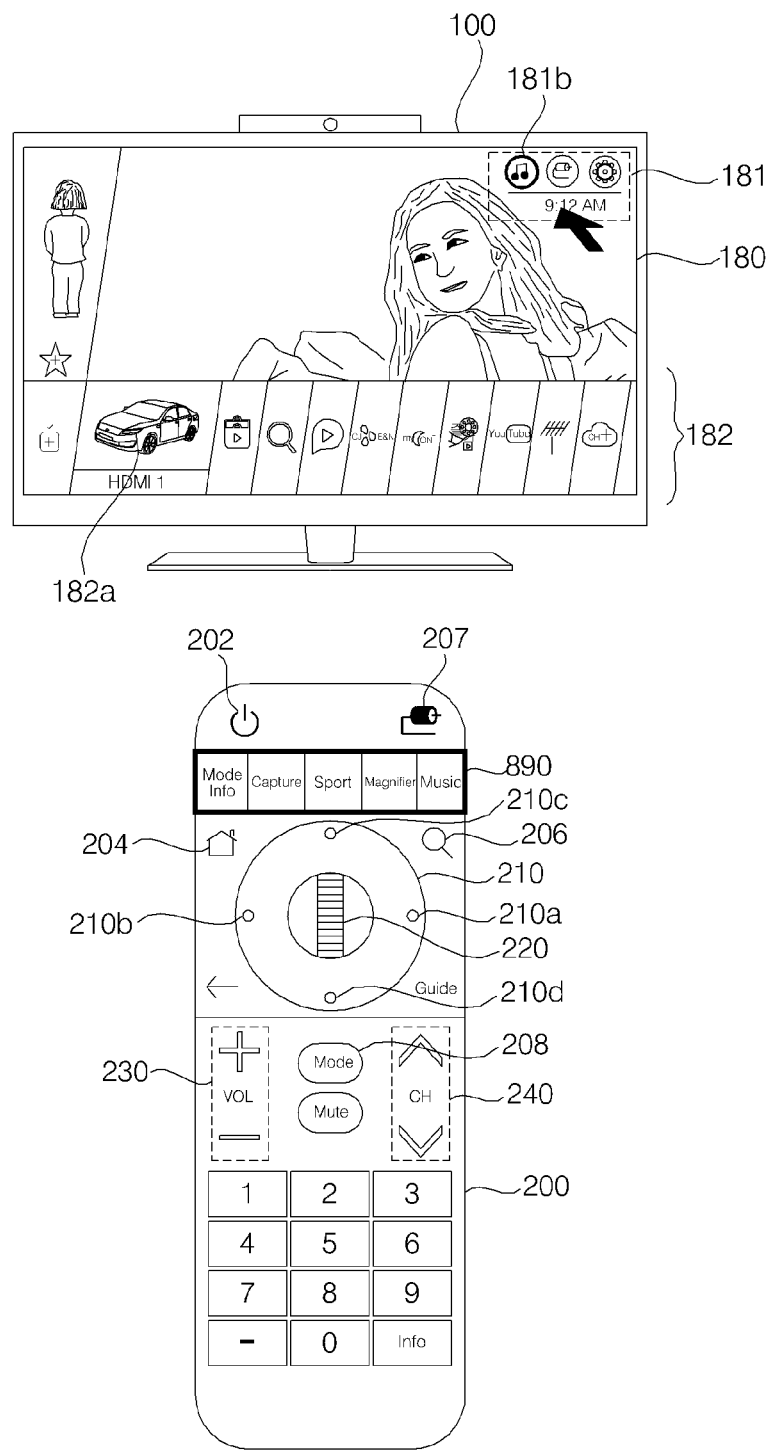

As illustrated in FIG. 18C, the controller 880 of the remote controller 200 may control the touch screen 890 to receive a first touch input for selecting the music play function from among functions indicated by the function list information displayed on the touch screen 890, and as illustrated in FIG. 18D, a UI corresponding to the music play function may be displayed on the touch screen 890 of the remote controller 200 according to the first touch input.

According to an embodiment of the present disclosure, the UI may be displayed on a small-size display configured as a single line display. This UI may be represented as at least one of text including characters, numbers, special characters, or symbols, or a thumbnail image.

For example, the UI may be represented as thumbnail images 892 representing music player mode functions such as music play, end, fast forward, reverse, next music, and previous music, on a small-size display.

Figure 18E:
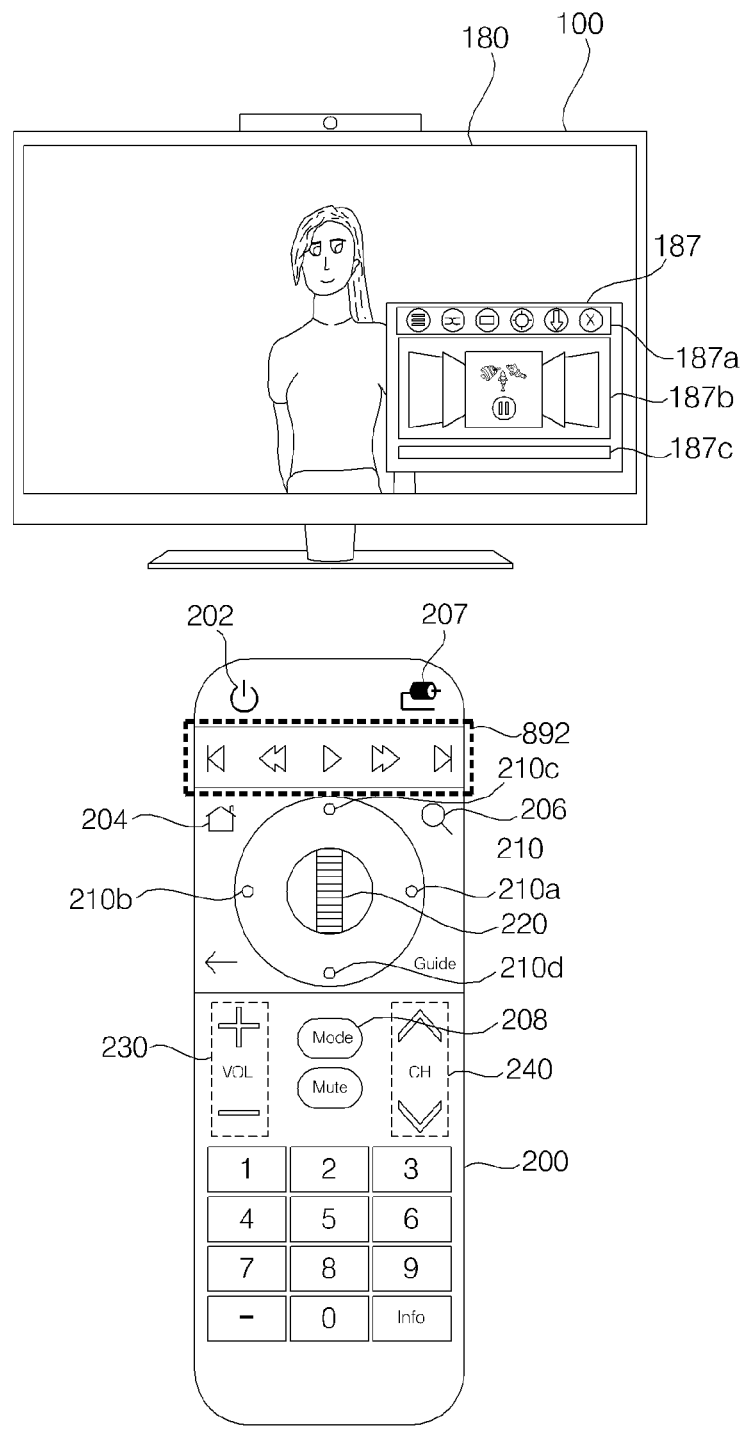

According to an embodiment of the present disclosure, upon selection of a specific object 181 from among objects displayed on the display 180 of the image display apparatus 100, a function corresponding to the selected object 181 may be executed. For example, upon selection of a music function object 181*b* from among the objects displayed on the display 180 of the image display apparatus 100 in FIG. 18B, a UI related to music functions may be displayed on the touch screen 890 as illustrated in FIG. 18E.

The music function object 181*b* in the image display apparatus 100 may be selected by a pointer displayed based on a pointing signal received from the remote controller 200.

Figure 18F:
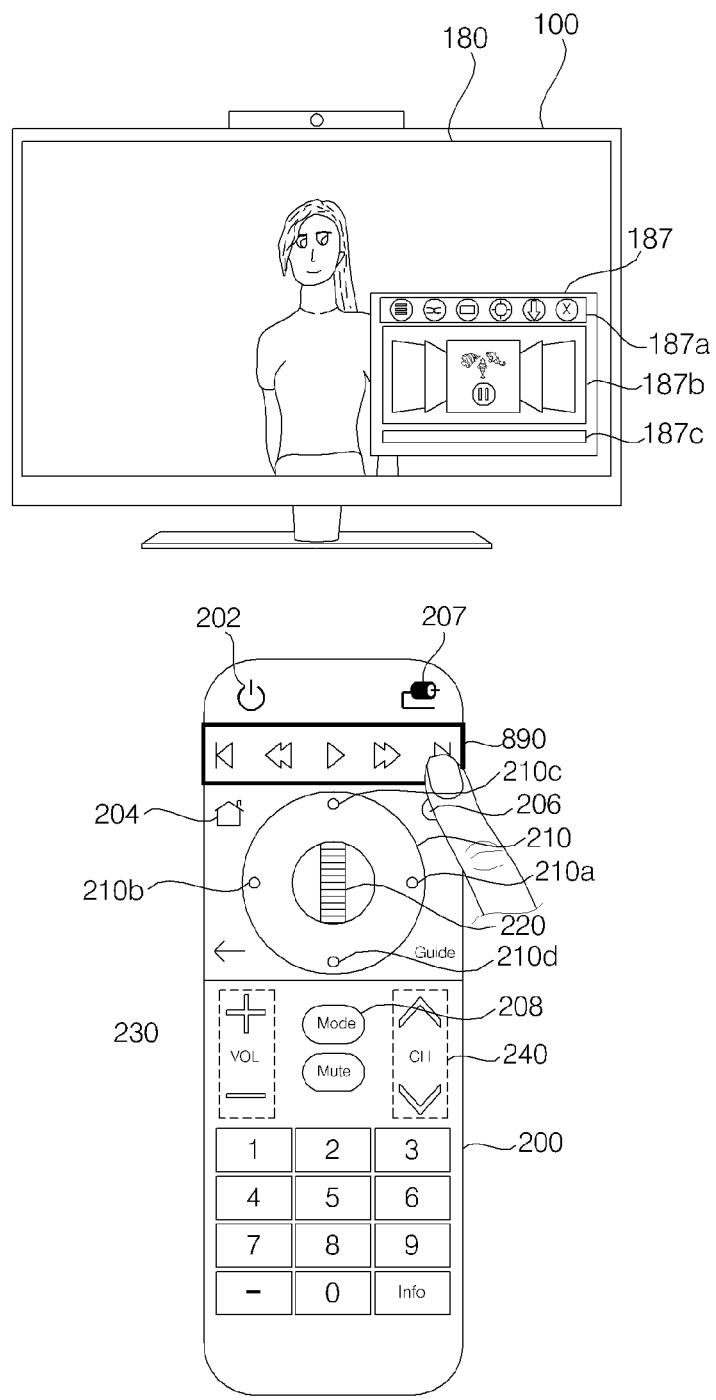

Upon receipt of a second touch input to a thumbnail image 892 representing a music player mode function displayed on the touch screen 890 of the remote controller 200, the controller 880 of the remote controller 200 may control display of related information corresponding to the selection input on the touch screen 890 of the remote controller 200, as illustrated in FIG. 18F.

Figure 18G:
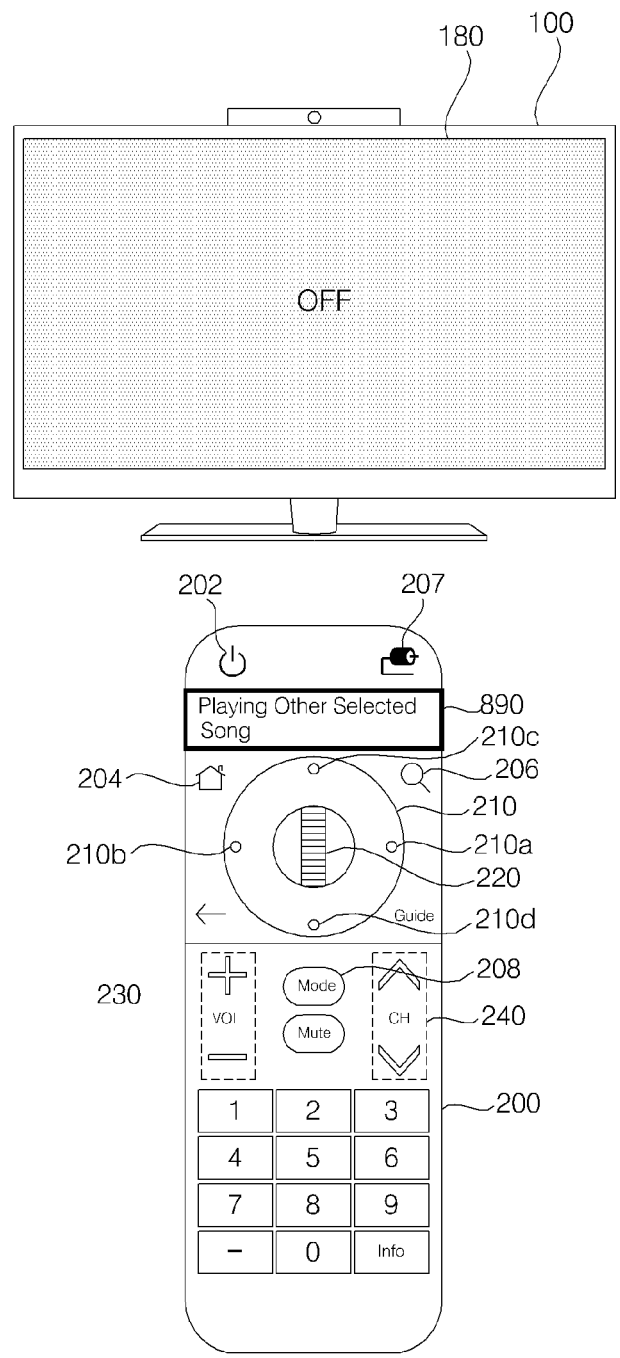

For example, upon receipt of a second touch input for selecting play of the next music from among the music player mode functions, information about selection of the next music may be displayed on the touch screen 890 of the remote controller 200, as illustrated in FIG. 18G.

The information displayed in response to the second touch input may substitute for or be overlaid on the thumbnail images 892 displayed in response to the first touch input.

Figure 18H:
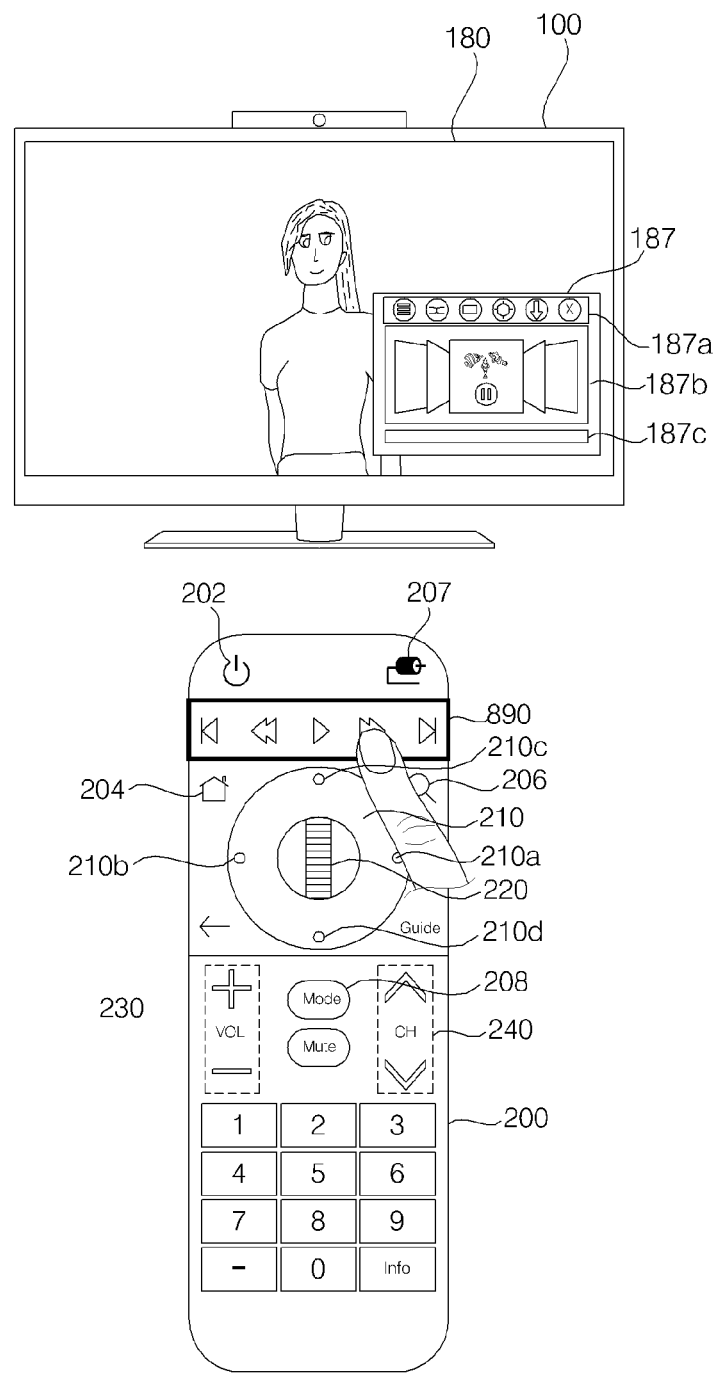

While music is shown as played in the screen-off state of the image display apparatus 100 in FIG. 18G, by way of example, the scenario of FIGS. 18A to 18I may also be applied to a case in which music is displayed in the screen-on state of the image display apparatus 100 as illustrated in FIG. 18H.

Figure 18I:
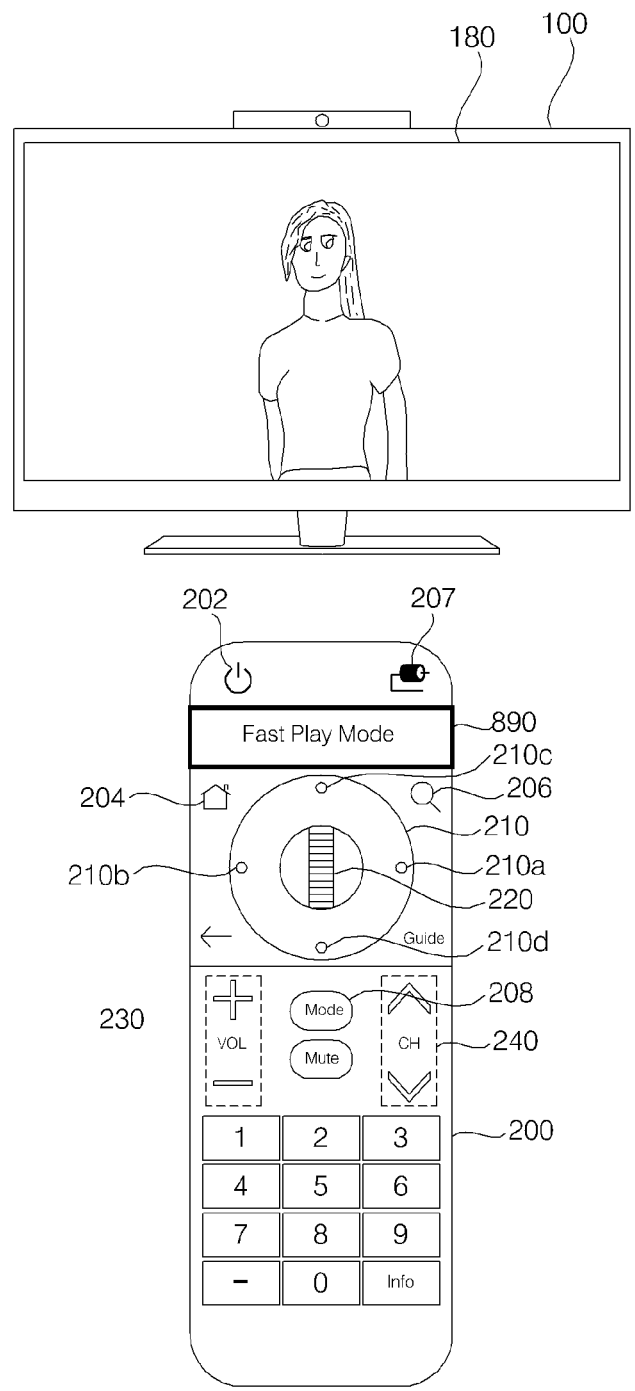

Upon receipt of a second touch input for selecting fast play as a music player mode function as illustrated in FIG. 18H, information indicating fast play may be displayed on the touch screen 890 of the remote controller 200 as illustrated in FIG. 18I.

According to an embodiment of the present disclosure, as a UI controllable on the touch screen 890 of the remote controller 200 is provided on behalf of a UI configured on the display 180 of the image display apparatus 100, the display of the image display apparatus 100 may provide a larger screen for audio or video play, thereby providing a more user-friendly visual effect.

Figure 19B:
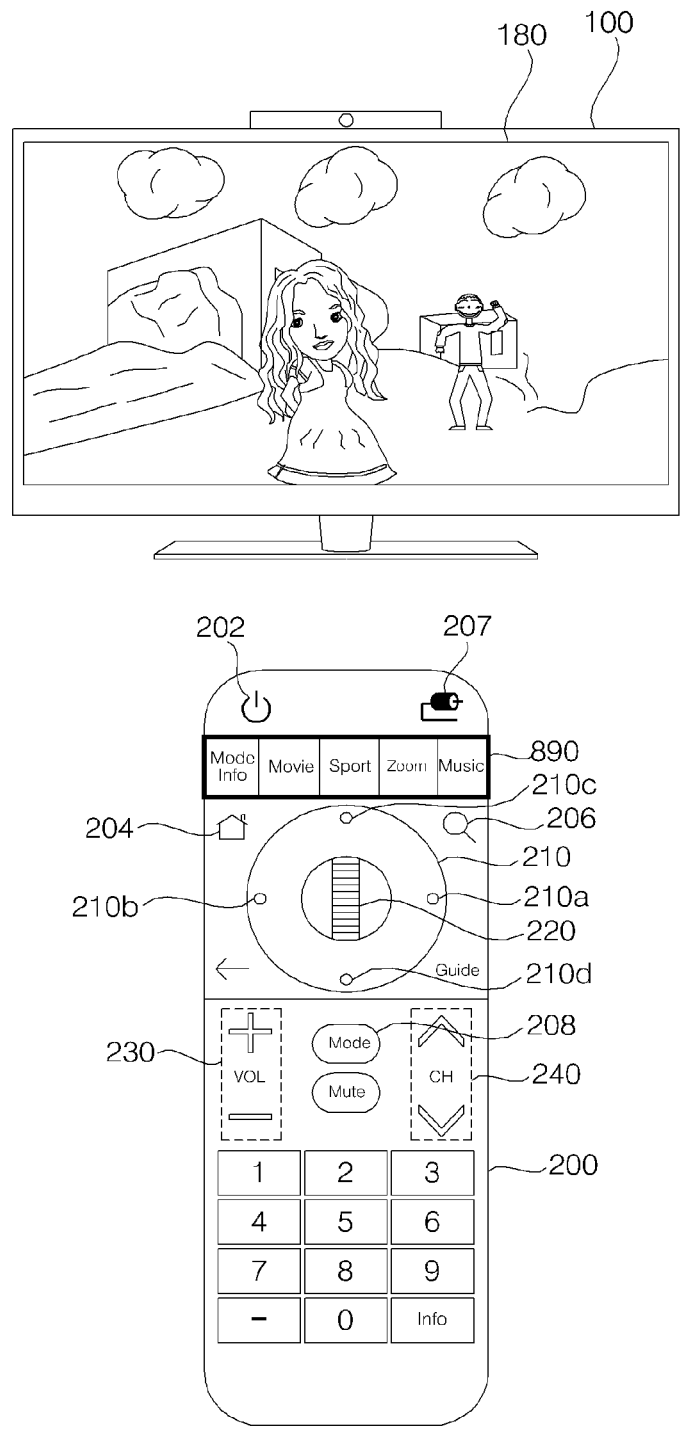

According to an embodiment of the present disclosure, upon receipt of a user input to the mode key 208 of the remote controller 200 as illustrated in FIG. 19A, function list information may be displayed on the touch screen 890, as illustrated in FIG. 19B.

Figure 19C:
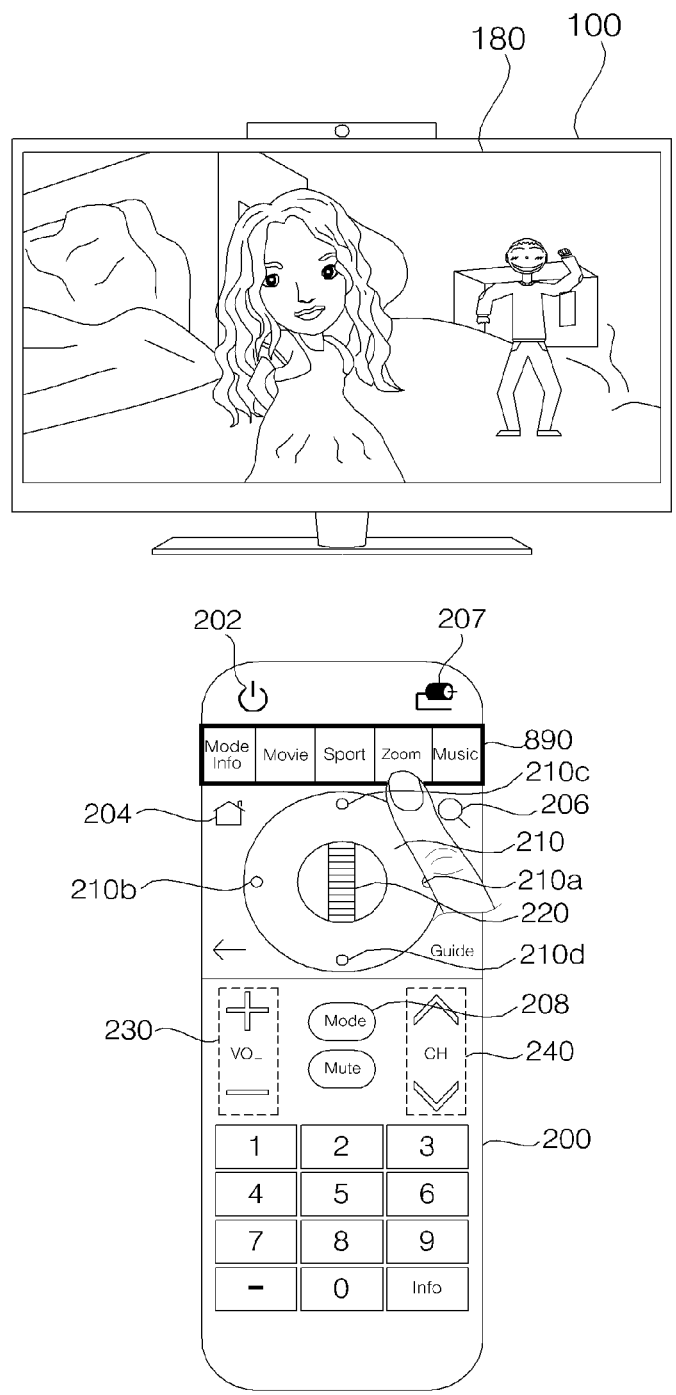
Figure 19D:
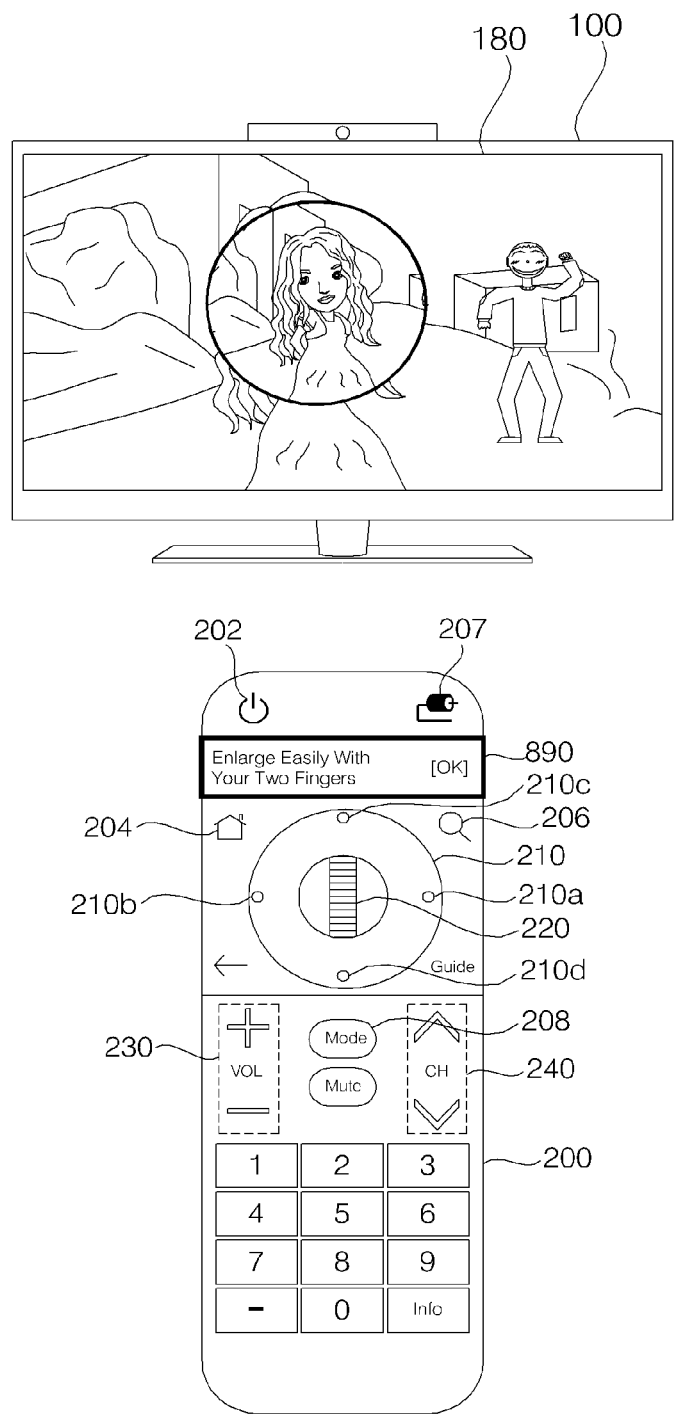

As illustrated in FIG. 19C, the controller 880 of the remote controller 200 may control the touch screen 890 to receive a first touch input to a zoom function among at least one function indicated by the function list information displayed on the touch screen 890, and display a UI corresponding to the zoom function on the touch screen 890 of the remote controller 200 according to the first touch input, as illustrated in FIG. 19D.

Specifically, upon receipt of the first touch input to the zoom function in the function list information displayed on the touch screen 890, the controller 880 of the remote controller 200 may control display of guide information corresponding to the zoom function according to the first touch input on the touch screen 890.

Herein, the controller 170 of the image display apparatus 100 may receive a signal for executing the zoom function according to the first touch input of the remote controller 200 and focus a target on which the zoom function is to be executed, to thereby display a zoom pointer 184 on the display 180. Upon receipt of a second touch input to the UI corresponding to the zoom function selected by the first touch input, a specific function may be executed according to the second touch input.

Figure 19E:
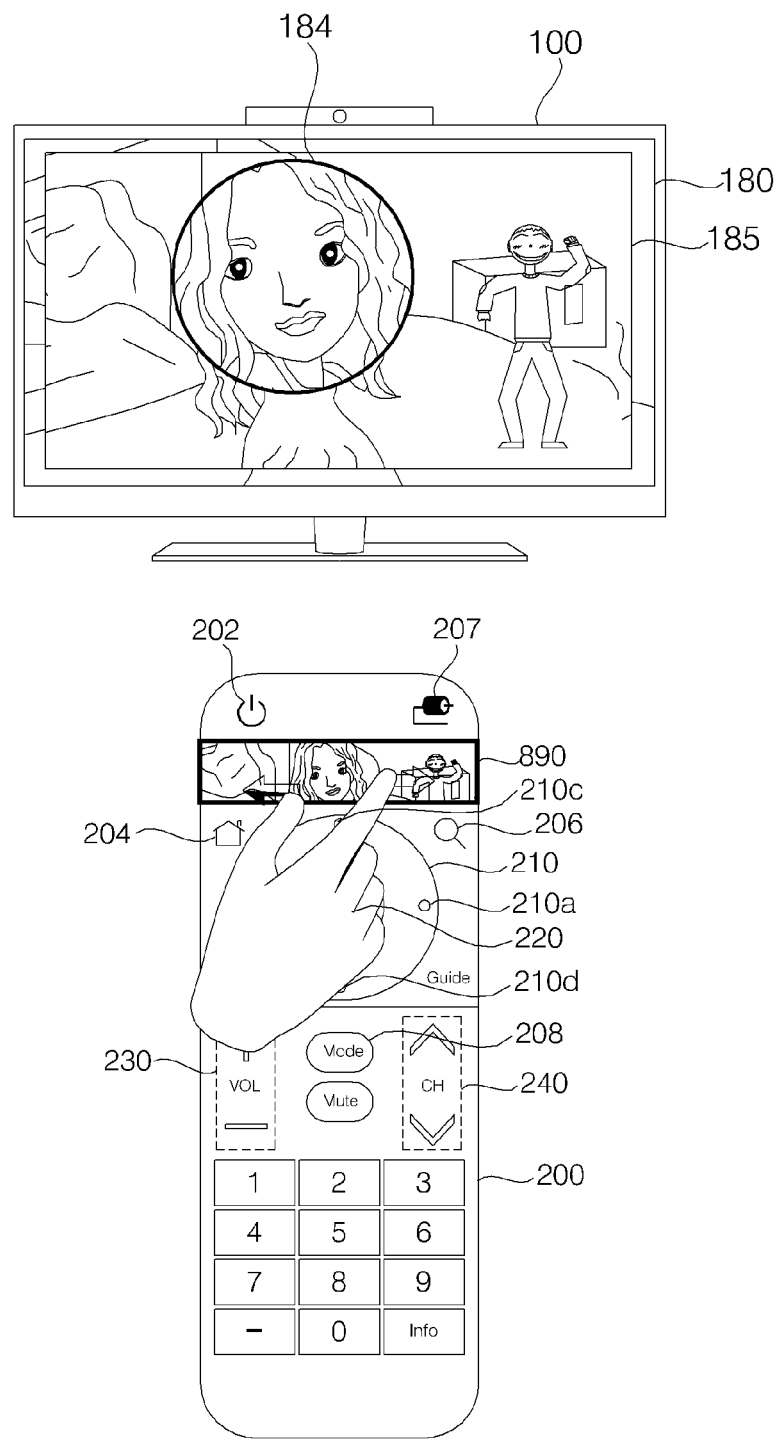

For example, upon receipt of a second touch input for selecting capture in a UI including zoom, magnification, magnifier change, and capture corresponding to the zoom function selected by the first touch input, the controller 170 of the image display apparatus 100 may enlarge a part focused by the zoom pointer 184, and capture a specific area of the enlarged part, thereby generating a captured image 185, as illustrated in FIG. 19E.

Figure 19F:
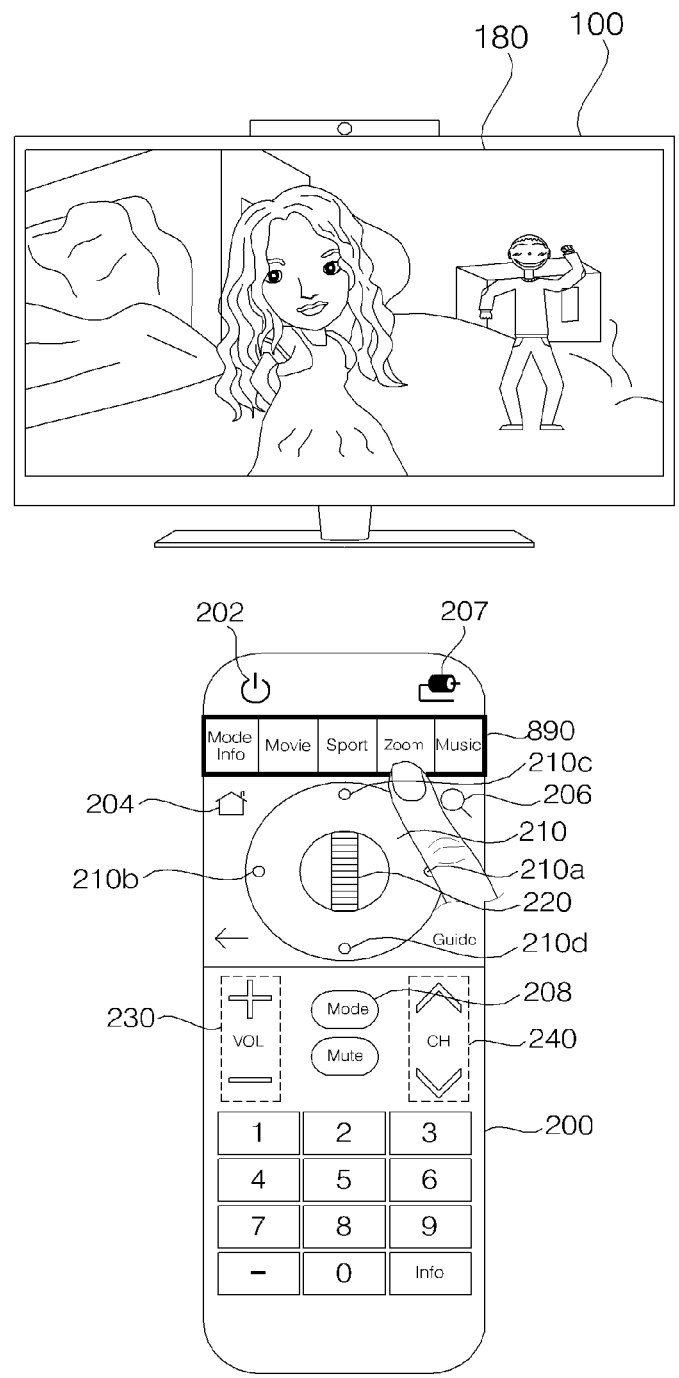
Figure 19G:
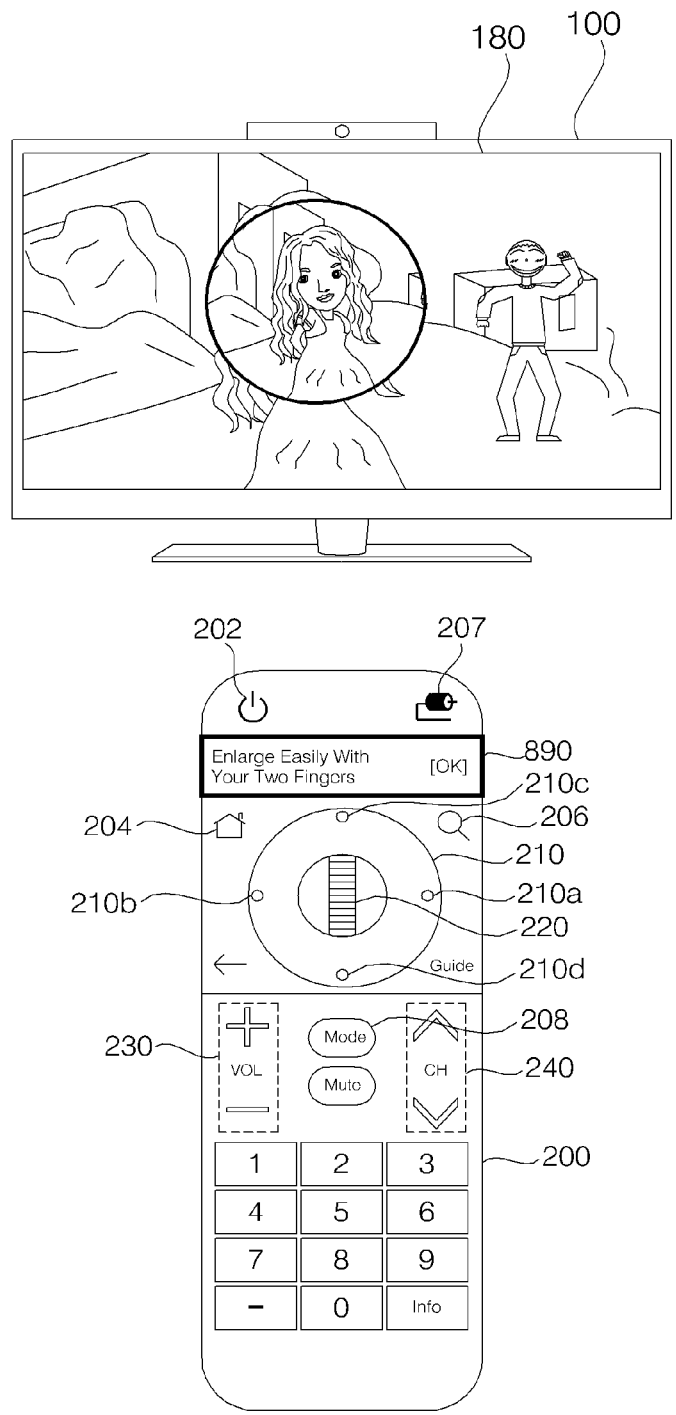
Figure 19H:
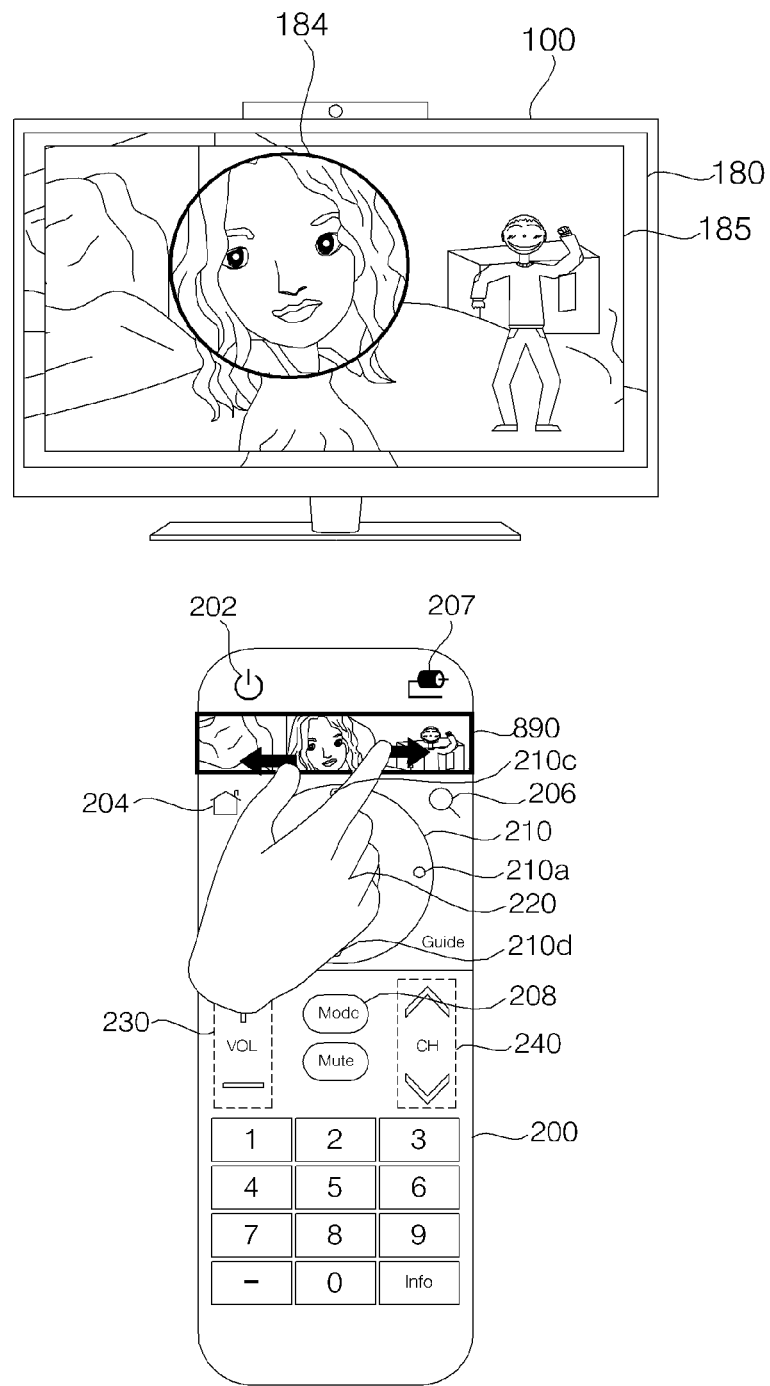

As illustrated in FIGS. 19F, 19G, and 19H, upon receipt of a first touch input to the zoom function in the function list information displayed on the touch screen 890, the controller 880 of the remote controller 200 may control display of guide information corresponding to the zoom function according to the first touch input as a UI on the touch screen 890.

Further, the captured image 185 generated by enlarging the part focused by the zoom pointer 184 and capturing a specific area of the enlarged part may be displayed as a preview image on the touch screen 890, and a pinch input on the preview image may be received based on the guide information from the user.

According to the present disclosure, although the pinch input includes a sideway input, it may be applied vertically according to the size of the small-size display, so that the preview image may be enlarged or contracted.

As such, the user may readily control a preview image on the touch screen 890 of the remote controller 200 relatively near to the user without viewing the display of the image display apparatus 100 relatively distant from the user. This convenient control reduces eye fatigue.

Figure 20A:
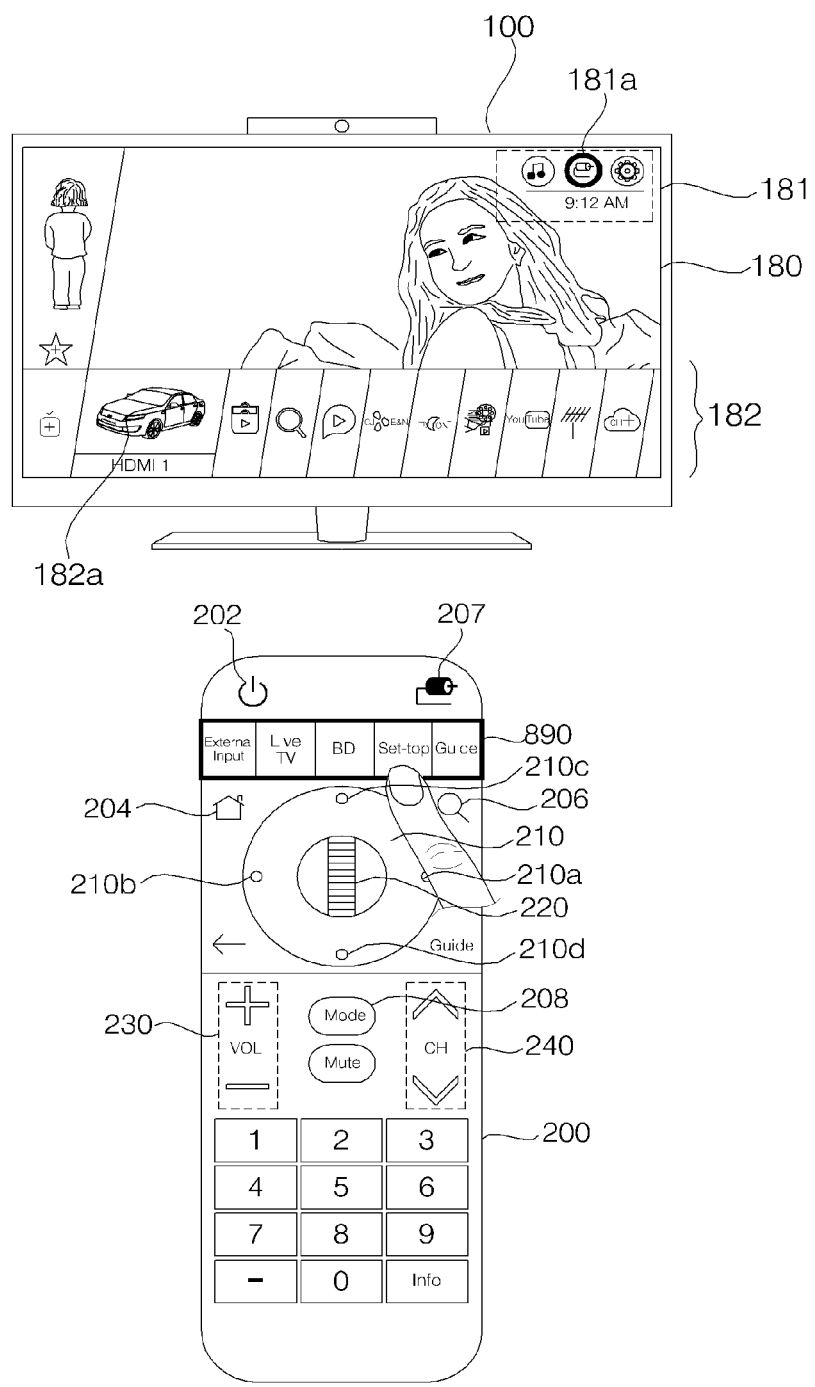

According to an embodiment of the present disclosure, as illustrated in FIG. 20A, the controller 880 of the remote controller 200 may control the touch screen 890 to receive a first touch input to the set-top mode in the device list information displayed on the touch screen 890, and a UI corresponding to the set-top mode according to the first touch input may be displayed on the touch screen 890 of the remote controller 200.

Figure 20B:
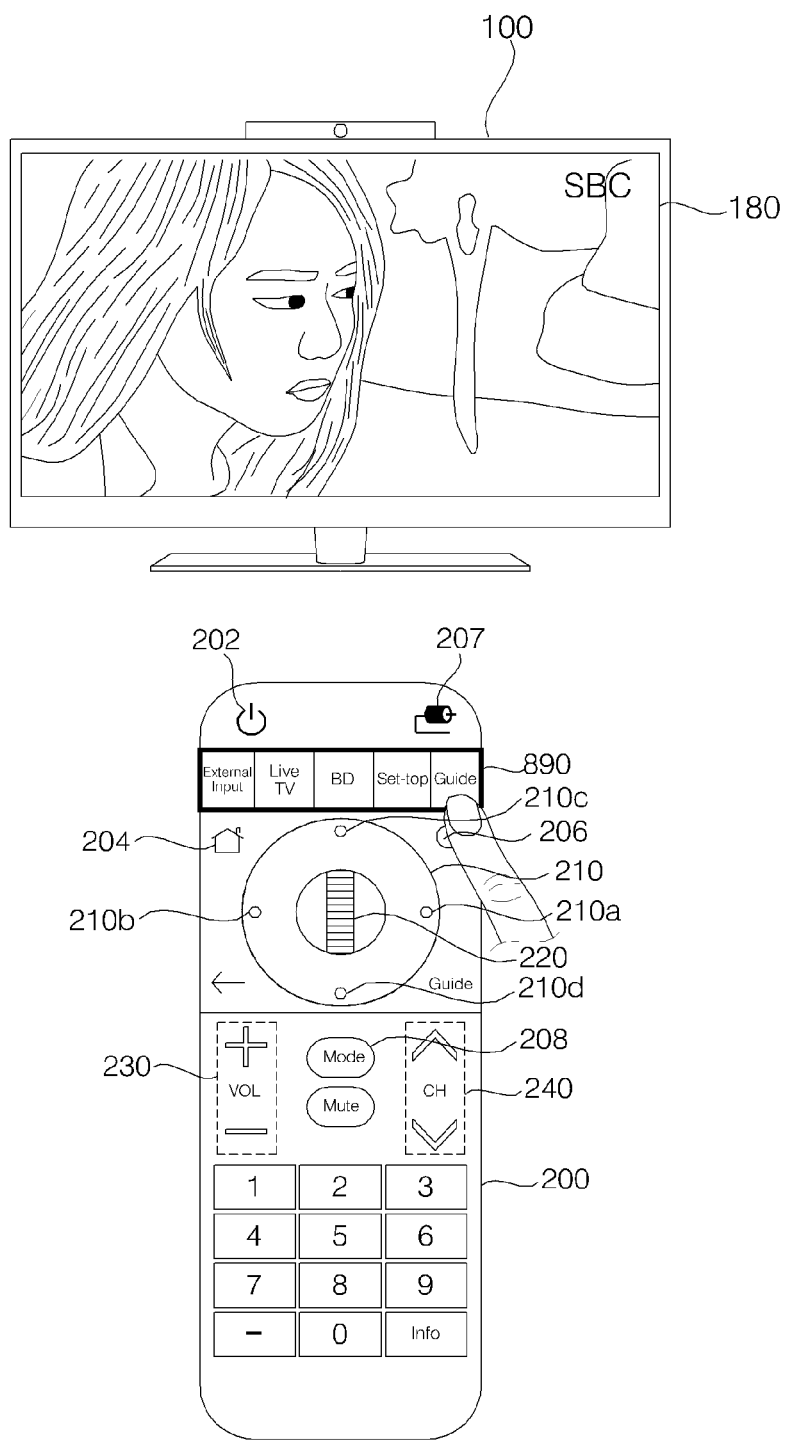
Figure 20C:
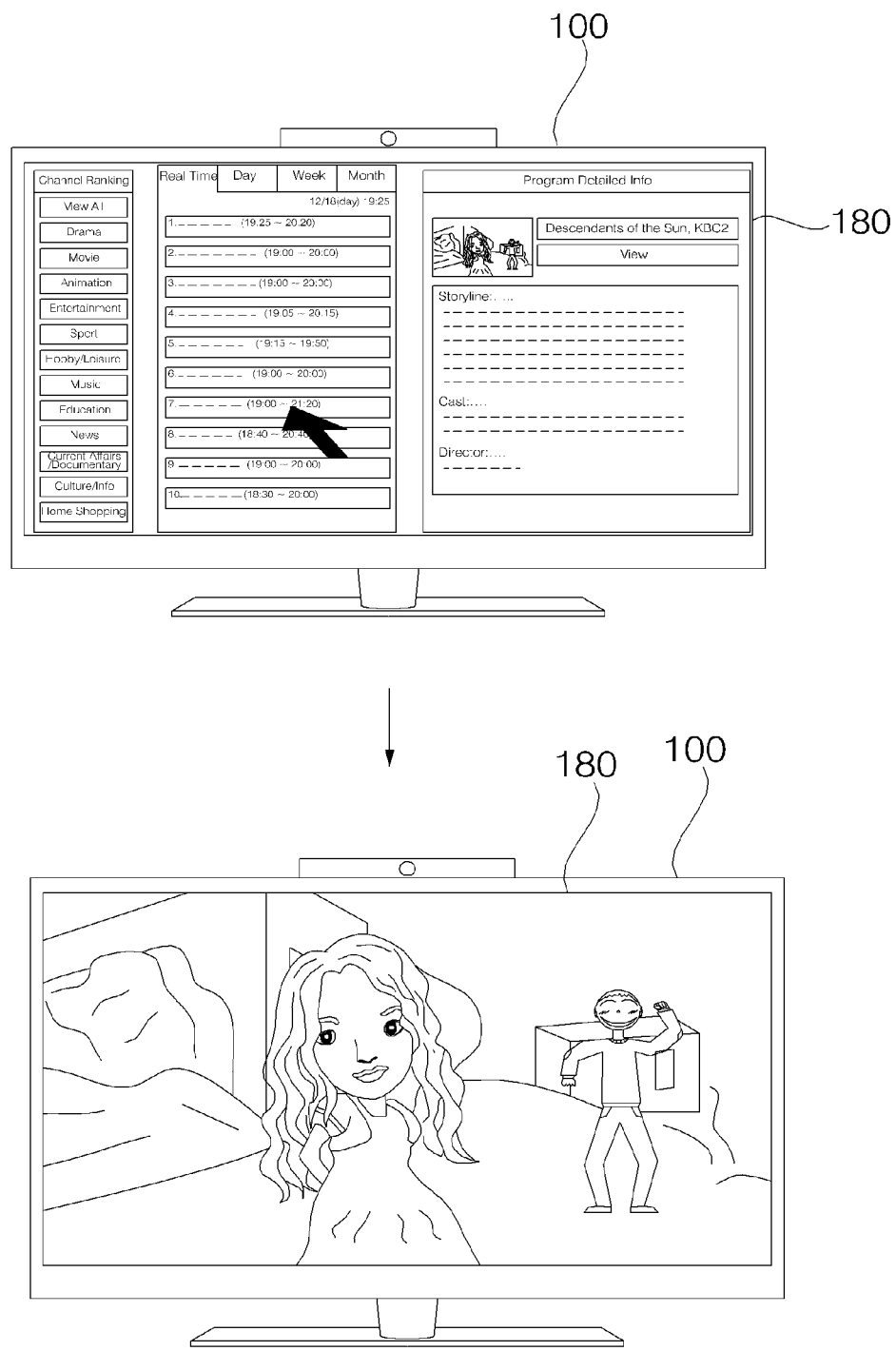

As illustrated in FIG. 20B, upon receipt of a second touch input to a guide region as a part of the UI corresponding to the step-top mode displayed according to the first touch input, EPG information may be displayed on the image display apparatus 100.

Figure 21B:
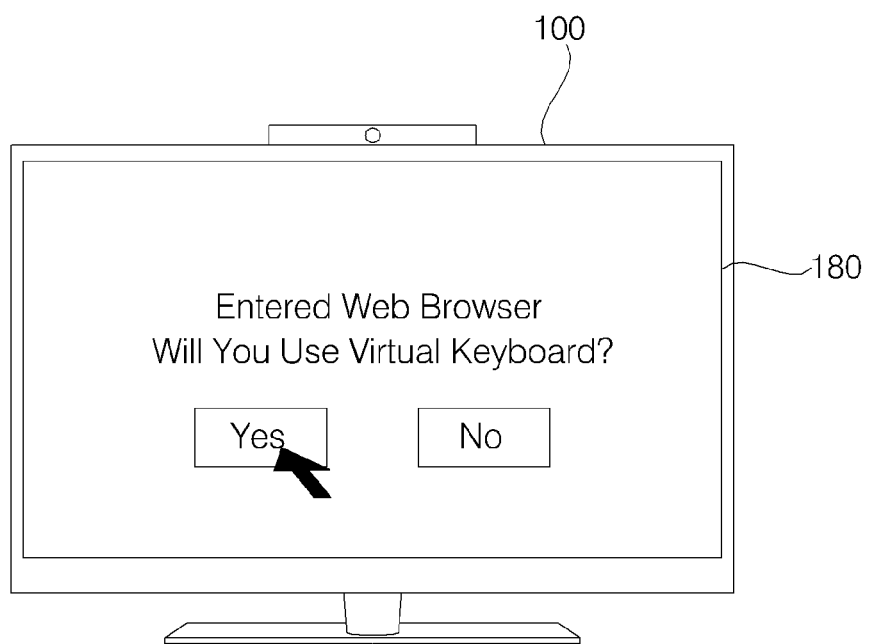
Figure 21C:
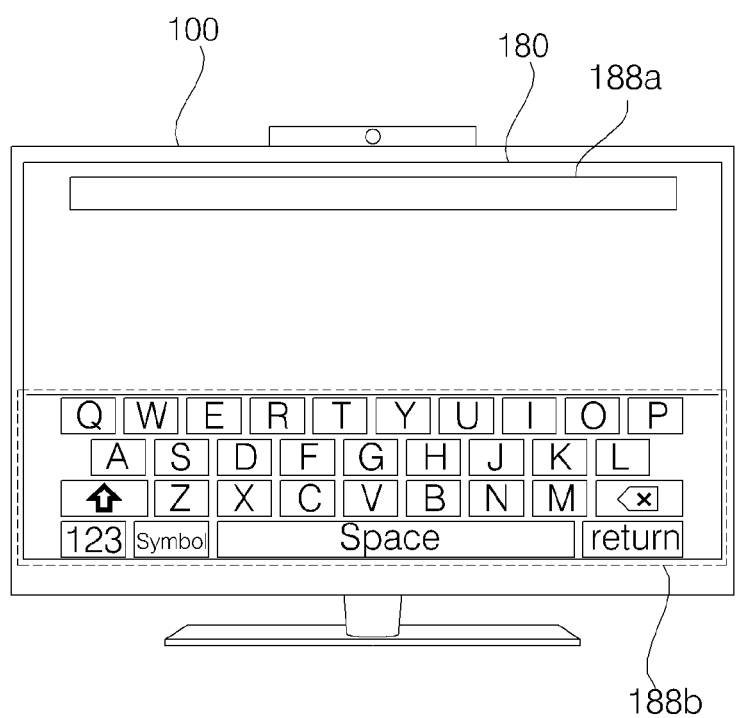

In the presence of a selection input to a program in the EPG, the program may be played in the image display apparatus 100, as illustrated in FIG. 21C.

The key input unit 830 of the remote controller 200 according to the present disclosure may include the wheel key 220, and a result of applying a scroll input to the wheel key 220 may be displayed as a preview image on the touch screen 890.

Upon receipt of a scroll input of the wheel key 220 during display of an image of a specific channel on the display 180 of the image display apparatus 100, the controller 880 of the remote controller 200 may control display of EPG information corresponding to the scroll input on the touch screen 890.

Figure 20D:
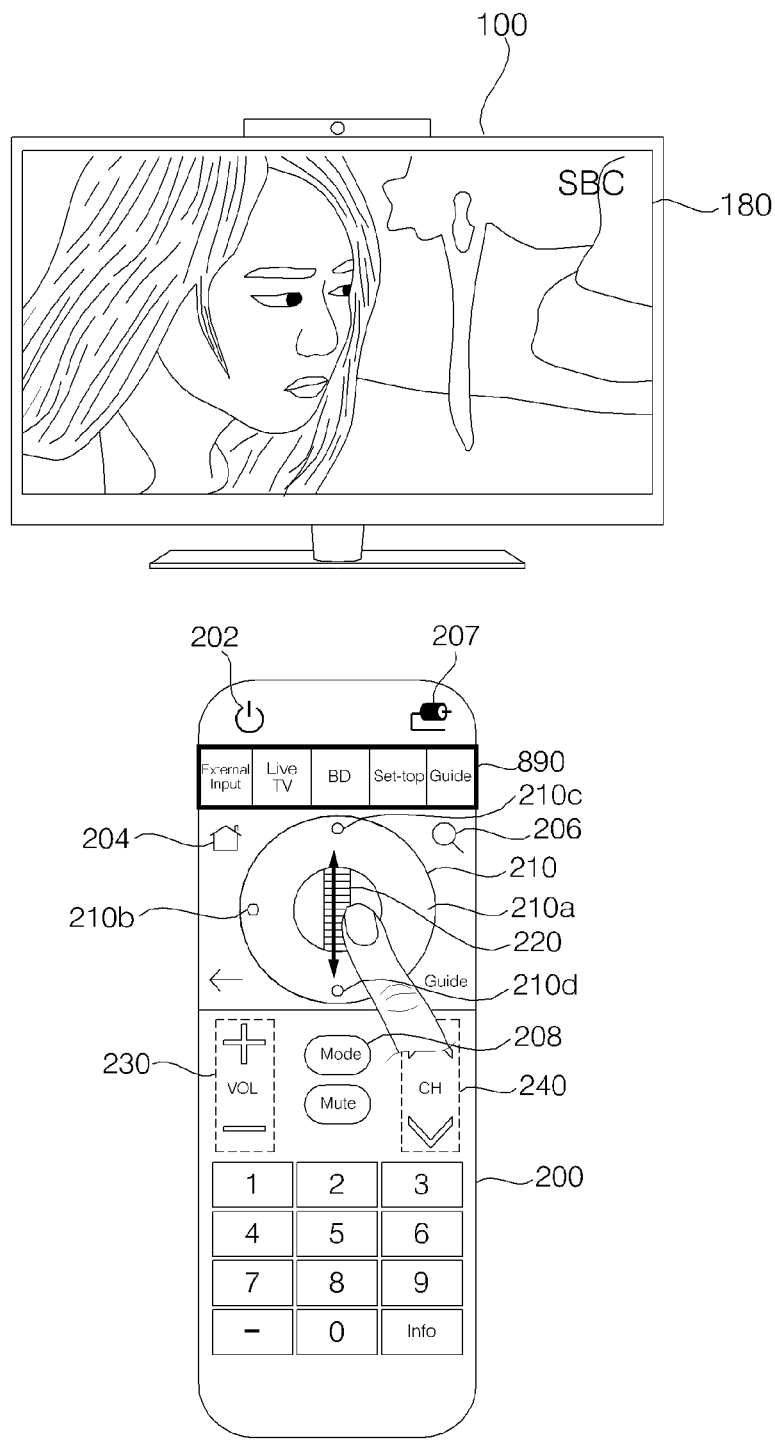
Figure 20E:
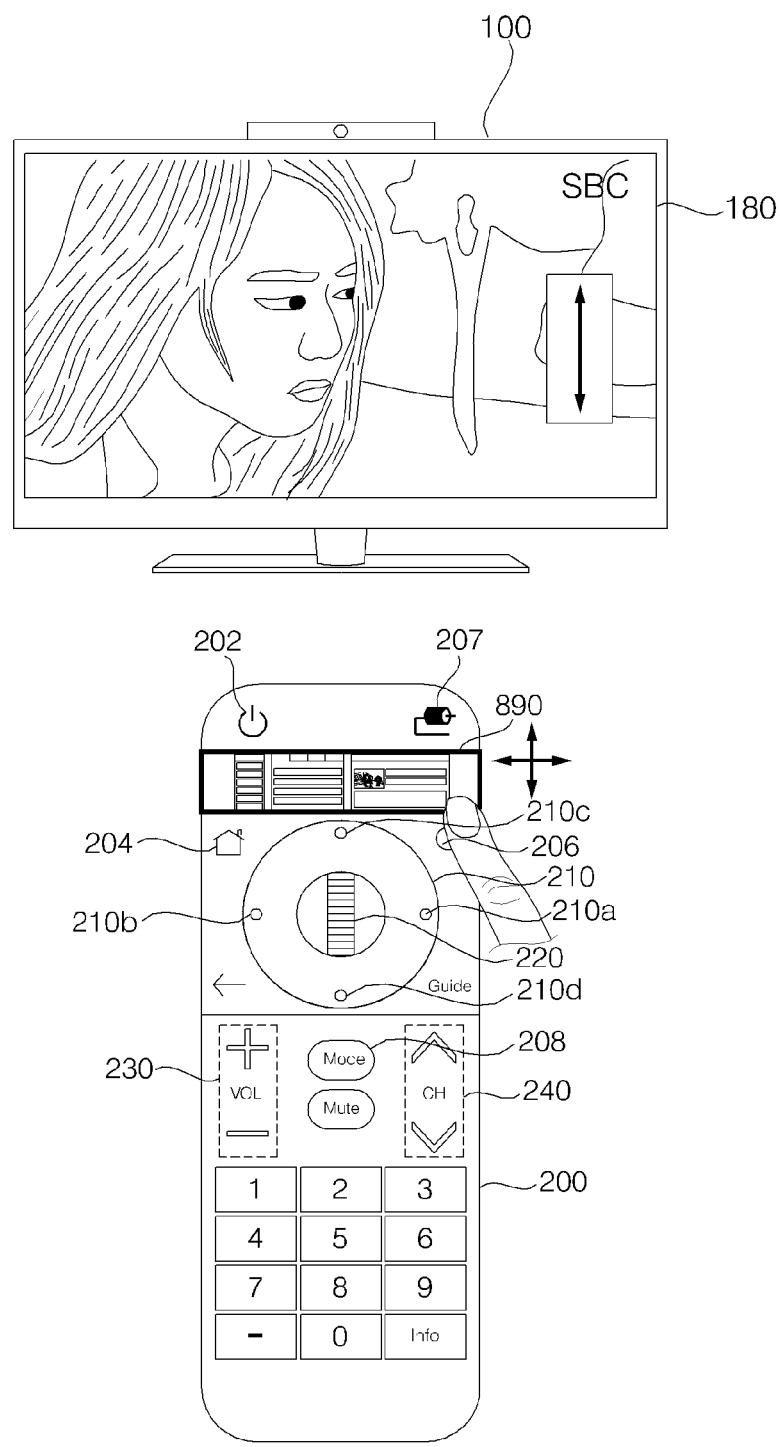

For example, upon receipt of a scroll input of the wheel key 220 during display of an image related to a specific channel in the image display apparatus 100 as illustrated in FIG. 20D, the controller 880 of the remote controller 200 may sense the scroll input and display EPG information corresponding to the scroll input as a preview image on the touch screen 890 as illustrated in FIG. 20E. Unlike FIG. 20A, the EPG information may not be displayed on the image display apparatus 100. In this manner, the user may easily view EPG information only on the touch screen 890 of the remote controller 200 without the need for viewing the image display apparatus 100.

Figure 20F:
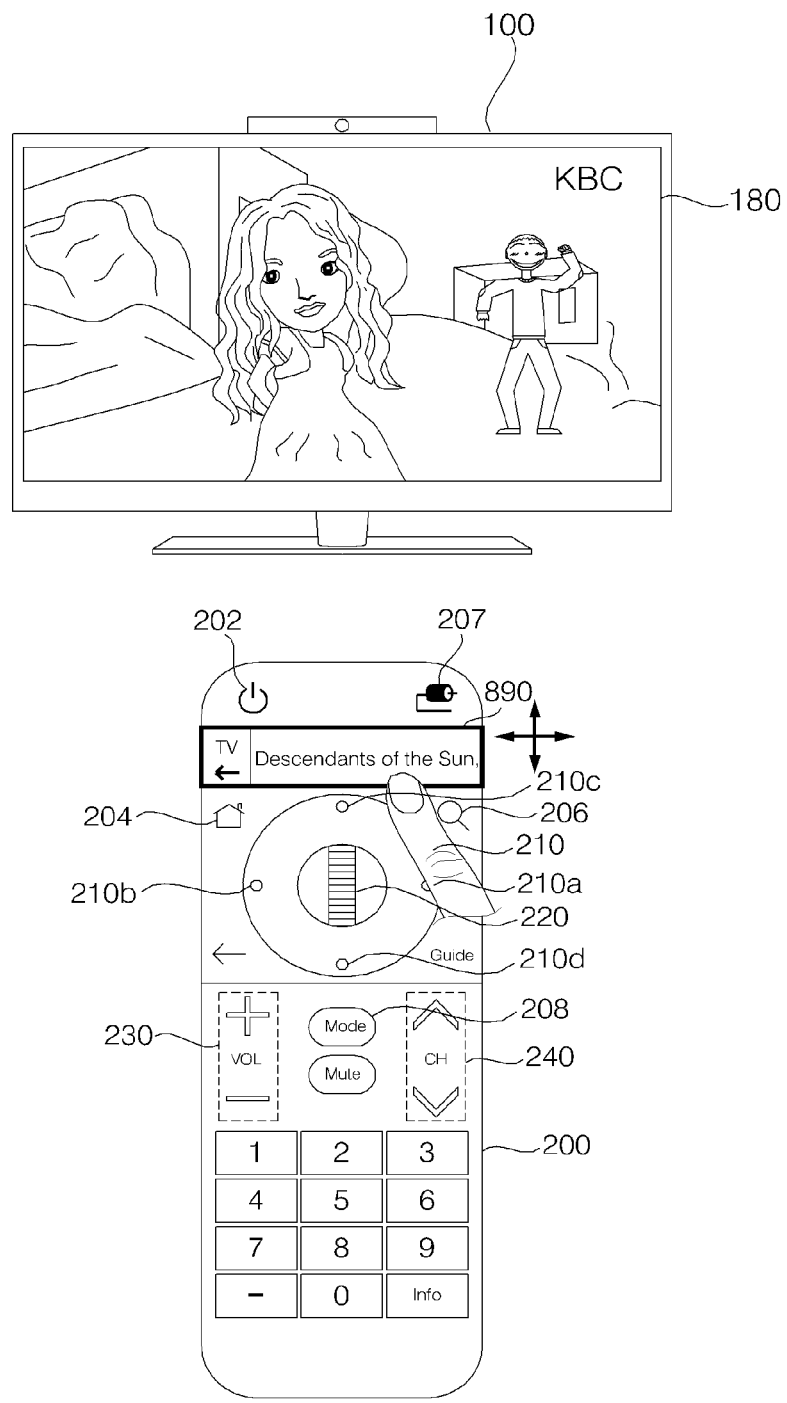

Upon receipt of a touch input to a first preview image including the EPG information displayed on the touch screen 890 as illustrated in FIG. 20E, the controller 880 of the remote controller 200 may control the touch screen 890 to display broadcasting information including a channel or program corresponding to the touch input as a second preview image, as illustrated in FIG. 20F. Herein, the image display apparatus 100 may play a changed broadcast image corresponding to the touch input.

Further, upon receipt of a touch input on the second preview image including the broadcasting information displayed on the touch screen 890 as illustrated in FIG. 20F, for example, a sideway or vertical bi-directional touch and drag input, changed broadcasting information may be displayed on the touch screen 890.

As described before, a touch input according to the present disclosure may be any of a short touch, a long touch, and a swipe or pinch input including a bi-directional touch and drag. This touch input may also be applied to the touch screen 890 of FIG. 20B.

In another example, a result corresponding to an input of a specific key included in the key input unit 830 of the remote controller 200 may be displayed as a preview image on the touch screen 890. The preview image displayed on the touch screen 890 may include auto channel complete information, and a touch input may be applied to the auto channel complete information.

Upon input of a first numeral key including a number key during display of an image of a specific channel on the display 180 of the image display apparatus 100, the controller 880 of the remote controller 200 may control display of auto channel complete information including channel information corresponding to the first numeral key on the touch screen 890.

Figure 20G:
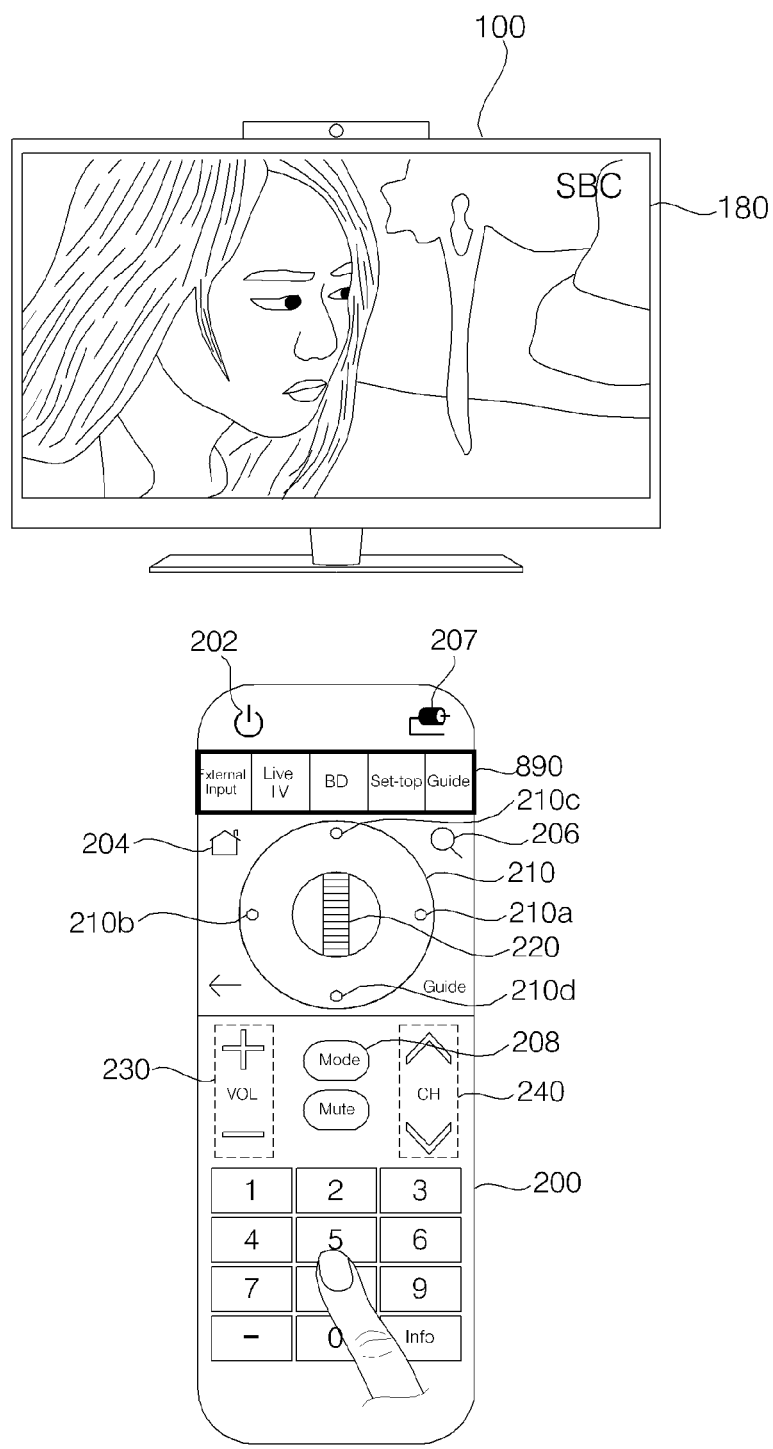
Figure 20H:
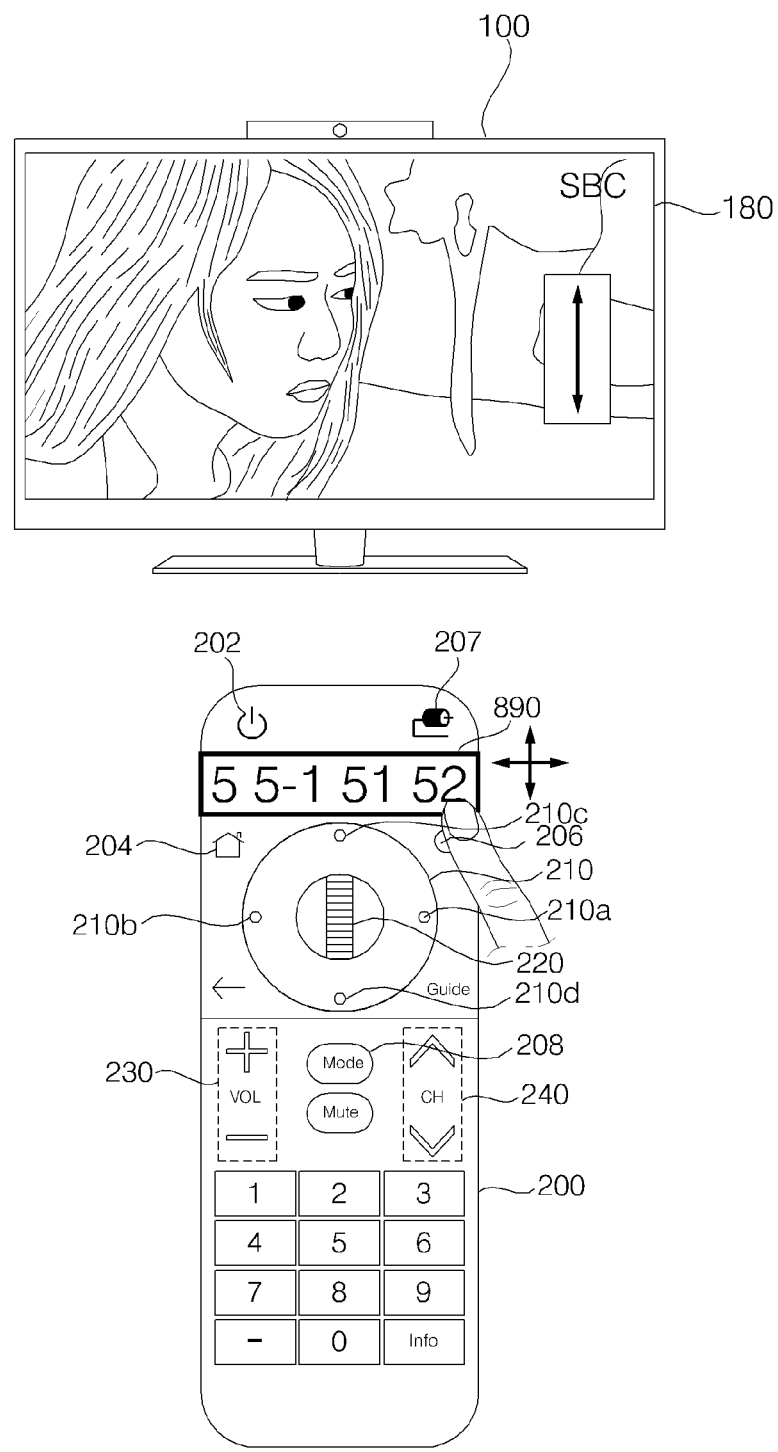

For example, upon input of a specific key including a numeral key during display of an image of a specific channel in the image display apparatus 100 as illustrated in FIG. 20G, the controller 880 of remote controller 200 may sense the input of the specific key, and display auto channel complete information including channel information corresponding to the specific key as a first preview image on the touch screen 890, as illustrated in FIG. 20H. The auto channel complete information may refer to channel information which in the presence of the same repeated input, may be input fast through a comparison with already stored information.

Figure 20I:
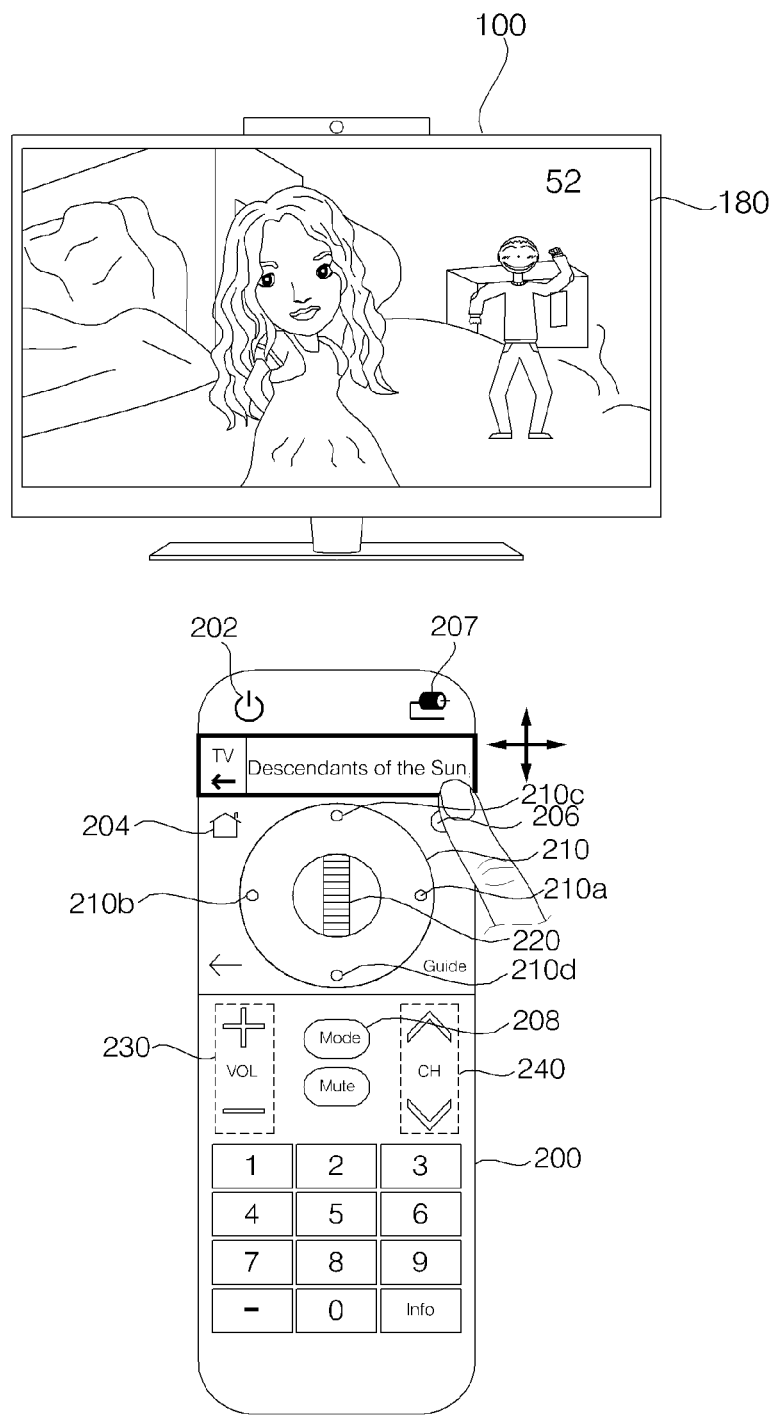

Upon receipt of a touch input on the first preview image including the auto channel complete information displayed on the touch screen 890 as illustrated in FIG. 20H, the controller 880 of the remote controller 200 may control the touch screen 890 to display broadcasting information including a channel or program corresponding to the touch input as a second preview image, as illustrated in FIG. 20I. The image display apparatus 100 may play a changed broadcast image corresponding to the touch input.

Upon sensing a touch input on the second preview image including the broadcasting information displayed on the touch screen 890 as illustrated in FIG. 20I, for example, a sideway or vertical bi-directional touch and drag input, changed broadcasting information may be displayed on the touch screen 890.

As micro-control is possible on a UI displayed on the touch screen 890 of the remote controller 200 in the above manner, a more accurate touch input may be applied than in the case of control by a pointing input on the display 180 of the image display apparatus 100 or a specific input through the key input unit 830 of the remote controller 200.

According to another embodiment of the present disclosure, a preview image displayed on the touch screen 890 may include auto text complete information, and a touch input may be applied to the auto text complete information.

For example, as illustrated in FIG. 21A, upon receipt of an input for selecting a specific application in the object 182 representing an application list displayed on the image display apparatus 100, a screen for executing the application may be displayed on the image display apparatus 100.

As illustrated in FIG. 21C, the application execution screen may include at least one of a virtual keyboard object 188b and a search window object 188a, for entering a search keyword.

Herein, an entry screen for execution of the application may be displayed as illustrated in FIG. 21B.

Figure 21D:
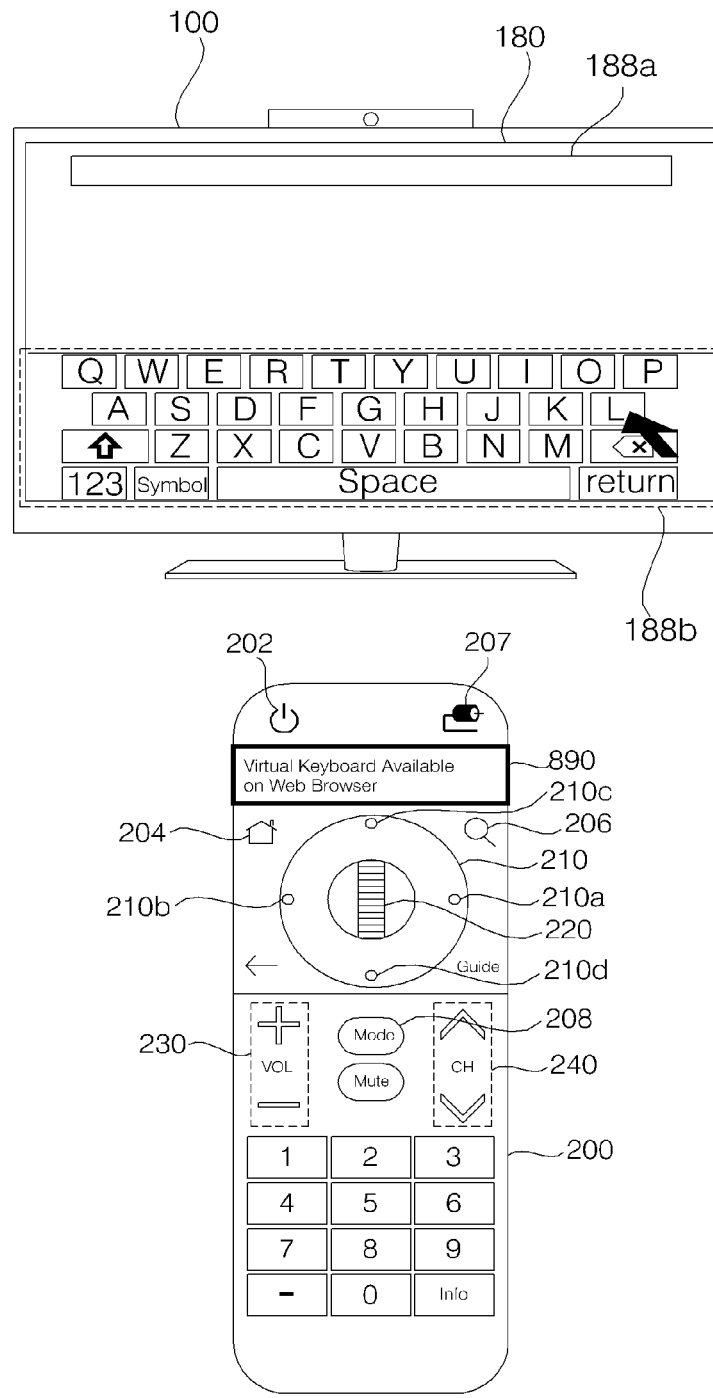
Figure 21E:
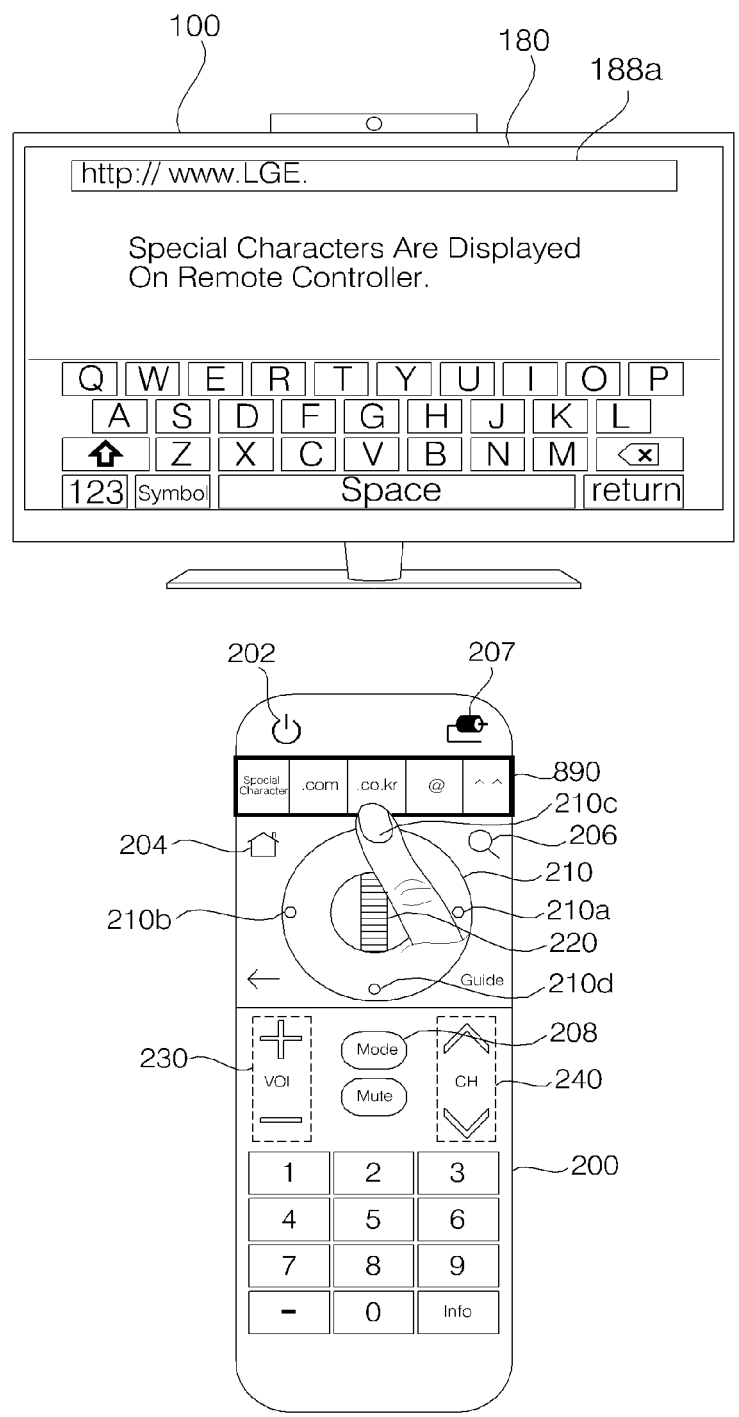

The image display apparatus 100 may receive an input of a specific key included in the virtual keyboard object 188b for input of a search keyword from the remote controller 200, as illustrated in FIG. 21D. As illustrated in FIG. 21E, the input corresponding to the specific key may be displayed in the search window object 188a, and a signal indicating display of the input of the specific key in the search window object 188a may be transmitted to the remote controller 200.

As illustrated in FIG. 21D, the remote controller 200 may display information indicating a state in which an input may be applied in the virtual keyboard object 188b on the touch screen 890. Upon receipt of a signal indicating that an input to a specific key is being displayed in the search window object 188a from the image display apparatus 100, the controller 880 of the remote controller 200 may display auto text complete information related to the specific key input to the search window object 188a on the touch screen 890, as illustrated in FIG. 21E.

The auto text complete information may refer to text information which in the presence of the same repeated input, may be fast input by a comparison with already stored information. The auto text complete information may include text information in the form of a character or a symbol.

Figure 21F:
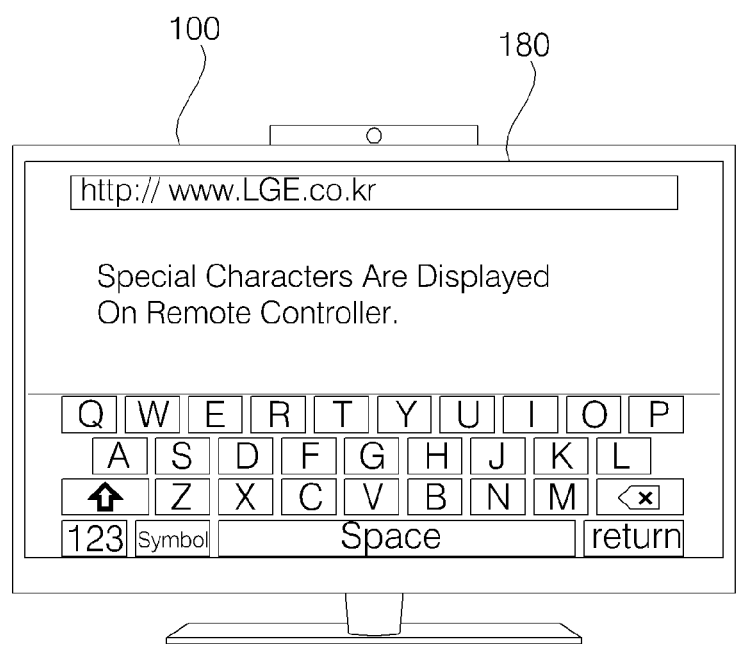

Therefore, upon receipt of a touch input to a part of the auto text complete information related to the specific key displayed on the touch screen 890, the controller 880 of the remote controller 200 may control transmission of specific text information according to the touch input to the image display apparatus 100, and the image display apparatus 100 may display the received text information, as illustrated in FIG. 21F.

Accordingly, the user can fast input frequently used text without entering the text fully, thereby saving time and reducing unnecessary efforts.

According to another embodiment of the present disclosure, micro-control is possible by a touch input on a preview image displayed on the touch screen 890.

Meanwhile, upon selection of a video play application from among the applications displayed on the display 180 of the image display apparatus 100, the controller 880 of the remote controller 200 may receive video player mode information from the image display apparatus 100 and control display of the video player mode information on the touch screen 890.

Figure 22A:
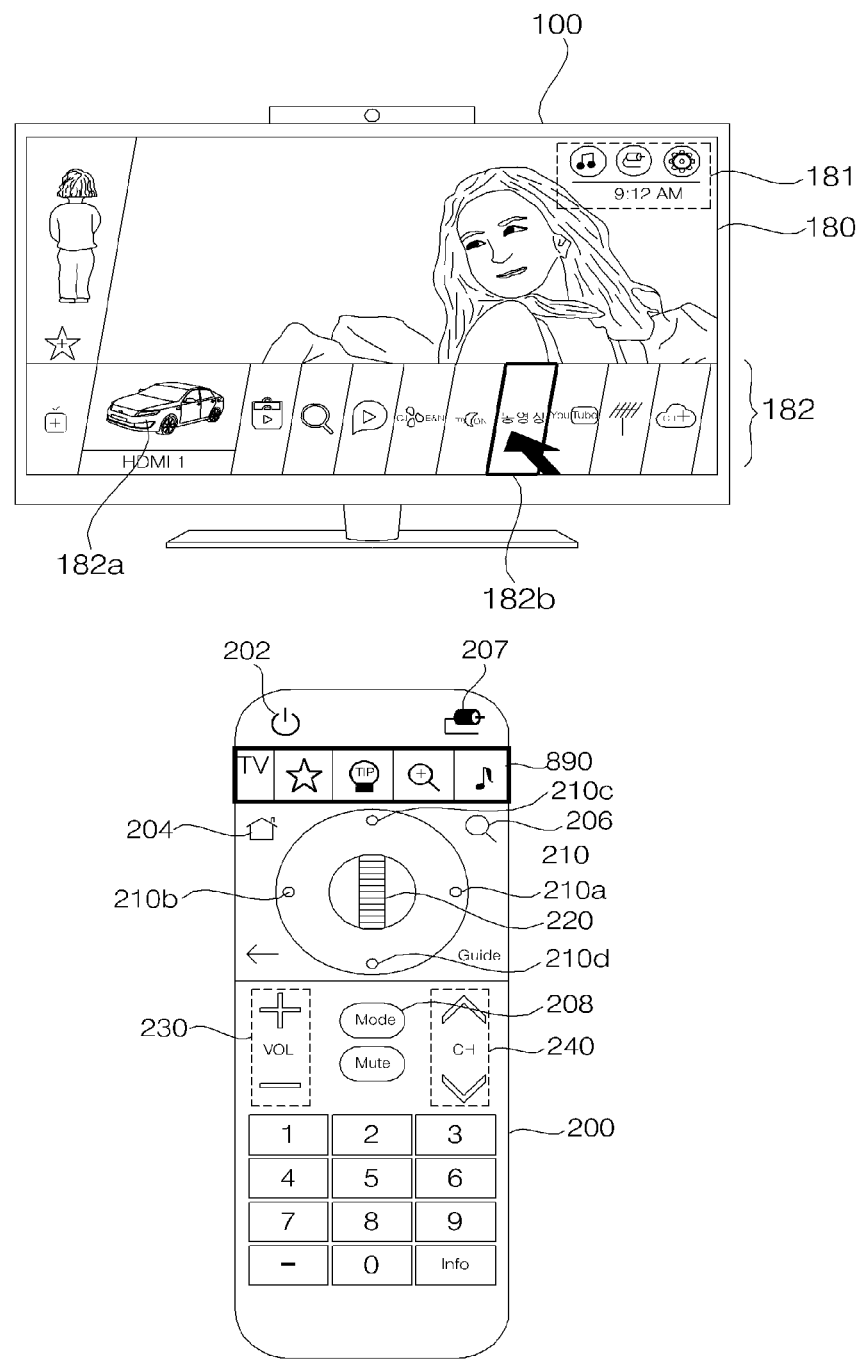

For example, as illustrated in FIG. 22A, upon receipt of an input for selecting a specific application 182b related to video play in the object 182 representing the application list displayed on the image display apparatus 100, a screen for executing the application 182b may be displayed on the image display apparatus 100.

Figure 22B:
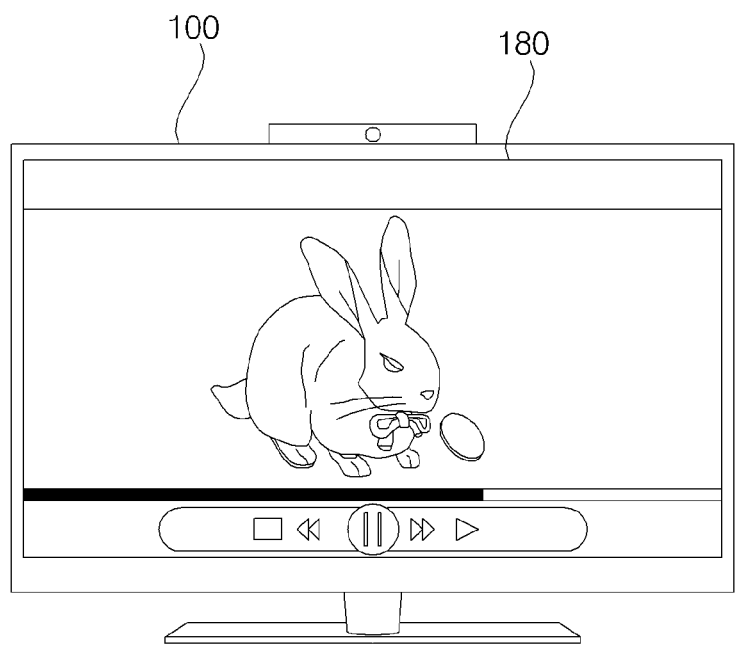

Herein, the screen for executing the application 182b on the image display apparatus 100 may include video player mode information, as illustrated in FIG. 22B. As illustrated in FIG. 22C, the video player mode information may be displayed on the touch screen 890 of the remote controller 200, instead of the image display apparatus 100.

Meanwhile, upon receipt of a touch input (e.g., a swipe input including a bi-directional touch and drag) to the video player mode information displayed on the touch screen 890 as illustrated in FIG. 22D, play-related information may be displayed on the image display apparatus 100, as illustrated in FIG. 22E, and on the touch screen 890 as illustrated in FIG. 22F.

As micro-control is possible by a touch input to video player mode information displayed on the touch screen 890 as illustrated in FIGS. 22D, 22E, and 22F, the user may move to an intended scene fast and accurately.

According to another embodiment of the present disclosure, micro-control is possible by a touch input on a preview image displayed on the touch screen 890.

Upon selection of an environment setting object from among objects displayed on the display 180 of the image display apparatus 100, the controller 880 of the remote controller 200 may control reception of environment setting information from the image display apparatus 100 and display of the received environment setting information on the touch screen 890.

Figure 23B:
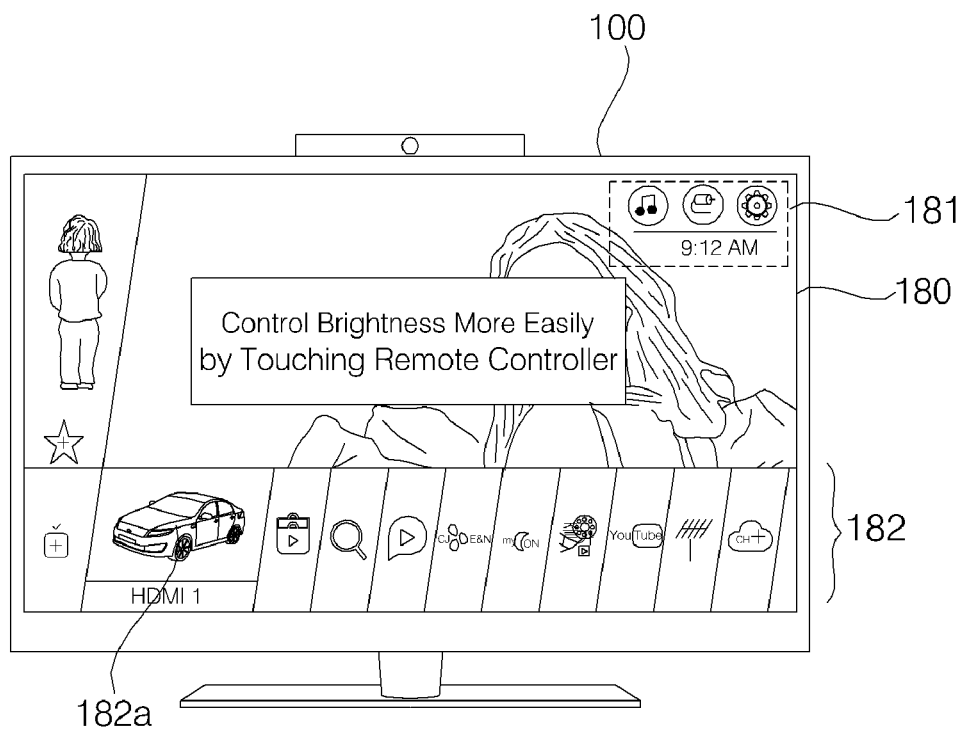

For example, upon selection of an environment setting object 181b from among the objects displayed on the display 180 of the image display apparatus 100 as illustrated in FIG. 23A, environment setting information may be displayed as a preview image on the touch screen 890 of the remote controller 200 as illustrated in FIG. 23C. The environment setting information may be controlled by a touch input to the environment setting information displayed as the preview image. Herein, as illustrated in FIG. 23B, information indicating that environment setting information can be controlled may be displayed on the image display apparatus 100.

Upon receipt of a touch input (a swipe input including a bi-directional touch and drag) on the preview image including the environment setting information displayed on the touch screen 890 as illustrated in FIG. 23D, environment information changed by the touch input may be displayed on the image display apparatus 100 as illustrated in FIG. 23E, and on the touch screen 890 as illustrated in FIG. 23F.

Since micro-control is possible by a touch input on a preview image including environment setting information displayed on the touch screen 890 as illustrated in FIGS. 23A to 23F, the user may readily set or change an environment to a desired degree.

FIGS. 24A, 24B, and 24C illustrate examples of additional information that may be displayed on the touch screen 890 of the remote controller 200. The additional information may be configured to be pre-stored in the memory 870 of the remote controller 200. Alternatively or additionally, information may be received in real time from the image display apparatus 100 and the additional information may be displayed based on the received information.

Particularly, FIG. 24A illustrates information related to TV notifications, FIG. 24B illustrates information related to assistance to TV use, and FIG. 24C illustrates information related to additional information.

The user may check the state of the image display apparatus 100 or the remote controller 200 based on such additional information. Particularly, even when the image display apparatus 100 is powered off, additional information may be viewed on the remote controller 200 independently of the image display apparatus 100, thereby reducing the power consumption of the image display apparatus 100.

As is apparent from the foregoing description, according to an embodiment of the present disclosure, since device list information can be displayed on the touch screen 890 of the remote controller 200 as well as on the image display apparatus 100, a user can readily view usage mode information including the device list information on the touch screen 890 of the remote controller 200 relatively near to the user without viewing the display 180 of the image display apparatus 100 relatively distant from the user. Further, as the object 891 is controlled on the touch screen 890 of the remote controller 200 relatively near to the user, the control is convenient and eye fatigue of the user is reduced.

According to an embodiment of the present disclosure, it may be configured that a different UI is displayed based on a usage mode selected by a touch input on the touch screen 890 of the remote controller 200 and thus UIs are distinguished by their corresponding usage modes, enabling the user to easily identify the usage modes.

According to an embodiment of the present disclosure, since a part of control information or a control result in relation to a usage mode selected on the touch screen 890 of the remote controller 200 is displayed only on the remote controller 200, and the other part of the control information or result is displayed on the image display apparatus 100, the distribution process between the remote controller 200 and the image display apparatus 100 can increase a video processing speed.

According to an embodiment of the present disclosure, an important part of control information or a control result in relation to a usage mode selected on the touch screen 890 of the remote controller 200 is displayed only on the remote controller 200. Therefore, continuously repeated movements of the eyes of the user between the image display apparatus 100 and the remote controller 200 can be reduced, thereby reducing the eye fatigue of the user.

According to an embodiment of the present disclosure, as the touch screen 890 is further configured in the remote controller 200, main functions of key buttons provided in a conventional remote controller may be displayed on the touch screen 890. Thus, the number of physical key buttons (hot keys) of the remote controller 200 can be reduced, compared to that of the conventional remote controller, thereby reducing fabrication cost.

According to an embodiment of the present disclosure, as a UI is provided to be controlled on the touch screen 890 of the remote controller 200, micro-control is possible, compared to control of a UI configured on the display 180 of the image display apparatus 100.

According to an embodiment of the present disclosure, as a UI controllable on the touch screen 890 of the remote controller 200 is provided on behalf of a UI configured on the display 180 of the image display apparatus 100, the display 180 of the image display apparatus 100 can provide a larger screen for audio or video play, thereby providing a more user-friendly visual effect.

According to an embodiment of the present disclosure, as micro-control is possible by a touch input to video player mode information displayed on the touch screen 890, the user may move to an intended scene fast and accurately.

According to another embodiment of the present disclosure, since a remote controller includes a key input unit for receiving a specific key input, a touch screen for receiving a touch input, a wireless communication unit for transmitting and receiving data to and from an image display apparatus, and a controller for, if an external input key is operated in the key input unit, receiving device list information about the image display apparatus and controlling display of the device list information on the touch screen, an external device list may be displayed simply.

According to an embodiment of the present disclosure, the state of the remote controller 200 or the image display apparatus 100 can be checked in real time based on additional information displayed on the touch screen 890. Particularly, even when the image display apparatus 100 is turned off, the additional information can be checked in real time in the remote controller 200 independently of the image display apparatus 100. As a consequence, the power consumption of the image display apparatus 100 can be reduced.

The image display apparatus and the method for operating the same according to the foregoing exemplary embodiments are not restricted to the exemplary embodiments set forth herein. Therefore, variations and combinations of the exemplary embodiments set forth herein may fall within the scope of the present disclosure.

The method for operating an image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A remote control device for an image display apparatus, the remote control device comprising:
   a wireless communication unit;
   an input unit configured to receive specific inputs;
   a touch screen configured to display information and receive touch inputs; and
   a controller configured to:
   control the touch screen to display usage mode information in response to a user input received via the input unit;
   enter a selected usage mode in response to a first touch input received via the touch screen for selecting the selected usage mode from the displayed usage mode information;
   control the touch screen to display a user interface corresponding to the selected usage mode,
   receive environment setting information from the image display apparatus via the wireless communication unit when an environment setting object is selected from a plurality of selectable objects displayed at the image display apparatus; and
   control the touch screen to display the received environment setting information.

2. The remote control device according to claim 1, wherein the controller is further configured to receive a second touch input to the displayed user interface received via the touch screen corresponding to the selected usage mode.

3. The remote control device according to claim 1, further comprising a memory configured to store information, wherein:
the displayed user interface corresponding to the selected usage mode is pre-stored in the memory; and
the controller is further configured to control the touch screen to display the user interface from the information pre-stored in the memory.

4. The remote control device according to claim 1, wherein:
the displayed usage mode information includes at least device list information or function list information;
the device list information comprises information related to one or more external devices in communication with the image display apparatus; and
the function list information comprises information related to one or more functions executable at the image display apparatus.

5. The remote control device according to claim 1, wherein the touch screen comprises a single line display.

6. The remote control device according to claim 5, wherein the single line display displays at least text or a thumbnail image.

7. The remote control device according to claim 1, wherein the first touch input comprises at least one of a short touch, a long touch, a multi-touch, a swipe input, a bi-directional touch and drag input, or a pinch-in or pinch-out input.

8. The remote control device according to claim 1, further comprising a wireless communication unit, wherein the usage mode information is received from the image display apparatus via the wireless communication unit.

9. The remote control device according to claim 8, wherein:
the image display apparatus comprises a display configured to display information; and
the controller is further configured to cause an object to be displayed for executing a function corresponding to a specific key of the input unit on at least one of the display of the image display apparatus or the touch screen.

10. The remote control device according to claim 1, further comprising a wireless communication unit, wherein the controller is further configured to:
receive video player mode information received from the image display apparatus via the wireless communication unit when a video play application is selected from a plurality of applications displayed at the image display apparatus; and
control the touch screen to display the received video player mode information.

11. The remote control device according to claim 1, wherein the controller is further configured to control the touch screen to display auto-channel complete information when a first numeral key input is received via the input unit while a specific channel is being displayed at the image display apparatus, wherein the auto-channel complete information comprises channel information corresponding to the received first numeral key input.

12. The remote control device according to claim 1, wherein the controller is further configured to control the touch screen to display electronic program guide information when a scroll input is received via an input wheel of the input unit while a specific channel is being displayed at the image display apparatus.

13. The remote control device according to claim 1, wherein the controller is further configured to control the touch screen to display guide information when a zoom touch input is received to the displayed usage mode information.

14. The remote control device according to claim 1, wherein the controller is further configured to cause audio playback at the image display apparatus in response to an input to the touch screen selecting an audio playback item while a display of the image display apparatus is off.

15. The remote control device according to claim 1, wherein the controller is further configured to control the touch screen to display an interface for volume control or channel switching.

16. A remote control device comprising:
a key input unit configured to receive key inputs;
a touch screen configured to receive touch inputs;
a wireless communication unit configured to transmit or receive data to and from an image display apparatus; and
a controller configured to:
receive external device list information related to external devices associated with the image display apparatus, the external device list information received from the image display apparatus via the wireless communication unit in response to an external input received via the key input unit;
control the touch screen to display the received external device list information;
receive environment setting information from the image display apparatus via the wireless communication unit when an environment setting object is selected from a plurality of selectable objects displayed at the image display apparatus; and
control the touch screen to display the received environment setting information.

17. The remote control device according to claim 16, wherein:
the displayed external device list information comprises a thumbnail image for each external device, and
the controller is further configured to cause an image to be displayed on a display of the image display apparatus in response to selection of a thumbnail image, the displayed image corresponding to an external device corresponding to the selected thumbnail image.

18. An image display system comprising:
a display configured to display information;
a remote control device;
a communication unit configured to transmit and receive information to and from the remote control device; and
a controller configured to transmit usage mode information to the remote control device via the communication unit,
wherein the remote control device displays the usage mode information, enters a usage mode selected from the displayed usage mode information in response to a first input, displays a user interface corresponding to the selected usage mode, and receives a second input to the displayed user interface,
wherein the controller is further configured to:
receive information of the second input from the remote control device via the communication unit; and
execute a command corresponding to the received second input, wherein the remote control device:
receives environment setting information from the image display apparatus via a wireless communication unit of the remote control device when an environment setting object is selected from a plurality of selectable objects displayed at the image display apparatus; and
displays the received environment setting information via a touch screen of the remote control device.

\* \* \* \* \*